US011507351B2

(12) United States Patent
Khan

(10) Patent No.: US 11,507,351 B2
(45) Date of Patent: Nov. 22, 2022

(54) INTENT COMPILER

(71) Applicant: VMware, Inc., Palo Alto, CA (US)

(72) Inventor: Akmal Khan, Novato, CA (US)

(73) Assignee: VMware, Inc., Palo Alto, CA (US)

( * ) Notice: Subject to any disclaimer, the term of this patent is extended or adjusted under 35 U.S.C. 154(b) by 35 days.

(21) Appl. No.: 17/155,769

(22) Filed: Jan. 22, 2021

(65) Prior Publication Data

US 2021/0373860 A1 Dec. 2, 2021

Related U.S. Application Data

(60) Provisional application No. 63/023,605, filed on May 12, 2020.

(51) Int. Cl.
*G06F 8/41* (2018.01)
*G06F 9/54* (2006.01)

(52) U.S. Cl.
CPC .......... *G06F 8/41* (2013.01); *G06F 9/541* (2013.01); *G06F 9/546* (2013.01)

(58) Field of Classification Search
None
See application file for complete search history.

(56) References Cited

U.S. PATENT DOCUMENTS

| | | | | |
|---|---|---|---|---|
| 6,578,191 B1* | 6/2003 | Boehme | ................ | G06F 9/541 |
| | | | | 717/137 |
| 6,633,868 B1* | 10/2003 | Min | ...................... | G06F 16/951 |
| 7,370,335 B1* | 5/2008 | White | ................ | G06Q 10/103 |
| | | | | 719/328 |
| 8,347,265 B1* | 1/2013 | Sirianni | ................ | G06F 9/451 |
| | | | | 717/108 |
| 2007/0011620 A1* | 1/2007 | Mendel | .................... | G06F 8/31 |
| | | | | 715/764 |
| 2012/0066670 A1* | 3/2012 | McCarthy | ........... | H04L 41/0806 |
| | | | | 717/169 |
| 2018/0373661 A1* | 12/2018 | Shanley | .............. | G06F 13/4027 |
| 2020/0084120 A1* | 3/2020 | A | ........................ | H04L 41/5054 |
| 2020/0387415 A1* | 12/2020 | Take | ...................... | G06Q 50/10 |
| 2021/0334149 A1* | 10/2021 | Take | ...................... | G06F 8/311 |

* cited by examiner

*Primary Examiner* — Qing Chen

(57) ABSTRACT

An intent compiler is disclosed. The intent compiler includes a backend services layer having at least one service application programming interface (API) specification. The intent compiler also includes a service adapter layer to receive the at least one service API specification and automatically generate at least one service adapter based on the at least one service API specification. The intent compiler additionally includes an application layer to automatically generate an application.

18 Claims, 6 Drawing Sheets

301

ReadOnly Accessors
310

Language-Neutral Classes
315

Composite Objects
320

Default Foundation Types
325

FIG. 3

INTENT COMPILER

RELATED APPLICATION

This application claims priority to the provisional patent application having Application No. 63/023,605, entitled SEWING MACHINE—THE INTENT COMPILER," with filing date May 12, 2020, by Akmal Khan, which is herein incorporated by reference in its entirety.

BACKGROUND

Presently, the time and logistics required to build out an application is work-hour intensive. Moreover, any errors, updates, or changes can cause cascading errors and cause an application writer to spend numerous hours reading memory dumps, error reports, and the like. Furthermore, the larger the distribution and/or utilization of the application can significantly increase the tech support requirements. Especially when the application is used in a business environment.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

FIG. 3 depicts a diagram of a mock architecture generated by service adapter generator, in accordance with an embodiment.

DESCRIPTION OF EMBODIMENTS

Figure 1:
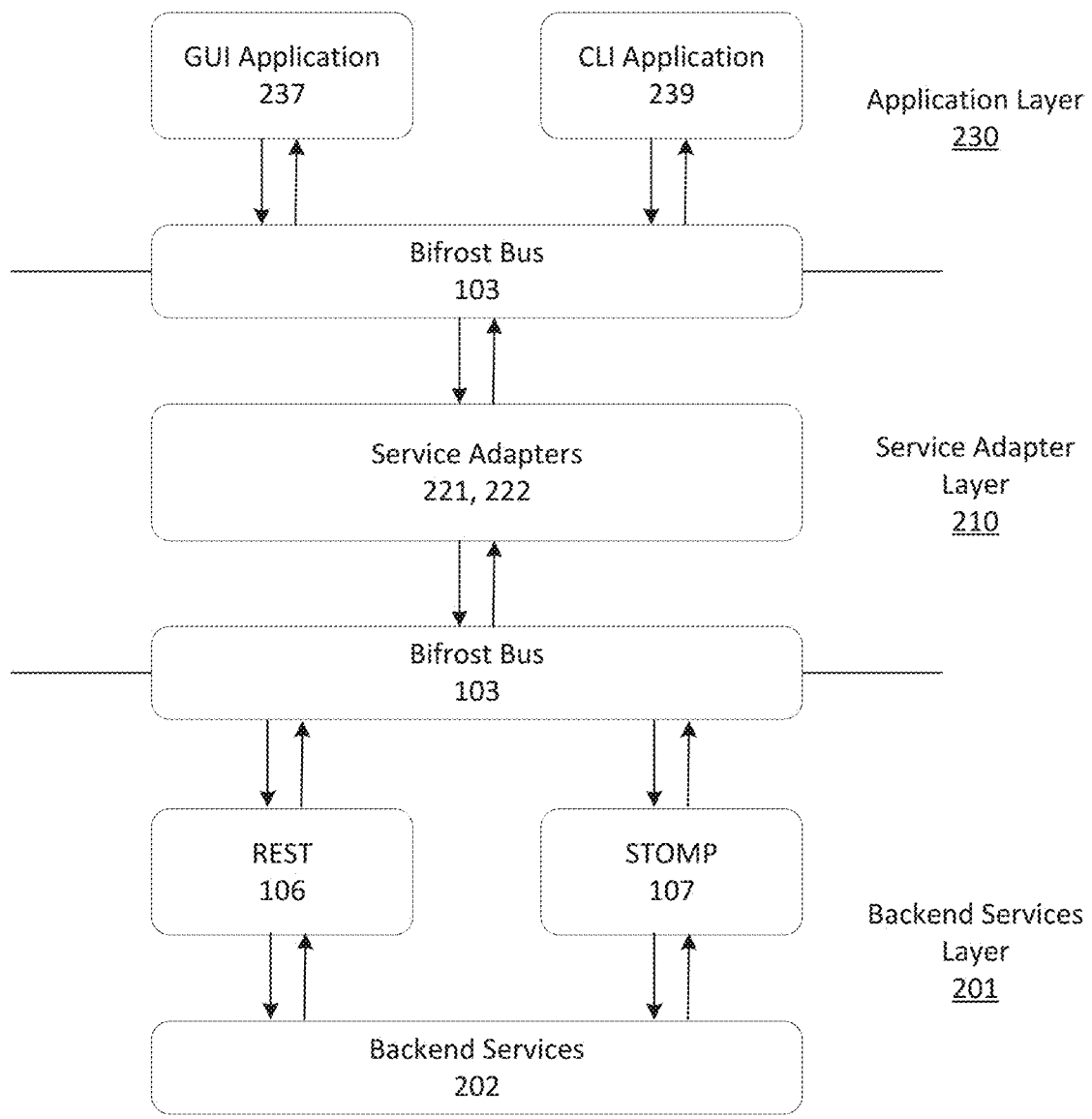
FIG. 1 depicts a flow diagram of the intent compiler distributed application architecture, in accordance with an embodiment.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included in the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data bits in a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "capturing," "filtering," "receiving," "applying," "requesting," "aggregating," "communicating," "maintaining," "transforming," "generating," "accessing," "performing," "identifying," "effectuating," "correlating," "utilizing," "determining," "updating," "displaying," or the like, refer to the actions and processes of an electronic computing device or system such as: a host processor, a processor, a memory, a software defined network (SDN) manager, a system manager, a hyper-converged appliance, a virtual storage area network (VSAN), a virtualization management server or a virtual machine (VM), among others, of a virtualization infrastructure or a computer system of a distributed computing system, or the like, or a combination thereof. It should be appreciated that the virtualization infrastructure may be on-premises (e.g., local) or off-premises (e.g., remote or cloud-based), or a combination thereof. The electronic device manipulates and transforms data represented as physical (electronic and/or magnetic) quantities in the electronic device's registers and memories into other data similarly represented as physical quantities in the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, perform one or more of the methods described herein. The non-transitory processor-readable data storage medium may form part of a computer program product, which may include packaging materials.

The non-transitory processor-readable storage medium may include random access memory (RAM) such as synchronous dynamic random-access memory (SDRAM), read only memory (ROM), non-volatile random-access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided in dedicated software modules or hardware modules configured as described herein. Also, the techniques could be fully implemented in one or more circuits or logic elements. A general-purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Terms

A compiler translates a language into a machine code.

A transpiler translates code from one language to another.

An Intent compiler takes a user's intention and compiles it into applications, services, components and operations.

Overview of Discussion

The disclosed Intent compiler automatically builds the lion's share of an application's data and infrastructure architecture. In one embodiment, it does this by employing some specific architectural principles and opinionated tooling, but in a universal and technology independent way.

The following technology improves the computers performance in building, development, and deployment, of a cloud application. By using the intent compiler, the development time of a cloud application is fundamentally changed from weeks and months to seconds and minutes.

This fundamental change in the development time of a cloud application, reduces the amount of computer-centric involvement in the cloud application development, including reducing the computer systems processing time, the length of time needed for memory allocation for the specific project (in a virtualized environment—where the cost of development is based on the amount of time that processors, storage, and the like are rented, including any short term increases in one or more of the computer system components), and the like.

As will be described in detail, the various embodiments of the present invention do not merely implement conventional processes on a computer. Instead, the various embodiments of the present invention, in part, provide a previously unknown procedure for application development, management, and evolution that operates beneath the surface to allow upgrades/changes to API's or the like to be indistinguishable to the user of the end product. In other words, to the client using the application, there would be little or no change in the presentation, structure, user operation, or presentation, even if underlying protocols have been updated, changed, switched to different protocols, or the like. In other words, changes at the lower layers will not affect expressions at the top or user layer.

Moreover, by using the disclosed intent compiler technology, the development time and requirements for the computer system to develop the cloud application are significantly reduced by s modifying the compiler's job to not only compile the code but also perform bug detection. As such, instead of simply receiving an error if the compiler cannot compile the code, the compiler will actively identify the error, modify the code such that the error is resolved and then continue with the compiling process.

Hence, embodiments of the present invention provide a novel process for Intent compiling which includes specifying a complete application with a handful of code, that reduces application generation time from days and weeks to hours and minutes, which is necessarily rooted in computer technology and which streamlines the application development, deployment, and management which significantly reduce computer operations and overall computer system performance requirements.

Operation

Speech recognition devices convert a user's spoken directive into operations (actions) to perform tasks or retrieve informational data.

An intent compiler is similar in concept to speech recognition, but is uniquely targeted at the software engineer, and the operations and data it generates will significantly reduce the task of developing both GUI and CLI applications.

In one embodiment, instead of verbal directives, as used by speech recognition device, the intent compiler consumes a variety of specification documents, separately and/or in conjunction with each other, and realizes the intent of the user. The intent compiler distills the essence of these specifications into a brief, high-level specifications, which are be communicated verbally to a speech recognition device to perform complex outcomes.

In one embodiment, intent compiler researches the latest technology shift in UI technologies. Ensure choices are compatible with existing stack & existing product(s). Maps out backend APIs required to meet UX demands. Negotiates API contract specifications with backend (if at all). Designs middleware to support APIs that cannot be managed or consumed directly. Maps out UI business logic required to support APIs. Maps out middleware business logic required to support orchestration/persistence. Maps out UI & middleware architecture and technology testing (e2e & unit). Maps out non RESTful standards into middleware (pub-sub/gRPC/graphQL etc.). Builds out UI and middleware foundations. Builds out UI and middleware business logic against shifting API contracts, and maintains it as it shifts.

In one embodiment, the intent compiler builds out every single line of business logic, models and interfaces for all APIs, and will also build the 'ready-to-modify' UI components, complete with mocks and unit tests.

Figure 2:
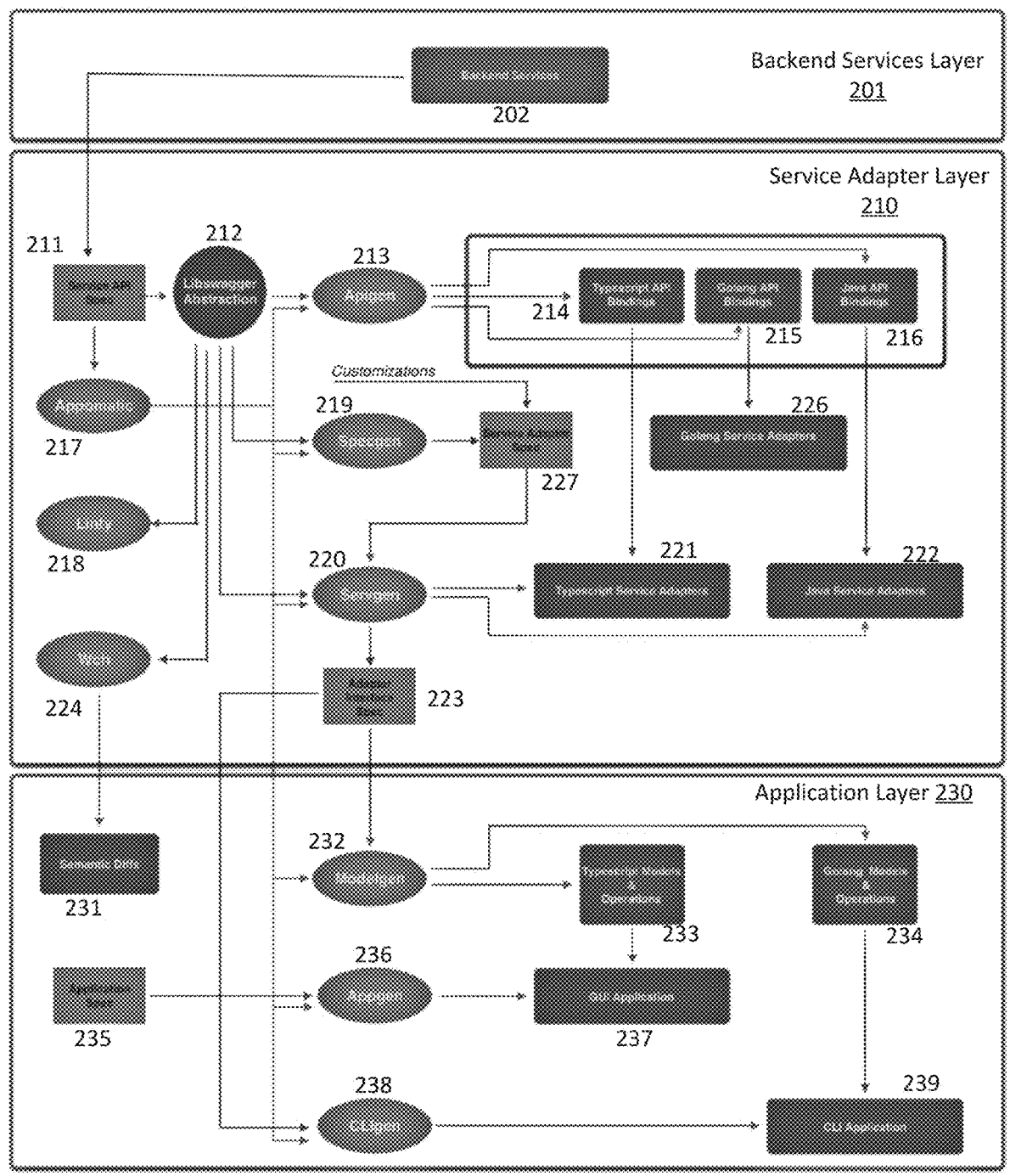
FIG. 2 depicts a flow diagram of the intent compiler components, in accordance with an embodiment.

In one embodiment, one or more of the components in FIGS. 1 and 2 and described in intent compiler architecture, read the specs and dynamically generate the code and even gives the developer stubs in places within the code where the developer can put in their customized code. Thus, the locations for any developer to insert specific customization.

In one embodiment, the customized code is encapsulated, e.g., the developer customized code is encapsulated as a specification. Once encapsulated, it can be ported, moved, placed in multiple locations, and the like, since it is implemented as an encapsulated specification which can then be identified as being the customized code to be inserted into the stub that is placed within the code.

For purposes of the discussion, a simple voice command example is provided to illustrate a cascading effect as it relates to a speech recognition device. In this example, a user states a voice command and the speech recognition device will provide a response/perform an act, etc. In this example, the voice command is, "Tommy, turn off the light".

The first step is to 'hear' the command, that is the voice command will start with a sound, word, and/or phrase that will cause the speech recognition device to begin actively listening. In this example, "Tommy" is the active listening word. Prior to the word 'Tommy' the speech recognition device was passively waiting and listening for the active listening word. Once the active listening word is identified, the speech recognition device will then listen for the follow-on statement, e.g., "turn on the bedroom light".

The specification, "Turn on the bedroom light" has a verb and a noun that are cascaded down to another level of specification that results in a command that turns the bedroom light on. The other levels of specification would include an ability for the speech recognition device to identify the appropriate light (which could be based on user location, object names, etc.), to communicate with the light (e.g., a smart light, smart switch, etc.), and finally to issue the command to the light to turn on.

In one embodiment, using a much more evolved and intricate manner, intent compiler includes high level specs, mid-level specs, and low-level specs. Although three levels are discussed for purposes of clarity, it should be appreciated that there may be more or fewer levels, one or more of the levels could include sub levels, expanded levels, and the like, such as shown in the figures and described herein.

In one embodiment, high level specs (e.g., backend service layer 201) define what the application is meant to do. In one embodiment, mid-level specs (e.g., service abstraction layer 210) define an abstraction for the service. In one embodiment, low level specs (e.g., application layer 230) define the actual service.

Regional Modifiers

In one embodiment, specification refers to the rules for a given object (e.g., a piece of code). In one embodiment, one or more of the specification rules are modified based on a given region. While the basic rules for the specification would be the same (e.g., GUI interface, organization, color codes, job performed, etc.), there will be stubs (or the like) in the specification for the importation of modifiers (e.g., a regional specific specification).

For example, a specification will import the modifiers, e.g., specificationW which includes a subset of rules defined for a Western region of the World. In another embodiment, the specification will import the modifiers, e.g., specificationE which includes a subset of rules defined for an Eastern region of the World.

One simple example is a date format portion of a scheduling specification for a user's schedule app. While the basic specification rules for the schedule app would be the same (e.g., GUI interface, organization, color codes, etc.), there will be stubs in the schedule specification for the importation of the region-specific modifiers defined in another specification. For example, specificationW would use the date format of month/day/year (e.g., 07/17/2021), while specificationE would use the date format of day/month/year (e.g., 17/07/2021).

Thus, in one embodiment, if a western user was using their schedule application, the specificationW would be called into the stub of the scheduling specification causing the date format to be month/day/year (e.g., 07/17/2021). In contrast, if an Eastern user was using the same schedule application the application would operate the exact same way except for the regional stub portions which would use the specificationE, e.g., causing the date format to be day/month/year (e.g., 17/07/2021).

Although a simple example is provided, it should be appreciated that the differences in the regional specifications may be based on one or more differences such as, but not limited to: languages, linguistic rules, political rules, economic systems, accepted terminology, differences in terminology, religious rules, environmental aspects, etc.

In one embodiment, the intent compiler is a specification driven environment with cascading specifications having increasingly finer levels of graininess. Where there are coarse grain specifications at the top, and finer grain specifications at the bottom.

In one embodiment, by having cascading specifications, a developer (or application writer) does not need to write an entirely new specification for an application but can instead focus on one or more of the different levels of finer grained specifications.

For example, an application writer would only need to be aware of (or focus) on specifications in the service abstraction layer 210 or application layer 230, while a backend writer would only be aware of the services in the backend service layer 201.

The following example is an embodiment of a developer using the intent compiler to generate a messaging application using stomp protocols. In one embodiment, each of the specifications are encapsulated. So, the intent compiler would obtain a high-level messaging application specification.

In one embodiment, at the point in the high-level messaging application specification that calls for a protocol type, there is a stub. That 'protocol' stub would indicate that the intent compiler would need to pull in (or otherwise identify/assign) a messaging protocol encapsulated specification to fill the stub. If there was no messaging protocol defined, in one embodiment, the intent compiler would use a generic messaging protocol encapsulated specification.

However, in this example, since the developer indicated that stomp protocols should be used, the stomp protocol encapsulated specification would be incorporated into the messaging application specification. In general, the stomp protocol encapsulated specification would include the appropriate API's and functionality (such as endpoints, parameters, responses, queries, and the like) required to perform the stomp messaging protocol.

Continuing with the above example, in one embodiment, there are one or more encapsulated specifications that include different rule sets that depend upon who is messaging whom. For example, a secure workplace messaging application would require an encapsulated specification defining the rules and specific requirements for secure workplace messaging. In contrast, a non-secure friendly chat application would use a default transmission encapsulated specification. In one embodiment, the secure workplace encapsulated specification could be a customized secure workplace encapsulated specification generated by the developer.

In one embodiment, at the point in the high-level messaging application specification that calls for any transmission security requirements, there is a stub. That transmission security stub would indicate that the intent compiler would need to pull in (or otherwise identify/assign) a transmission security encapsulated specification to replace the stub. If there was no transmission security protocol defined, in one embodiment, the intent compiler would use a default transmission encapsulated specification. However, since this example includes the requirement of a secure workplace messaging application. In one embodiment, the intent compiler would indicate that the customized secure workplace encapsulated specification should be used at the transmission security requirements stub.

Referring now to FIG. 1, a flow diagram of the distributed application architecture of the intent compiler 100 is shown in accordance with an embodiment. In general, the architecture of the intent compiler 100 embodies the modularization and abstraction of all its core components and a pipelined layout of their execution such that the output of one or more of its constituent components serves as the input for another, and together, the entire pipeline is the implementation of the Intent Compiler.

In one embodiment, the description separates the function of each component to not overlap that of another component. In one embodiment, utilizing a high degree of modularity within each component and between components has eased the development and maintenance of each component and prevented monolithic applications to be developed, thus avoiding constructs that are brittle and hard to maintain or enhance.

In one embodiment, the intent compiler 100 operates to create distributed applications such as a graphical user interface (GUI) application 237 and/or a command line interface (CLI) application 239, using a layout consisting of loosely-coupled distributed applications. In one embodiment, these applications are typically layered pieces, that are connected via asynchronous messages that support publish/subscribe protocols.

In one embodiment, Intent compiler 100 utilizes the Bifröst Message Bus and Data Store 103 to connect between the various parts of such a distributed application such as between backend services 202, service adapters 107 (such as 221, 222, and/or 226 described in further detail in FIG. 2) and the distributed applications such as GUI application 237 and/or CLI application 239.

In one embodiment, intent compiler 100 application architecture is visualized as being layered into 3 separate domains that do not share namespace with, or direct access to/from each other, and the implementation of each language supported, is inserted into the overall scheme through modules with strictly defined interfaces.

In one embodiment, each layer is implemented using different languages that themselves are implemented using a Plugin strategy. In one embodiment, the layer boundaries are delineated by the calls to the bifröst event bus 103. In general, the Intent compiler 100 produces and consumes artifacts in the application layer 230, and the service adapter layer 210, and only consumes API specifications document(s) from the backend services layer 201. However, in one embodiment, the architecture of the Intent compiler 100 also enables the creation of native services in the backend services layer 201.

In one embodiment, REST 106 and STOMP 107 represent two transport protocols used over websockets. However, it should be appreciated that in one embodiment, additional transport protocols such as protobuf, AsyncApi, GraphQL, and the like may also be used. The use of REST 106 and STOMP 107 are provided in an embodiment.

Referring now to FIG. 2, a flow diagram of the components of the intent compiler 100 is shown in accordance with an embodiment. In one embodiment, Intent compiler 100 employs a suite of components that are intended to be run sequentially, and using as input the artifacts from the execution of previous component(s), to provide their own unique artifact(s). This is analogous to how traditional compilers have front-end lexical analyzers, parsers, intermediate code, pre-optimizers, machine code generators, post optimizers, and linkers, each producing artifacts for the next stage. The final orchestration of these artifacts results in the production of an easily maintainable and enhanceable, loosely-coupled, distributed application, suitable for both GUI and CLI use cases.

In one embodiment, an initial specification 211 documents the API for accessing backend services. In one embodiment, specifications consist of either Swagger-2, or OpenApi-3 documents. In one embodiment, specification 211 include Protocol Buffers, GraphQL, and other protocols such as libAsyncApi (which is a superset of OpenAPI-3).

In one embodiment, the components of intent compiler 100 include Libswagger 212, Apigen 213, Wch 224, Specgen 219, Servgen 220, Modelgen 232, Appgen 236, Cligen 238, Appomatic 217, and Linty 218.

Libswagger 212

Libswagger 212 is an abstraction library. In one embodiment, Libswagger 212 converts the specifications into higher level models and operations. In one embodiment, the abstraction of specifications removes the need for the remaining Intent compiler components to depend on the details of the individual specifications, and instead work with the abstracted constructs.

In one embodiment, LibSwagger 212 gives the intent compiler the ability to parse a variety of specification documents and render them as abstractions for use by the various components of the compiler. These specification documents currently include Swagger-2.x as well as OpenAPI-3.x, and undoubtedly many others in the future, perhaps including protocol buffers as used by gRPC. The implementation of this strategy is LibSwagger 212, which is also the first stage of the Intent compiler 100's pipeline.

In one embodiment, the components of the intent compiler have been implemented using Golang, which is arguably the most appropriate language for writing tools that work in almost all major operating systems and hardware architectures, while providing a simplicity of design and enviable performance as compared to other languages, including the very convenient implementation of concurrency. Accordingly, the abstractions presented by LibSwagger 212 consist of Golang data structures (structs), and a rich set of functions.

Since the architecture consists of providing a distributed application framework, comprised of requestors and responders, and the mechanism for communications between them, the role of LibSwagger 212 is to describe the heart of operations and payloads between these parties. This can be grossly broken down into the following:

```
Metadata
    Document properties
Objects
    Classes
        Properties
        Enumerators
    Endpoints
        Request parameters
            Path parameters to modify the URI
            Query parameters to augment requests
            Body parameters as request payloads
        Responses
            Object payloads
            Base Type payloads
            Empty payloads
            Error objects
```

In one embodiment, the core of LibSwagger 212 is the parser, which consists of two pieces. e.g., a document parser which converts a specification document such as a Swagger 2.0 YAML or an OpenAPI 3.0 YAML into a JSON schema representation, and a secondary parser that converts the JSON schema into published abstractions that can be used by the intent compiler 100 compiler. LibSwagger 212 automatically determines whether a document is Swagger 2.0 or OpenAPI 3.0 and invokes the appropriate document parser.

In one embodiment, to invoke the parser by loading a document, the following piece of code can be inserted into a Golang application (tool):

```
package main
import (
    "fmt"
    "gitlab.eng.vmware.com/autogen/autogen-sources/libautogen/dsp"
    "gitlab.eng.vmware.com/autogen/autogen-sources/libautogen/util"
    "gitlab.eng.vmware.com/autogen/autogen-
    sources/LibSwagger 212/model"
    "gitlab.eng.vmware.com/autogen/autogen-
    sources/LibSwagger 212/parser"
    "os"
)
func main( ) {
    yaml :=parser.NewLoader( )
    if !yaml.Load("my-api-doc.yaml") {
        os.Exit(1)
    }
}
```

-continued

```
if yaml.Classes == nil && yaml.Paths == nil {
    os.Exit(2)
}
fmt.Printf("Loaded %s\n", yaml.Name)
for _, classIndex := range yaml.Classes.Classes {
    class := yaml.Classes.ClassMap[classIndex]
    if class.Container == "class"{
        fmt.Printf("Class: %s: %s ", class.Name, class.Container)
```

In one embodiment, the pointer loader allows for all pieces of the document to be accessed using the abstractions described below.

In one embodiment, the document loader produces an instance of the Yaml object for each document processed by the appropriate document parser (LibSwagger 212 only processes a single document at a time, but downstream components in the pipeline, such as Servgen 220 may maintain an array of these for each document processed). The document abstraction has the following layout:

```
type Yaml struct {
    Name            string
    ApiVersion      string
    ApiPlugin       ApiPlugin
    Source          string
    Schema          map[string]interface{ }
    Metadata        *Metadata
    Classes         *model.Class
    Paths           *model.Paths
    RawFile         [ ]byte
    IndexedFile     [ ]string
    SchemaWithLoc   map[string]interface{ }
}
```

In one embodiment, ApiVersion for each document is either Swagger 2.0 or OpenApi 3.0. In one embodiment, the ApiVersion for each document may be different than (or used in addition to) Swagger 2.0 or OpenApi 3.0. In one embodiment, schema is the JSON schema produced by each respective document parser. In one embodiment, the field is internally used by libswagger 212 and is not used by downstream components. In one embodiment, metadata, classes, and path are populated by each document parser. In general, classes is a collection of all models found in the document and paths is a collection of all endpoints in the document.

In one embodiment, LibSwagger 212 employs a plugin strategy that allows for additional document parsers to be added, while maintaining the same comprehensive set of abstractions for consumers of this library. These document parsers are usually external libraries (e.g. go-yaml/v3) with a thin wrapper to integrate their output into LibSwagger 212.

In one embodiment, the document parser plugin defines the following functions for each low-level parser library:

```
// Plugin for Api load handlers
type ApiPlugin interface {
    Loader(yaml *Yaml) error
    GetMetadata(yaml *Yaml) *Metadata
    GetClasses(yaml *Yaml)
    GetPaths(yaml *Yaml)
}
```

In one embodiment, all of the above functions constitute the plugin interface to the parser. Support for each new type of specification document involves implementing the above interface for it.

In one embodiment, the secondary parser defines the abstractions exported by LibSwagger 212 by operating on the JSON schema structures exported by the document parser.

The following struct describes the document metadata information exported by LibSwagger 212. In one embodiment, consumers should check pointers for nil and not expect every field to be populated as the document may not have provided them.

```
type Metadata struct {
    Version         string
    Title           string
    Description     string
    TermsOfService  string
    Contact         ContactData
    License         ContactData
    BasePath        string
    Extensions      map[string]string
    Consumes        [ ]string
    Produces        [ ]string
    Schemes         [ ]string
    Host            string
}
```

In one embodiment, OpenAPI 3.0 does not provide Base-Path, as there now may be several such paths. For backward compatibility, it is possible to take the first path from OpenAPI 3.0's servers schema as BasePath. However, in one embodiment, some, each or all API calls can have a different BasePath or enforce a policy where a YAML may only provide a single BasePath.

In one embodiment, the extensions are for vendor extensions (e.g. x-vmw-*) as they apply to the document and not to specific sections. An example of this is:

```
x-vmw-vapi-codegenconfig:
    package-name: com.vmware.vmc
    tag-resources-by-url-path: true
```

In one embodiment, an object is represented as either a class, enum, map, array, or string when defined under a label. In Swagger 2.0, a label can be definition or parameter, while in OpenAPI 3.0, it is a component. Irrespective of the specification origin, LibSwagger 212 creates abstract data structures for each of them. All of these are grouped under the collection class:

```
Type Class struct {
    Classes         [ ]string                              // Global class array in
dependency order -
index into ClassMap
    ClassMap        map[string]*Definition                 // Map of pointers to all classes
    Aliases         map[string]string                      // Map of classes which merely
$ref another
class (flattened $ref)
    EnumMap         map[string]*Enum                       // Map of pointers to all Enums
    DerivedClasses  map[string]string                      // A map back from every
derived class back to its parent
    PolymorphicMap  map[string]map[string]*PolymorphicChild  // map of
parent to all polymorphic children
    SourceMap       map[string]string                      // The original source of the
definition
    CircularRefs    [ ][ ]string                           // Every time a circular ref is
encountered, it is stashed here
}
```

In one embodiment, the classes field in the above is an array of all definitions, which are objects as described above. Enummap is a collection of all enum objects, irrespective of if they are of global scope (defined under a label) or of local scope to a class and property.

```
type Definition struct {
    Name              string                  // Base class
    Description       string                  // Description of class
    Container         string                  // not class, array, or map
    ContentType       string                  // Container type if not class
    ContentFormat     string                  // If this is a base type number
    ContentNested     string                  // Nested Container
    Discriminator     string                  // Name of property to discriminate
polymorphic children
    Extends           string                  // Parent class
    Required          [ ]string               // Required properties for this class
    RequiredMap       map[string]bool         // Map of required properties
    Extensions        map[string]string       // Vendor extensions for class
    Properties        map[string]*Property    // All properties for this class as a map
    PropertyList      [ ]*Property            // All Properties as a sorted array
    Enum              *Enum                   // Enumeration if this class is a string
    PolymorphicParent bool                    // This class is a polymorphic parent
    PolymorphicTarget string                  // This class is derived from a
polymorphic parent
    Dependencies      map[string]bool         // Set of classes that this class
depends on (parents and properties)
}
```

In the above, in one embodiment, container is the primary determinant of whether the definition is for either a class, enum, map, array, or string. In one embodiment, Content-Type is either another definition or a base type. However, data structures can be more complex involving containers, or even nested containers. Thus, a container value of map or an array may contain a nested array or map, as described by ContentNested.

In one embodiment, only one level of nesting is supported in LibSwagger 212 since such complex data structures are strongly discouraged in API definitions, while they are acceptable for code implementations. Thus, in one embodiment, the last level of nested containers is ContentType. Additionally, in one embodiment, container can be further qualified by ContentFormat, which can be date-time, int64, double, etc.

In one embodiment, properties and PropertyList are collections of properties for a class when container is class.

```
type Property struct {
    Name         string                // property name in class
    Description  string                // Description of property
    Type         string                // base type or class
    Format       string                // e.g. int32, int64, fouble, etc.
    Container    string                // Type qualifier
    Nested       string                // Nested container
    Enum         *Enum                 // Enumeration for property
                                       if not nil
    Extensions   map[string]string     // Extensions for property
    MetaFields   map[string]float64    // Minimum, Maximum values
}
```

In one embodiment, Enums appear in both the global Classes.EnumMap as well as in the local scope of a property as Property.Enum and have the following abstract structure:

```
type Enum struct {
    Class     string
    Property  string
    Enum      [ ]string
    EnumName  string
}
```

In one embodiment, class and property above are only populated when the Enum is locally-scoped to a class and property, in which case EnumName is synthetically created by concatenating the class name and the property name in PascalCase. Otherwise, EnumName is the definition label.

In one embodiment, all Enums are converted to string Enums with string values in the Enum array, and it is up to the consumer to convert them back to the original type if desired. The field names in the Enums are derived from the RHS values, thus XYZ_A-BC=>XyzABc. In one embodiment, when a value is numeric, it is prepended with numeric when constructing the LHS. Thus 1234=>Numeric1234 in the LHS.

In one embodiment, an endpoint collection is represented by a paths structure which contains all the endpoints (URI or Message channels) described in a document:

```
type Paths struct {
    PathArray          [ ]*Path
    PathMap            map[string]*Path
    PathEnumMap        map[string]*Enum
    ApiClassMap        map[string]*Path  // map API class name to path
    PathExtensionsMap  map[string]map[string]map[string]interface{ }
}
```

In one embodiment, both PathMap and PathArray are collections of all the path structures with one being optimized for sorted sequential access, while the other is for direct access to all path objects in the document. It is possible to enumerate the values for a query parameter to a path operation, and all the enumerations for these are collected in PathEnumMap. In one embodiment, each path structure has the following composition:

```
Type Path struct {
    Uri             string
    Description     string
    BasePath        string
    Schemes         [ ]string
    PathParameters  [ ]string
    ParameterRefs   map[string]string
    Operation       map[string]*PathOperation
    ApiClassName    string
    Dependencies    map[string]bool    // Set of classes that the
    methods in this path depend on
}
```

In one embodiment, the dependencies in the above is a map of definitions that are referred to in the parameters and responses, useful for constructing imports in downstream intent compiler 100 components. In one embodiment, PathParameters are used to programmatically construct the endpoint (URI) in downstream code generators, and are not the same as parameters used by each operation in the class. In one embodiment, ApiClassName is a mangled URI that is used by various pieces of intent compiler 100 as a handle to the URI as a legal variable in all supported programming languages.

In one embodiment, each path description also contains a map of operation structs with the operation name as key. In one embodiment, the supported operations are: get, Post, Put, Patch, and Delete.

In one embodiment, an Operation contains all the information associated with an API request (independent of transport), including method, request parameters, and response objects. In one embodiment, the data structure for this is:

```
// Information associated with each Operation, which includes the HTTP request, alias,
parameters, responses type PathOperation struct {
    ServiceName   string                  // service name from extension
    MethodName    string                  // method name from extension
    Extensions    map[string]interface{ } // Vendor Extensions
    OpName        string                  // e.g. Get, Put, ...
    OperationId   string                  // operation id
    Tags          [ ]string                // operation tags (not currently
used)
    Summary       string                  // Summary
```

```
    Description      string                    // Description
    ParamSequence    [ ]*Parameter             // lexically sorted parameter
sequence
    ParamMap         map[string]*Parameter     // parameter map
    Response         CommonType                // fully articulated response type
    ResponseMap      map[string]*CommonType    // response map
}
```

In one embodiment, ServiceName and MethodName are optionally present if the extensions x-vmw-appfabric-servicename and x-vmw-vapi-methodname in the document under this operation. In one embodiment, OpName is one of Get, Post, Put, Patch, and Delete.

In one embodiment, sequence is an array of parameter names for this operation that is used to enforce a strict sequencing of provided parameters from downstream components, irrespective of programming language, to help with type checking. In the current implementation they are lexically sorted.

In one embodiment, parameters refer to a map of all parameters (except path parameters) that are used in this operation, keyed by parameter name. IsArray IsMap, and, IsNested are used to describe the containers and nesting for responses to the operation, keyed by parameter name. In future, they may all be extracted into a separate parameter data structure.

In one embodiment, all successful responses from a responder are described by a CommonType data structure:

```
type CommonType struct {
    Container    string
    Reference    string
    Description  string
    Nested       string
    Type         string
    Format       string
    Enum         [ ]interface{ }
    OneOf        [ ]string
}
```

In one embodiment, as is consistent with other data structures described herein, Type/Format along with container and nested define the response payload.

Apigen 213

Apigen 213 is a language bindings generator. In one embodiment Apigen 213 converts an API specification document that has been abstracted above, into models and operations in a multitude of programming languages.

In one embodiment, once they are converted into a programming language, they can then be imported by service adapters 107 such as typescript service adapters 221, Java service adapters 222, Golang service adapters 226, or the like to construct the interface between higher level applications and backend services 202.

In one embodiment, the role of Apigen 213 is to translate supported API specification documents into intent compiler 100 specific bindings in a number of supported programming languages to be manifest as models and operations. This component is also the 2nd stage of the compiler's pipeline.

In one embodiment, the output from Apigen 213 can grossly be described as belonging to two categories of abstractions: models and operations. Models are pure data structures, while operations are data structures and methods associated with the execution of API requests and their corresponding responses. Models are categorized under Classes below, while operations are grouped under API Classes.

The following describes each piece of output from Apigen 213 in accordance with an embodiment. In one embodiment, the core of Apigen 213 only deals with abstract data structures and operations, such as, classes API Classes, etc., whereas the specifics of code generation and layout are completely in the purview of language plugins.

A class abstraction in Apigen 213 is the same as in most OOP languages, e.g., a blueprint for instantiating a data structure and initializing its state, along with methods to access or manipulate that state (functions). In Typescript and Java Apigen 213 creates a class object, while in Golang it creates a struct with interface methods. In one embodiment, all classes constructed by Apigen 213 contain one or more constructors, depending on the language plugin, with an optional JSON object as argument to it.

In one embodiment, the class constructor is responsible for serializing/deserializing the JSON object, if provided, into data types that make sense for a specific language plugin. In Typescript JSON, is part of the language, whereas in Java the language plugin uses GSON to perform serialization and deserialization of JSON objects.

In one embodiment, a class name is constructed from the original name in the specification, prepended with the string Base, unless an alternate prefix was specified with the -namespace option to Apigen 213.

In one embodiment, classes usually have properties (and Apigen 213 warns if it doesn't), as empty classes are only useful in rare situations. It is the responsibility of the class constructor to convert the properties within the class to their appropriate data types. A property may be an instance of another class, in which case, it is the responsibility of the constructor (or the like) to instantiate the class specified in the property and initialize its state from the appropriate segment of the optional JSON argument. In one embodiment, each such class that is instantiated in a property, may itself have properties that are class instances, and so the initializing of the properties may require recursion to arbitrary depths.

In one embodiment, it is possible in rare cases for a bad YAML specification to cause infinite recursion, eventually crashing Apigen 213, so in one embodiment, the YAML files should be verified for validity before being processed by the intent compiler 100.

In one embodiment, maps and arrays are abstract containers with arbitrary content. The abstraction allows for the content itself to be a container that is either a map or an array. When a container contains another container, of either type, the contained container is termed a nested container.

In one embodiment, the intent compiler 100 only permits a single level of nesting, e.g., the content of the nested container should not be another container. Instead, it should be a class, enum, or a base type (e.g. string, int, etc.). This is inherent in the design of the intent compiler 100 which discourages the creation of bad APIs. In one embodiment, using complex data structures as an API simply because that is how it is implemented in the responder is bad practice and the data structures used in an API have no requirement to be identical to the data structures in the implementation, and should be as simple as practical.

In one embodiment, the Typescript plugin converts JSON object pairs that implement an unordered dictionary into ES6 Map classes when received as responses to API requests. Similarly, an ES6 Map is converted back to a simple JSON dictionary when passed as a parameter to an API request.

In one embodiment, both Swagger 2.0 and OpenAPI 3.0 allow for instances of strings in the specification to be enumerated for valid values thereof. These enumerations can be defined in the global scope, e.g., the enumeration may be used in multiple instances, including as property references, parameter references, and even specific kinds of parameters passed to API requests as well as responses, that too, are strings. In one embodiment, they may also be in the local scope of a property within a class, which means that they are anonymous, and hence, inaccessible from outside that scope.

In one embodiment, when an Enum is in the global scope, its name is unchanged from the one provided in the specification YAML. However, since Enums in the local scope are anonymous, in one embodiment a name is synthetically created for them by concatenating the name of the class with the name of the property and reformatting in PascalCase. In one embodiment, for the enumerated values themselves, both for Enums in the global scope and those in the local scope, the LHS of each enumerated value is constructed by mangling the RHS and formatting using PascalCase. In one embodiment, special characters such as hyphens and underscores are removed from the LHS. In one embodiment, special characters such as hyphens and underscores are left unchanged in the RHS.

In one embodiment, intent compiler 100 only handles String Enums. All other forms of Enums are converted to String Enums. When a numeric Enum is converted to a String Enum, the LHS of each field is comprised of a PascalCase mangling of the RHS, prepended with the string Numeric. For languages that do not support String Enums, it is up to the language plugin to provide an alternate mechanism as appropriate. In one embodiment, such as Golang for instance, Enums are implemented as constants.

In one embodiment, an API class is an abstraction to an API request and is agnostic of the transport for such requests. This class must be instantiated before generating a request to a responder, and is usually destroyed once the request completes. In one embodiment, applications do not have direct access to API calls, and as such, the API class is only accessible from a service adapter 107 such as service adapters 107 or the like.

In one embodiment, the name of the API class is synthetically created by mangling the endpoint of the API request. This allows for ease of programmatic access from the service adapter. The following is an example of an API Class generated by the TypeScript plugin with a description of the details for the API endpoint:

```
// *** URI: /auth/token
export class API_AuthToken<T> {
    public readonly uri: string;
    constructor( private apiBridge: Function,
                 private apiObject: T,
                 private messageArgs: MessageArgs | undefined) {
        this.uri = '/vmc/api/auth/token';
    }
    /**
     * getAuth( )
     * Get the current users auth token.
     *
     * Operation: Get
     *
     * @param successHandler Function Handler for API response
     * @param failureHandler Function Handler for API failure
     * @response BaseAuthToken
     */
    public getAuth(successHandler: Function, failureHandler: Function) {
        const _body =
        const apiResponseHandler = (apiObject: T, responseJSON: any, args?:
            MessageArgs) => { successHandler(apiObject, new BaseAuthToken
            (responseJSON), args);
        };
        this.apiBridge(this.apiObject, 'GET', this.uri, _body, apiResponseHandler,
            failureHandler, 'API_AuthToken', this.messageArgs);
    }
}
```

In one embodiment, when an API Class is instantiated, one of the arguments to the class constructor is a reference to a function (lambda) called the API Bridge that is responsible for the transport of the request to the endpoint for this API Class, through the Bifröst messaging system (e.g., bifröst bus 103). In one embodiment, the interface to the API Bridge in Typescript is:

```
type ApiFunction = (apiObject: ApiObject<any, any>,
                    httpOp: string,
                    uri: string,
                    body: any,
                    successHandler: SuccessHandler,
                    failureHandler: ErrorHandler,
                    apiClass: string) => void;
```

In one embodiment, it should be noted that the arguments to the API Bridge are agnostic as to whether the transport mechanism employs REST, gRPC, Bus Messages, or some other means, and the endpoint, method, and payload contain everything necessary to make the API request.

In one embodiment, response from the API request are returned to the calling service adapter 107 using the provided SuccessHandler function (lambda) or the ErrorHandler.

In one embodiment, the API Object is an abstraction for attaching information to the API request that is passed through various functions and lambdas in order to respond to the original caller to the service adapter 107 when the request is completed or fails. In one embodiment, this includes the original request object and a template for the response object to/from the service adapter 107 making the API request, back to the service requestor.

In one embodiment, each API Class will have one or more method to perform an operation and receive and process a response from that operation, before returning a (transformed) response to the calling service adapter. In one embodiment, each method is also provided a SuccessHandler and an ErrorHandler, which are created by the service adapter 107 and are different from the handlers that are encapsulated in the above API Object which are handlers provided by the service requestor to the Service Adapter.

For the REST transport, the methods GET, POST, PUT, PATCH, DELETE, and the like, each have their own method. In one embodiment, http is prepended to the method name by default, irrespective of whether the transport uses REST. So, for example, In one embodiment the GET method is named httpGet( ). In one embodiment, more readable names can be ascribed to the methods with the use of extensions. The above API_AuthToken method httpGet( ) can be renamed to getAuth( ) by providing the following two extensions:
x-vmw-vapi-methodname: get
x-vmc-ui-servicename: auth In one embodiment, it is the responsibility of each method to transform the input parameters to it into the form expected by the responder, as well as transform the response from the responder into a form that is consumable by the implementation language of the requestor, as well as the implementation language of the service adapter.

In one embodiment, if the TypeScript language plugin is in use, with at least one exception, there are no conversions necessary before passing the parameters to the method on to the API Bridge, as Typescript classes are merely JSON objects with some metadata. One exception is an ES6 Map object which, when provided as a parameter to the method, should be converted to a simple JSON dictionary before providing it to the API Bridge.

If, however, the Java language plugin is in use, in one embodiment no such transformation takes place, and the parameter is passed on unchanged to the API Bridge. The transformation boundary for such transformations is moved up to the Modelgen 232 component in the intent compiler 100 pipeline for the latter case.

In one embodiment, every API call has a response, including one with no payload. For legacy reasons and/or to avoid de-referencing null objects, in one embodiment, when no payload is included with a response from the responder, the method creates an empty object with no properties for return to the requestor. Similarly, if an object with properties is returned, and if any of the object's properties are references to other objects, but are null in the response payload, then an empty object is created in the constructor of the response object for each such property. To prevent this behavior, the --no-null-object option may be provided to Apigen 213.

In one embodiment, it is the responsibility of the method to transform any response object into a language-specific class or struct as appropriate for the specific language plugin. In one embodiment, this is done by instantiating the target class and passing it the JSON response as argument to its constructor. The target class is then responsible for recursively invoking the constructors of each of the classes that are referred to by their properties. As such, in one embodiment, it is the responsibility of each such class constructor to serialize/deserialize the passed JSON argument into the target language-specific classes.

In one embodiment, the request to an API may result in a polymorphic response.

It is common for an API response to contain one of several object types (classes), and so a grouping of these types involves a parent type (class) from which all of these various objects can be derived. Because the specific type (class) of the response object is dynamic, such responses are termed Polymorphic.

In one embodiment, in order for Apigen 213 to know which class constructor needs to be invoked to instantiate a class for the response object, there are a number of strategies that can be employed. These strategies include, but are not limited to, using VMware extensions, using "oneOf" hints, and the like.

In one embodiment, VMware extensions have a property named Discriminator in all cases, and this property is a string containing the name of a property in all of the derived children classes to which polymorphism can apply. This named property, then, is a required property in the children classes and is also a string.

In one embodiment, the children classes each expose the discriminant for their respective type by announcing the string value that is contained in that property for their respective class by using the following extension:
x-vmw-vapi-discriminated-by: "Some String Value"

Then, the method can dynamically test the response from the API request, and depending on the value of the discriminant property, instantiate the corresponding class. By default, if an appropriate child class matching the provided property value is not found, then the parent class is instantiated with the response JSON to its constructor.

In one embodiment, using "oneOf" hints is a strategy that does not require VMware extensions. Basically, the OpenAPI oneOf directive is used to specify an array of classes that can be a response from an API call, all of which should be derived from the same parent class, however, no special properties are required in any of those classes. At runtime, the method uses mechanisms like reflection to dynamically determine the type of the response and instantiate the corresponding class.

In one embodiment, a language plugin implements a set of interfaces that converts the abstract data structures provided by the core of Apigen 213 into language-specific code that can be consumed by the service adapter.

In one embodiment, the plugin data structure contains information sufficient to implement a language plugin, which includes the abstract specification for one, some, most, and/or all models and operations, a pointer to the code generator for the specific plugin, an open file pointer to the output file, and other miscellaneous data.

```
type Plugin struct {
    Plugins   map[string]Code
    Codegen   Code
    Spec      *yaml.Yaml
    Metadata  *parser.Metadata
    File      *dsp.Fileio
```

-continued

```
   Suffix      string
   EnumMap     map[string]bool
}
```

In one embodiment, a language plugin implements a very small set of interfaces described below:

```
// In order to be a Codegen plugin, it must provide the following
interfaces
type Code interface {
   MapDataTypes( ) map[string]string
   FileSuffix( ) string
   EmitImports(*Plugin)
   GenerateModel(plugin *Plugin, class string)
   GenerateEnum(*Plugin, *model.Enum, string)
   GenerateApiClass(*Plugin, *model Path)
}
```

In one embodiment, the MapDataTypes( ) map[string] string interface returns a mapping of OpenApi data types to data types supported by the language plugin. The abstractions within the core Apigen 213 use the OpenApi data types, while the language plugins use data types specific to their respective languages.

In one embodiment, the FileSuffix( ) string interface returns the filename suffix that is used by a language plugin. e.g. the plugin for Typescript returns the string .ts, while the one for Java returns the string .java, etc. These are used to construct class files by the core Apigen 213.

In one embodiment, the EmitImports(*Plugin) interface is a hook that a language plugin can use to emit a block of external imports, including other language-specific preambles such as tslint: disableA copyright block is also automatically generated by invoking this interface.

In one embodiment, a language plugin should implement the GenerateModel(plugin *Plugin, class string) interface in order to convert all the abstract classes from the core of Apigen 213 into classes specific to that language. In one embodiment, the core Apigen 213 takes care of creating, opening, and closing the appropriate output file(s) and providing the plugin with an abstract handle to the file to produce output in a way that is consistent with all other plugins.

In one embodiment, a language plugin should implement the GenerateApiClass(*Plugin, *model.Path) interface in order to convert all the abstract API Classes, Methods, Parameters, and Responses, from the core of Apigen 213 into data structures specific to that language. In one embodiment, the core Apigen 213 takes care of creating, opening, and closing the appropriate output file(s) and providing the plugin with an abstract handle to the file to produce output in a way that is consistent with all other plugins.

The following is a detailed description of how to invoke Apigen 213 (for purposes of clarity, obsolete and deprecated options have been excluded):

Usage: apigen <options> <YAML prefix>

| Option | Description |
| --- | --- |
| -b <path> \| --root=<path> | This option declares the absolute path to the root of the Project directory. In one embodiment, subsequent location specifications are relative to this root path. For example, in one embodiment, if this option is skipped, Apigen defaults to ${HOME}/ui for historical reasons. Path specifications may include the ~ character which will be replaced by the HOME folder of the invoking user, or ~<user>, which will be replaced by the HOME folder of the specified <user>. |
| -d \| --debug | Used by Apigen developers to emit debug output. |
| -e <YAML prefix> \| --extern=<YAML prefix> | Many of the YAML specifications prevalent at VMware use partial object definitions with the intent that a more authoritative definition is to be obtained from another YAML. Examples of this behavior include the definition of the Task class and Sddc class, that are both authoritatively defined in vmc-api-doc.yaml, but has partial definitions in other YAML files (e.g. vmc-draas-api-doc.yaml). When this option is specified Apigen 213 does not emit any definition for object names that are duplicated in the authoritative YAML (in this case vmc, without the suffix) and instead, issues import declarations (in the respective output language) for those duplicated objects from their definition in the authoritative YAML. |
| -F \| --force | In one embodiment, this option is ignored by Apigen 213 and is provided for consistency with all the other components in the intent compiler 100. In one embodiment, this flag is provided to an intent compiler component (e.g. Servgen 220, or Specgen 219) to permit them to overwrite a file that is otherwise customizable (and therefore, not normally overwritten). |
| -h \| --help | Displays all the options recognized by Apigen. |
| H localhost \| --host=localhost | This option is used to override the host specification in the API Specification document with an alternate one, typically during development. An alternate strategy is to use a proxy configuration file. |
| -l <typescript \| java \| go> \| --language=<typescript \| java \| go> | This option is used to specify the language plugin to be used for the output from Apigen. Plugins include, but are not limited to: typescript, java, go, and the like. |
| -m \| --models-only | In one embodiment, Apigen generates code for Classes/Enums as well as API Classes/Methods. Specifying this option suppresses the generation of API Classes/Methods and only generates Classes/Enums (definitions). This is useful when testing a new language plugin before all the pieces have been implemented. |
| -n \| --namespace=<prefix> | This option prepends a prefix to every class definition output by Apigen. If this option is not provided, Apigen defaults to using Base as that prefix. The purpose of this is to rename the class names sent by a responder and preserve that intact, while deriving a new class from this base class by the application, and delineates the boundary of immutability of the original class. |

-continued

| Option | Description |
|---|---|
| | In one embodiment, references to this base class may only be permitted from Service Adapters, instead of from the application itself. In one embodiment, however, the application may access the derived class[es] provided by Servgen, which automatically generates the children of this parent base class, while the base class output of Apigen is only accessible from within the Service Adapter and may be in a language that is different from that of the application. |
| -N \| --nohasRequired Property | For historical reasons, every class emitted by Apigen has a method called hasRequiredProperties( ) which checks that a fully populated class has all the properties that are marked as required. There are a number of legacy components in VMC that invoke this method procedurally from the Application Layer - something that may not be possible once the Service Adapter Layer is detached from the application. In one embodiment, if VMC is refactored to remove such references, this option will be turned on by default. |
| -O \| --optional-flag | In one embodiment, Apigen does not normally respect whether a property is optionally present in a class, and defines all properties from the YAML. However, in some cases, this can have an undesirable side effect for consumers that check for the presence of these optional properties and make decisions based on their absence. Specifying this option removes these optional properties if no data is provided for them in the response to an API request. |
| -o <output filename or folder> \| --output=<output filename or folder> | When the --single-file option is provided to Apigen then the --output flag is used to provide the filename where the output will reside. Alternatively, if --single-file is not specified, then --output specifies the full path of a folder where class files will be created. If the folder doesn't exist, it will be created. See the example invocations below. |
| -p <relative path> \| --apiDir=<relati | In one embodiment, this option is important and specifies the path of the API folder, relative to the project root specified using --root above. The API folder is the location where both YAML files and default output files (e.g. *-api.ts) reside. In one embodiment, this option is mandatory. |
| -P <package name> \| --package=<package name> | For languages that use packages, e.g. Java, Go, etc., this specifies the package name to insert in the output file(s) as it is not always possible to infer the package name from the output folder's path. |
| -R <YAML: class prefix> --renameyaml=<YAML: class prefix> | In one embodiment, since there is no central repository for YAML files, sometimes the same name is used in more than one file, causing a name collision for Intent Compiler 100 components like Servgen 220 that simultaneously operate on multiple YAML files within the same namespace. The --rename-yaml option. specifies the prefix of a YAML file separated from a string by a colon ":" that is then prepended to every class name in the specified YAML. For example, a class named Message exists in both vmc-api-doc.yaml as well as ngw-api-doc.yaml but they are not the same object. To resolve this name collision, --rename-yaml=ngw:Ngw prepends Ngw to every class in ngw-api-doc.yaml, so that Message is renamed to NgwMessage in ngw-api-doc.yaml, while leaving Message unchanged in vmc-api-doc.yaml, thus avoiding the name collision. |
| -S \| singlefile | In one embodiment, when this option is selected, all the output from Apigen is sent to a single file, including all models and API classes with their respective methods. If this option is skipped, each Class, Enum, and API Class is created in its own file, with the file name being the same as the Class/Enum it contains. In one embodiment, the latter requires that the --output option above be used to specify the folder in which these Class files will be created. In one embodiment, this option is provided for Typescript, and is not provided for Java. |
| -s <YAML suffix string> \| --suffix=<YAML suffix string> | In one embodiment, such as when LibSwagger 212 processes either Swagger 2.0 or OpenApi 3.0 files, they are expected to have the common suffix pattern for YAML files at VMware: *-api-doc.yaml (e.g. vmc- api-doc.yaml). In anticipation that LibSwagger will, in future, process a diversity of specification files, e.g. Protocol Buffers (.proto) ), this option allows for an alternate suffix to be specified for them. In one embodiment, Apigen 213, and, one, some, or all, of the intent compiler 100 components rely on the pattern of the input files in order to create output files. Consequently, vmcapi-doc.yaml would allow a file called vmc-api.ts to be autogenerated. |
| -u \| --full-uri | In one embodiment, without this option, Apigen will only present the path portion of the API endpoint to the APIBridge. This is a required option for the Java version since the Java APIBridge requires a fully formed URI including the scheme and host obtained from the API Specification document. |
| -V \| --version | Displays Apigen version. |
| -v \| --verbose | Used by Apigen developers to emit verbose level output. |
| -w \| --nowarnings | This option suppresses warning from Apigen (not recommended, except while debugging, and overwhelmed by a stream of warnings). |
| -x \| --nonullobject | In one embodiment, when an API call returns nothing (illegal, as an API should always return an object), Apigen creates an empty object and returns that. Sometimes, it is preferable in legacy code not to have anything returned (e.g., undefined) rather than a null or an empty object, and this flag specifies doing just that. |

Example Use:

In one embodiment, for example, VMC UI using Typescript with vmc-api-doc.yaml:
apigen -b ~/ui -p src/services/api -R ngw:Ngw --single-file --output="vmc.api.ts" vmc In one embodiment, for example, AppFabric sample using Java with vmc-api-doc.yaml:
apigen -l java -o ~/appfabric/java/src/main/java/samples/api/vmc \
   -P     samples.api.vmc     -p     src/main/java/samples/api -b ~/appfabric/java vmc Specgen 219

Specgen 219 is a specification generator. In one embodiment, Specgen 219 takes an API specification document 211 and produces service adapter specification document(s) 227 for use by downstream Intent compiler components. In one embodiment, the service adapter specification document(s) 227 generated by Specgen 219 can be customized and augmented by an engineer and is one of the inputs to the service adapter generator.

As will be discussed in the section related to Servgen 220, the Specgen 219 understands its own set of specification documents, called service adapter specification documents 227, in addition to the API Specification documents 211 provided by the backend services 202.

In one embodiment, prior to the invention and implementation of Specgen 219, generating service adapter specification documents for Servgen 220 was a manual (and often tedious) process. However, by using Specgen 219, the monotony of this process can be greatly alleviated, and in some cases, totally eliminated. Additionally, there are configuration files used by Modelgen 232 and Appgen 236, and the effort for their creation can also be alleviated or eliminated by using Specgen 219.

In one embodiment, Specgen 219 is a powerful tool for starting a new project as it automatically generates service adapter specification documents 227 just by scanning an API specification document, which can then be tailored as desired. In one embodiment, Specgen 219 is also used to augment existing projects when new API Specification documents are added.

In one embodiment, Specgen 219 scans the provided API Specification YAML and creates service adapter specification documents 227. In one embodiment, if Specgen 219 encounters x-vmware-service-name in the API specification document, it will attempt to group all APIs with that extension under a single Service Adapter Specification. The specifications contain service adapter 107 requests for all the API calls encountered in the API specification document 213. Application developers may want to discard API calls that they do not use. Additionally, in one embodiment, Specgen 219 creates specifications for every Enum encountered in the API specification document.

In one embodiment, using the --proxy option, Specgen 219 will create a proxy.config.json file, using host port, and the most secure, scheme from the specifications in the API Document.

Finally, Specgen 219 creates a component specification document 235 for use by Appgen 236 which references one, some, or every service adapter 107 from the component(s). These should be regarded as a starting point and it is expected that the specifications will be massaged by the developer according to need.

The following is a detailed description of how to invoke Specgen (obsolete and deprecated options have been excluded):

specgen [-dDFhPrStUvVw] [-a "@vmc"] \
   [-b ${HOME}/ui] [-C "~/ui/src/components"] [-c "~/ui/src/config"] [-e "vmc"] \
   [-G Calendar:Time] [-l typescript | java] [-n Base] [-p<YAML folder>] [-R ngw:Ngw] [-s src/services] \
   [-u ${HOME}/ui] [-y "-api-doc.yaml"] [parameters . . . ]

| Option | Description |
| --- | --- |
| -a, \|--alias="@vmc" | Typescript only. Specifies a shortcut alias to be used for imports. |
| -b <path> \| --root=<path> | This option declares the absolute path to the root of the Project directory. Most subsequent location specifications are relative to this root path. In one embodiment, if this option is skipped, Specgen defaults to ${HOME}/ui for historical reasons. Path specifications may include the "~" (tilde) character which will be replaced by the HOME folder of the invoking user, or "~<user>", which will be replaced by the HOME folder of the specified <user>. |
| -C \| --appcomponent | Typescript/Angular only. Autogeneration of app/app.component.ts for the component with auto-instantiation of references to operations for all used services and inheritance chains. In one embodiment, if the file already exists, -F \| --force will be required to overwrite it. |
| -c <path> \| --config-dir=<path> | This option specifies the path to the directory where the Application Configuration Documents reside. In one embodiment, this is an absolute (not relative) path to the folder. |
| -d \| --debug | Used by Specgen developers to emit debug output. |
| -F \| --force | This option is used to specify that even customized files will be overwritten on execution. Use with caution. This is mainly for use by developers. |
| -H \| --app-html | Typescript/Angular only. Autogeneration of app.component.html for the component with its selector. If the file already exists, -F \|--force will be required to overwrite it. |
| -h \| --help | Displays all the options recognized by Specgen. |
| -i <path> \| --interface-dir=<path> | This option specifies the path to the directory where the Service Adapter Interface Documents from Servgen reside, relative to the project root. |
| -l "typescript" \| --language="typescript" | This option is used to specify the language plugin to be used for the output from Specgen. Language plugins include: typescript, java, and the like. |
| -n \| --not-vmc | In one embodiment, projects other than VMC-ui should use this flag to prevent the inclusion of TestUtil and UserUtil in autogenerated tests. |

| Option | Description |
| --- | --- |
| -O "src /components /abstractions" \| --components-dir="src /components /abstractions" | This specifies the path to the root of the output folder where abstract parents for components that only use a single service reside. In one embodiment, when a component uses more than one service, a combined services abstract parent is autogenerated in the components folder. |
| -o "src /components" \| --components-dir="src /components" | This specifies the path to the root of the output folder within which sub-folders for each component will be autogenerated. |
| -R <YAML: class prefix> --renameyaml=<YAML: class prefix> | In one embodiment, if there is no central repository for YAML files, sometimes the same name is used in more than one file, causing a name collision for intent compiler 100 components like Apigen 213 and Servgen 220, that simultaneously operate on multiple YAML files within the same namespace. In one embodiment, the --rename-yaml option, specifies the prefix of a YAML file separated from a string by a colon ":" that is then prepended to every class name in the specified YAML. For example, a class named Message exists in both vmc-api-doc.yaml as well as ngw-api-doc.yaml but they are not the same object. To resolve this name collision, one embodiment, e.g., --rename-yaml=ngw:Ngw prepends Ngw to one, some, or every class in ngw-api-doc.yaml, so that Message is renamed to NgwMessage in ngw-api-doc.yaml, while leaving Message unchanged in vmc-api-doc.yaml, thus avoiding the name collision. In one embodiment, multiple YAML/Class pairs can be specified by separating them with the "&" character (be careful to use escapes to prevent shell interception). |
| -r \| --recover | Used by Specgen developers to continue processing even when a fatal error is encountered. |
| -t \| --trace | Used by Specgen developers to emit trace level output. |
| -V \| --version | Displays Specgen version. |
| -v \| --verbose | Used by Specgen developers to emit verbose level output. |
| -w \| --no-warnings | This option suppresses warning messages from Specgen (in one embodiment, it is not recommended, except while debugging, and/or overwhelmed by a stream of warnings). |

Example Use:

For example, AppFabric Java sample using VMC YAML specgen -l java --alias=@vmc --config-dir=~/appfabric/java/src/main/java/samples
/config -p src/main/java/samples/api \
    --root=~/appfabric/java     --service-dir=src/main/java/samples/services vmc Servgen 220

Servgen 220 is a service adapter generator. In one embodiment, Servgen 220 reads both the API specification document(s) 211, as well as the service adapter specification document(s) 227, and produces one or more service adapter(s) 107 (e.g., adapters 221, 222, and/or 226), which, in conjunction with the language bindings produced by the API bindings generator, Appgen 236, may orchestrate and consolidate one or more backend service(s) 202, or define a custom service of its own, independent of any backend services. In one embodiment, Servgen 220 produces a spec of its own for each service adapter, which describes the details of interacting with each service adapter. In one embodiment, a service adapter interface document 223 is created for each service adapter.

In one embodiment, servgen 220 performs tasks such as, but not limited to, service adapter specification document(s), automatic unit test generation, autogenerating store operations, customizing classes, customizing service adapters, and intercepting service requests and responses.

In one embodiment, service adapter specification document(s) 227 include documents such as, service.json, exports.json, imports.json, enums.json, classes.json, maps.json, sets.json, arrays.json, mocks.json, and testing.json.

Servgen is the heart of the intent compiler 100 and is its most sophisticated component. This engine transforms an intent into a service adapter 107 that decomposes the intent into a set of requests with responses on the Bifröst event bus 103. These service adapters 107 completely abstract backend services 202, and may even orchestrate across multiple backend services in order to respond to a request from an application.

In one embodiment, Servgen 220 consumes: one or more API Specification documents 211 through LibSwagger 212; one or more service adapter specification documents 227, produced manually or via Specgen 219; runtime language bindings generated by Apigen 213 in several languages; a collection of bifröst abstractions that all service adapters 107 are derived from or use; and the like.

In one embodiment, Servgen 220 produces: a service adapter 107 for each service adapter specification; a service adapter interface specification document for each service adapter; an autogenerated Mock service adapter 107 for testing; an autogenerated Mock REST service for each service adapter 107 invoked from the Mock service adapter; autogenerated and custom Mocks of all data structures that are exported; autogenerated unit tests for all autogenerated request handlers and data structures; and the like.

Service Adapter 107

In one embodiment, a service adapter 107 is an autogenerated, autonomous module that listens for requests on the bifröst event bus 103 and sends responses back to the requestor or broadcasts responses to multiple passive listeners. The side effect of some of these responses may include updating global shared state, such as Stores and triggering events that can be subscribed to.

In one embodiment, for each request processed, the Service adapter 107 may perform API calls to one or more backend services 202 and transform the response(s) in a manner that is consumable by the requestor. Some requests do not need subsequent API calls to backend services, and may be satisfied entirely by the service adapters 107. Typically, such request handling is done with the addition of custom code which fits concisely and seamlessly into the autogenerated code. Moreover, it is also possible to customize any autogenerated data structure (classes, maps, etc.), and even publish an entirely new data structure, complete with external interface specification documents.

In one embodiment, service adapters 107 can be autogenerated in a number of supported languages, such as, for example, Java, Typescript, Goland, and the like.

In one embodiment, the intent compiler 100 components are driven by specifications. Just as the API Specification documents 221 describe how consumers and producers talk to each other, In one embodiment, the service adapter specification document(s) 227 describe how to construct a service adapter. In one embodiment, the service adapter specification document(s) 227 describe the layout of the service adapters 107, customization of data structures, mock data structures, enumerations, as well as hints for testing. All of these specifications are language-agnostic, and the specifications can be used to generate Service adapters 107 in a multitude of languages.

In one embodiment, the service adapter specification document(s) 227 reside in the folder for the service adapter 107 under the sub-folder: specs. In one embodiment, the name of the service adapter's folder is the same as the name of the service adapter. For example, using Typescript, both the name of the service adapter 221 and that of its folder, is in kebab-case, while that for Java Service Adapters 222 is in PascalCase. In one embodiment, the name of the service adapter specification document(s) 227 all have the suffix .json. By convention, the main specification document is named service.json for consistency, although Servgen 220 doesn't care as long as the .json suffix exists.

In one embodiment, the above code is the minimum specification for a Service adapter 107 which should have the following properties:

A name. In one embodiment, the name property specifies the name of the service adapter 107 in the convention of the output language as described above, e.g., In one embodiment, it is in kebab-case for Type script, while that for Java service adapters 222 is in PascalCase. In one embodiment, the final service adapter 107 object will be in PascalCase. The above specified service adapter 107 will be instantiated under the name: TokenService. This is a legacy name from when Service adapter 107 were called Services. In one embodiment, the Service adapter 107 is named: TokenServiceAdapter.

A version. In one embodiment, the version property specifies the version of the service adapter 107 with a simple integer. It is designed to allow for multiple incompatible versions of the service adapter 107 to coexist and for requests to be invisibly redirected to the appropriate version of the Service Adapter.

A service_requests. In one embodiment, the service_requests property specifies an array of requests that this service adapter 107 will handle. In the simple case being discussed, it describes a single request with the title GetToken, which requires no request parameters, and responds with an object (class) with the type AuthToken. In one embodiment, the definition for AuthToken is automatically obtained from the API specification documents. There are additional properties and modifiers that may be added to the Service Adapter Specification documents.

In another example, a specification for a service adapter 107 in a VMC UI that makes an API call to the VMC backend is provided:

```
{
    "name": "token",
    "version": "1",
    "service_requests": [
        {
            "service_request": "GetToken",
            "api": { "uri": "/auth/token", "api_method": "getAuth" },
            "service_response": { "type": "AuthToken" }
        }
    ]
}
```

The following code is an example of the specification for the simplest service adapter 107 which handles a single request and provides a response. This specifies that a service adapter with the name TokenService is to be created to handle a single request: obtain the authentication token for the requestor. This service adapter is self-contained and makes no calls to any backend services and such requests are termed custom requests as they require the addition of custom code to implement the handler for the request.

```
{
    "name": "token",
    "version": "1",
    "service_requests": [
        {
            "service_request": "GetToken",
            "service_response": { "type": "AuthToken" }
        }
    ]
}
```

In one embodiment, the addition of "api": {"uri": "/auth/token", "api_method": "getAuth"} above, transforms the service adapter 107 into one that calls the API of a backend service 202 to do the work of obtaining the AuthToken. The api property refers to an object that describes the required API call to satisfy the service request. This object contains additional properties.

In one embodiment, the service_request descriptor may only contain a single api property. When a request can only be satisfied by multiple API calls, perhaps even to different backend services, then there is a service_request described for each of the API calls, with a final Custom Request that ties them all together into a single response.

In one embodiment, the uri specifies the endpoint for an API call and its format depends on the type of transport that is used to communicate with the backend service. When a REST 106 service is used as the transport, this specifies the URI of the REST endpoint. In one embodiment, other formats may be used for future transports in place of REST 106. In one embodiment, Apigen 213 produces binding code for all backend APIs, and these can be consulted for determining the necessary endpoints.

In one embodiment, Apigen 213 creates classes for each API endpoint described in the API Specification documents. Each such API class has one or more methods to perform API calls to backend services. In one embodiment, api_method specifies which specific method within that API class is to be invoked. For backend services that use the REST 106 service as transport, these methods are GET, POST, PUT, PATCH, DELETE, and the like. In one embodiment, Apigen 213 converts them into more readable names, by default, e.g., httpGet, httpPost, etc. The use of extensions in the API Specification documents can make these names even more readable. The method name getAuth is an example of an autogenerated readable method name from the use of these extensions. The section describing LibSwagger 212 enumerates these extensions in more detail. Moreover, these and other properties in service.json as well as those for the entirety of possible service adapter specifications are described in subsequent sections in greater detail.

In one embodiment, the service adapter specification for the token service adapter 107 along with the API Specification documents 211 from the backend services 202, are sufficient for Servgen 220 to autogenerate the complete token service adapter 107 without writing a single line of code. In one embodiment, this includes the code for the service adapter, a mock for the service adapter, a mock for a REST 106 service that mocks all the API calls that TokenService makes, mocks of all data structures, especially AuthToken, all unit tests, and importantly, a service adapter interface document that describes how to communicate with TokenService using the bifröst event bus.

In one embodiment, before the autogeneration of TokenService adapter, there exists a folder for the service adapter 107 called token, which has a single sub-folder called specs, which has a single service adapter specification file called service.json. In one embodiment, the example provided below will provide a cursory look at what happens when Servgen 220 is run on this service adapter specification document(s) 227 with the output language set to Typescript.

For the following example, the first step that Servgen 220 takes is to create two new sub-folders called auto and tests. The contents of these folders are read-only and are destroyed and re-created each time that Servgen runs, and should, therefore, not need to be directly modified, as any changes will be lost in the autogeneration process. In one embodiment, only the customizable files in the top level folder for the service adapter, are modifiable and not overwritten, unless the --force option is provided to Servgen 220.

In one embodiment, the auto folder contains code for the core TokenService Adapter, all models used or exported by the TokenService Adapter, and code that implements all the interfaces to the service adapter, including the data structures used to communicate with it over the bifröst event bus.

In one embodiment, the tests folder contains code for all the unit tests for the TokenService Adapter, mocks for all data structures, including those used for communicating via the bifröst event bus, the mock TokenService Adapter, and a mock REST 106 service for the API calls used by the TokenService Adapter.

The following are examples of some of the autogenerated files in accordance with an embodiment.

With regard to models, in one embodiment, the TokenService adapter 107 exports a single object: Authtoken as returned from the backend VMC service. This object is described in the VMC API Specification document. In one embodiment, Apigen 213 has already processed this file and produced a Typescript class from it:

```
export class BaseAuthToken {
        public auth_token:          string; // Current Auth Token
        public id_token:            string; // Openid Token
        constructor (json?: any) {
            if (json && (json as string) != "null") {
               this.id_token = json['id_token'];
               this.auth_token = json['auth_token'];
            }
        }
        // @deprecated - swagger2ts compatibility mode. Use isValid( ) in derived
        class instead public hasRequiredProperties( ): boolean {
            return true; // Class 'BaseAuthToken' has no required properties
        }
}
```

In one embodiment, Apigen 213 has prepended Base to AuthToken which allows the derivation of a child class called AuthToken which inherits from it. In one embodiment, Servgen 220 uses OOP inheritance to extend this base class and customize it as necessary, and does so by autogenerating it in the auto sub-folder in a file called AuthToken.ts with the following content:

```
import { BaseAuthToken } from '@vmc/api/vmc-api';
export class AuthToken extends BaseAuthToken { // generateBaseClass -
codegen.(*Codegen).makeBaseClasses: 328
    private constructor (baseAuthToken: BaseAuthToken) {
        super(baseAuthToken);
    }
    // @deprecated: forTests( ) - should not be used in new code. Use factory( ) instead.
    public static forTests(json: object): AuthToken {
        return AuthToken.factory(new BaseAuthToken(json));
    }
```

```
    // @deprecated: factory( ) - should not be used outside service layer unit tests.
    public static factory(baseAuthToken?: BaseAuthToken): AuthToken {
        return new AuthToken(baseAuthToken as BaseAuthToken);
    }
    // @deprecated: build( ) - should not be used outside service layer unit tests. Use
'new' from Modelgen operations for components.
    // @deprecated - do not call from application space
    public static build(auth_token: string,
                id_token: string): AuthToken {
        const baseAuthToken = new BaseAuthToken({ });
        baseAuthToken['auth_token'] = auth_token;
        baseAuthToken['id_token'] = id_token;
        return AuthToken.factory(baseAuthToken);
    }
    public get isValid( ): boolean { // generateBaseClass codegen.(*Codegen)
.makeBaseClasses: 328
        // AuthToken has no required properties.
        return (
            true
        );
    }
}
```

In one embodiment, the factory method converts a BaseAuthToken class into the AuthToken class, and thenceforth, only use the latter, as the base class generated by Apigen is inaccessible outside the Service Adapter layer.

With respect to AutoService, in one embodiment, Servgen 220 autogenerates the TokenService adapter 107 in the auto sub-folder with the name AutoTokenService.ts, a name whose intent will become clear when custom service adapters 107 are described in detail later. This is the content of that file with imports removed:

```
export class AutoTokenService extends AbstractAutoService<TokenRequestObject,
TokenResponseObject> {
    public lastApi: any; // Unit test support
    protected version = '1';
    protected constructor( ) {
        super('TokenService', TokenChannel.request);
    }
    protected handleServiceRequest(tokenRequestObject: Token RequestObject,
args?: MessageArgs) {
        switch (tokenRequestObject.request) {
            case TokenServiceRequest.GetToken: {
                const apiObject = this.genApiObject(tokenRequestObject,
                        new TokenGetTokenResponseObject( ));
                const successHandler =
                        (context: ApiObject<TokenRequestObject,
TokenResponseObject>, apiResponse: AuthToken,
messageArgs: MessageArgs) => {
const serviceResponse = AuthToken.factory(apiResponse);
this.apiSuccessIntercept(context, serviceResponse, messageArgs);
                        };
                const failureHandler =
                        (context: ApiObject<TokenRequestObject,
TokenResponseObject>,
                            err: RestError, messageArgs: MessageArgs) => {
                                this.apiFailureIntercept(context, err, messageArgs);
                            };
                (this.lastApi = new API_AuthToken(this.apiBridge, apiObject, args))
                    .getAuth(// Get
                    successHandler,
                    failure Handler
                );
                break;
            }
            case TokenServiceRequest.GetServiceVersion: {
                const apiObject = this.genApiObject(tokenRequestObject,
                        new TokenGetServiceVersionResponseObject(
                            new ServiceVersion(this.serviceName, this.version)
                        )
                    );
```

```
                    this.apiSuccessHandler(apiObject, new
        ServiceVersion(this.serviceName, this.version), args);
        break;
                }
                default:
                        this.postError(tokenRequestObject.channel as string,
        this.serviceRequestError, args);
                }
            }
        }
        protected apiSuccessIntercept(apiObject: ApiObject<TokenRequestObject,
    TokenResponseObject>,
                                     payload: any,
                                     args?: MessageArgs) {
                this.apiSuccessHandler(apiObject, payload, args);
        }
        protected apiFailureIntercept(apiObject: ApiObject<TokenRequestObject,
    TokenResponseObject>,
                                     err: RestError, args?: MessageArgs) {
                                     this.apiFailureHandler(apiObject, err, args);
        }
    }
```

In one embodiment, in addition to generating code to handle the specified GetToken request, Servgen 220 has automatically inserted a GetServiceVersion into the request handler, as it does for all Service adapters 107 so that all of them can respond to a request to determine the version of the service adapter.

Referring now to containers, nested containers, and types. In one embodiment, since the intent compiler 100 is language-agnostic, it has an abstract definition of what constitutes the type of any entity. Internally, LibSwagger 212 maintains the following data structure for all objects: parameters, properties, responses, mocks, etc.:

```
type CommonType struct {
    Container   string
    Reference   string
    Description string
    Nested      string
    Type        string
    Format      string
    Enum        [ ]interface{ }
    OneOf       [ ]string
}
```

In one embodiment, intent compiler 100 only permits a single level of container nesting as described in the documentation for LibSwagger 2121. So, the deepest level that can be expressed for a data structure would be the following example (in both Typescript and in Java): Map<string, Array<AuthToken>>—which defines an entity consisting of a map that contains an array of AuthToken classes. No further depth can be expressed in the intent compiler 100 and in some cases, it is considered bad practice to use such complex data structures in API definitions. It is, however, acceptable to have such complex structures for implementing backend services and there is no requirement for data structures used in APIs to be identical to those used for implementing a backend service.

Therefore, in one embodiment, in order to declare an entity to have the above type in service adapter specification document(s) 227, the following would suffice:
{"container": "map", "nested": "array", "type": "AuthToken" }

In one embodiment, that is all that is required to specify a type for any entity in a service adapter specification document(s) 227.

Regarding the service adapter interface document 223, in one embodiment, for every service adapter 107 autogenerated by Servgen 220, there is also an OpenApi document: service adapter interface document 223, that is autogenerated and describes all the models owned by the service adapter, as well as all the requests that it responds to. In one embodiment, it also contains the interfaces to the bifröst event bus 103 so that another intent compiler 100 component, Modelgen 232, can autogenerate procedural bindings to bifröst messages, thus abstracting Service Adapter invocations.

While the OpenApi specifications are evolving, in one embodiment, they continue to be oriented for REST 106 calls and responses. However, the OpenApi specification documents allow for the use of extensions: strings prefixed with x-, that permit additional specifications beyond those articulated in the standard specification. In one embodiment, the intent compiler 100 components use these extensions extensively in order to mesh in with the bifröst event bus 103. The following is an excerpt from the service adapter interface document 223 for the example TokenService Adapter above:

```
swagger: '2.0'
info:
    description: Autogenerated API for TokenService documents all requests and
responses.
    version: '1'
    title: Token Service API
    termsOfService: 'https://vmc.vmware.com/terms-and-conditions'
    contact:
        name: VMware
    license:
        name: 'Copyright(c) 2020, VMware Inc. All rights reserved.'
```

-continued

```
basePath: /Token
x-vmware-service-name: Token
x-vmware-service-path: token
x-vmware-service-language: typescript
x-vmware-service-request-channel: 'services__token__request'

# Service Requests

paths:
    /TokenServiceRequest.GetToken:
        post:
            x-vmware-service-request: TokenServiceRequest.GetToken
            x-vmw-vapi-methodname: GetToken
            x-vmware-service-schemes: [https]
            x-vmware-service-base: /vmc/api
            x-vmware-service-uri: /auth/token
            x-vmware-service-operation: Get
            summary: TokenServiceRequest.GetToken
            parameters:
                - in: body
                  name: TokenGetTokenRequestObject
                  required: true
                  schema:
                      $ref: '#/definitions/TokenGetTokenRequestObject'
            responses:
                '200':
                    description: OK
                    ## Normal response
                    schema:
                        $ref: '#/definitions/AuthToken'
# ---
    /TokenServiceRequest.GetServiceVersion:
        post:
            x-vmware-service-request: TokenServiceRequest.GetServiceVersion
            x-vmw-vapi-methodname: GetServiceVersion
            summary: TokenServiceRequest.GetServiceVersion
            parameters:
                - in: body
                  name: TokenGetServiceVersionRequestObject
                  required: true
                  schema:
                      $ref: '#/definitions/TokenGetServiceVersionRequestObject'
            responses:
                '200':
                    description: OK
                    ## Normal response
                    schema:
                        $ref: '#/definitions/ServiceVersion'
# ---

# Models

definitions:
# YAML Enums
# Service Request Enum
    TokenServiceRequest:
        x-vmware-service-literal-enum: TokenServiceRequest # generateRequestEnum
        x-vmware-service-enum-keys: BadRequest,GetToken,GetServiceVersion
        type: string
# Service Request Objects
    TokenGetTokenRequestObject:
        x-vmware-service-request: TokenServiceRequest.GetToken
        type: object
        properties:
            channel:
                type: string
    TokenGetServiceVersionRequestObject:
        x-vmware-service-request: TokenServiceRequest.GetServiceVersion
        type: object
        properties:
            channel:
                type: string
# Service Response Objects
    TokenGetTokenResponseObject:
        x-vmware-service-request: 'TokenServiceRequest.GetToken'
```

```
            x-vmware-service-response: 'AuthToken'
            type: object
            properties:
                response:
                    $ref: '#/definitions/AuthToken'
        TokenGetServiceVersionResponseObject:
            x-vmware-service-request: 'TokenServiceRequest.GetServiceVersion'
            x-vmware-service-response: 'ServiceVersion'
            type: object
            properties:
                response:
                    $ref: '#/definitions/ServiceVersion'

# YAML Classes

# YAML model: AuthToken
    AuthToken:
        type: object
        properties:
            auth_token:
                type: string
            id_token:
                type: string
# Specials
    ServiceVersion:
        type: object
        properties:
            name:
                type: string
            version:
                type: string
```

The following is one embodiment of a detailed description of how to invoke Servgen (for purposes of clarity obsolete and deprecated options have been excluded):

Usage: servgen2 [-1BcdDFGhHNQrTtvVw] [-a "@vmc"] [-b ${HOME}/ui] [-E Edrs:FeaturesOperator] [-e vmc] [-i value] [-l typescript | java] [-n Base] [-p<YAML folder>] [-P com.vmware.services] [-R "ngw:Ngw & csp:Cspm""] [-s src/services] [-S value] [-y "-api-doc.yaml"] [parameters . . . ]

| Option | Description |
| --- | --- |
| -a, \| --alias=@vmc | Typescript only. Specifies a shortcut alias to be used for imports. Ignored in Java. |
| -B \| --bifröst - abstractions | Most projects should use this flag. It specifies that all autogeneration abstractions should be obtained from the Bifröst core. If not specified, then these abstractions are sought locally. In general, a project would be using local abstractions for historical reasons. Once the project has been refactored to no longer depend on local abstractions, this flag will be ignored and always assumed to be on. |
| -b<path> \| --root=<path> | This option declares the absolute path to the root of the Project directory. In one embodiment, all subsequent location specifications are relative to this root path. If this option is skipped, Servgen defaults to ${HOME}/ui for historical reasons. Path specifications may include the ~ character which will be replaced by the HOME folder of the invoking user, or ~<user>, which will be replaced by the HOME folder of the specified <user>. |
| -d \| --debug | Used by Servgen developers to emit debug output. |
| --e <YAML prefix> \| --extern=<YAML prefix> | In one embodiment, many of the YAML specifications prevalent at VMware use partial object definitions with the intent that a more authoritative definition is to be obtained from another YAML. Examples of this behavior include the definition of the Task class and Sddc class, that are both authoritatively defined in vmc-api-doc.yaml, but has partial definitions in other YAML files (e.g. vmc-draas-api-doc.yaml). When this option is specified, Servgen does not emit any definition for object names that are duplicated in the authoritative YAML (in this case vmc, without the suffix) and instead, issues import declarations (in the respective output language) for those duplicated objects from their definition in the authoritative YAML. |
| -F \| --force | In general, this flag is provided to an intent compiler 100 component (e.g. Servgen, or Specgen) to permit them to overwrite a file that is otherwise customizable (and therefore, not normally overwritten), however, it should not often be used in production code and is usually provided for developer convenience. |
| -h \|--help | Displays all the options recognized by Servgen. |
| -i <path> \| --Interface-dir=<path> | In one embodiment, once Servgen has finished building a service adapter, it also generates service adapter interface documents that allow requests and responses to/from the service adapter by any consumer over the Bifröst event bus. In one embodiment, these interface documents are also used for the next stage of the Intent Compiler: Modelgen, which typically does not execute in the local address space of the service adapter, to autogenerate local bindings for the consumer to procedurally invoke requests on the event bus. In one embodiment, |

-continued

| Option | Description |
|---|---|
| | this option specifies the path, relative to the location of service-dir described below, where these interfaces documents, one per service adapter, are to be created. In one embodiment, if the folder does not exist, it is created, otherwise all the content of an existing folder is purged. |
| -l <typescript | java> l --language=<typescript | java > | This option is used to specify the language plugin to be used for the output from Servgen. In one embodiment, valid plugins include: typescript, java, Golang, and the like. |
| -N | --nodetailed-statistics | In one embodiment, without this option, Servgen prints out detailed compiler statistics for every processed service adapter. Turning this flag on results in only a small amount of output that summarizes the statistics for all processed service adapters into a single synopsis. |
| -n | --namespace=<prefix> | In one embodiment, this option prepends a prefix to one, some, or every class definition output by Servgen. In one embodiment, if this option is not provided, Servgen defaults to using Base as that prefix. The purpose of this is to rename the class names sent by a responder and preserve that intact, while deriving a new class from this base class by the application, and delineates the boundary of immutability of the original class.<br>In one embodiment, references to this base class may only be permitted from service adapters. In one embodiment, the application may, however, access the derived class[es] provided by Servgen, which automatically generates the children of this parent base class, while the base class output of Servgen is accessible from within the service adapter and may be in a language that is different from that of the application. |
| -P <package name> | --package=<package name> | For languages that use packages, e.g., Java, Go, etc., this specifies the package name to insert in the output file(s) as it is not always possible to infer the package name from the output folder's path. |
| -p <relative path> | --apiDir=<relative path> | In one embodiment, this option specifies the path of the API folder, relative to the project root specified using --root above. The API folder is the location where both YAML files and the runtime bindings generated by Apigen reside. In one embodiment, this option is mandatory |
| -Q | --quiet | Suppresses diagnostic warnings. This is a developer aid and should not normally be specified in production mode. |
| -R <YAML: class prefix> --rename-yaml=<YAML: class prefix> | In one embodiment, there is no central repository for YAML files, as such, sometimes the same name is used in more than one file, causing a name collision for Intent Compiler components like Apigen and Servgen, that simultaneously operate on multiple YAML files within the same namespace. The --rename-yaml option, specifies the prefix of a YAML file separated from a string by a colon ":" that is then prepended to one, some, or every class name in the specified YAML..<br>As an example, a class named Message exists in both vmc-api-doc.yaml as well as ngw-api-doc.yaml but they are not the same object. To resolve this name collision, one embodiment will--rename-yaml=ngw:Ngw prepends Ngw to every class in ngw-api-doc.yaml, so that Message is renamed to NgwMessage in ngw-api-doc.yaml, while leaving Message unchanged in vmc-api-doc.yaml, thus avoiding the name collision. In one embodiment, multiple YAML/Class pairs can be specified by separating them with the "&" character (be careful to use escapes to prevent shell interception). In one embodiment, this option must be specified to both Apigen and Servgen. |
| -r | --recover | In one embodiment, Servgen will stop processing and exit when it encounters an error. With this option, it will try to continue processing the remaining service adapters even if it fails to process one of them. |
| -S <Service Adapter>, --specdir=<Service Adapter> | In one embodiment, Servgen will process specifications for every service adapter folder with a specs sub-folder that it finds in --servicedir. This option dictates that only the service adapter specified here be processed. This is a legacy option from the past when Servgen was originally written in Python, and would take several minutes for Servgen to process a handful of service adapters. Servgen was redesigned and rewritten in Golang and can process all the service adapters in VMC very quickly (in many cases that means in less than 1 second).<br>In one embodiment, however, this option is useful for intent compiler 100 developers when debugging Servgen.<br>In one embodiment, the name of the folder for a service adapter should be identical to the name of the service adapter itself. In one embodiment, the name of the folder for a service adapter must be identical to the name of the service adapter itself. Since service adapter class names in Java are in PascalCase, the service adapter folder should also be PascalCase. For Typescript, the convention is to have service adapter names be in kebab-case, e.g., sddc-core is the name of the service adapter and its containing folder, however, the autogenerated class is SddcCoreService, while the service adapter's name remains sddc-core. For Java, both the service adapter folder and the service adapter's name should be SddcCore and will also generate a service adapter called SddcCoreService. |
| -s src /services, --servicedir=src /services | This option specifies a folder relative to the project's root folder, which contains all the sub-folders for the Service Adapters, including --apiDir. For every service adapter that is to be processed by Servgen, it looks for a sub-folder named specs, which contains one or more Service Adapter Specification documents. |
| -T | --teststubs | In one embodiment, Servgen automatically generates unit tests for every service request to every Service Adapter. In one embodiment, these test files are not |

| Option | Description |
|---|---|
| | modified directly as they are regenerated each time that Servgen runs. Using this option, a customizable test stub is generated which can be used to write additional tests, particularly for customizable service adapters. |
| -t \| --trace | Used by Servgen developers to emit trace level output. |
| -V \| --version | Displays Servgen version. |
| -v \| --verbose | Used by Servgen developers to emit verbose level output. |
| -w \| --no-warnings | This option suppresses warning from Servgen (not recommended, except while debugging and/or overwhelmed by a stream of warnings). |
| -y "-api-doc.yaml" \| --yamlsuffix="-api-doc.yaml" | By convention, in one embodiment, one, some, or all API Specification documents are expected to have -api-doc.yaml as the suffix for the filename that contains them. This option allows for a different name pattern to be sought by Servgen. |

Example Use:
VMC UI using Typescript with vmc-api-doc.yaml
servgen2 -R ngw:Ngw -N -i interfaces -T -p src/services/api -e vmc -s src/services --root=~/ui
AppFabric sample using Java
servgen2 -l java -P com.vmware.appfabric.sample -T -B -N interfaces -p services/api -b ~/appfabric/sample-ui -s src/services
Service Adapter Specification Document(s) 227

Service adapter specification document(s) 227 include documents such as, service.json, exports.json, imports.json, enums.json, classes.json, maps.json, sets.json, arrays.json, mocks.json, and testing.json.

In one embodiment, specifications consumed by the various components of the intent compiler 100, be they API specifications, service adapter specifications, application 107 is token for service adapter 107 written in Typescript, as it is usual to write names in kebab-case there, and token when written in Java, using PascalCase. If the intent compiler 100 component, Specgen 219 is used, it will take care of specifying the name in the casing appropriate for the language used for the service adapter 107.

While it is possible to specify everything associated with a service adapter 107 in a single file, for readability, the convention is to place each type of specification in its own file. Similarly, while the compiler is agnostic to the name of the specification file(s) as long as they have .json for suffix in their name, in one embodiment, the naming convention is described below to maintain consistency across all projects:

| File Name | Specification Type |
|---|---|
| service.json | This file contains the main specification for a service adapter. At a minimum, in one embodiment, it should specify: The name of the service adapter, the version of the service adapter, and at least one request that the service adapter responds to, in addition to the autogenerated response to GetServiceVersion, which exists in every service adapter. There are many more specifications that can describe the service adapter in service.json, and they are described in detail herein. |
| exports.json | This file lists all the objects (classes) and enumerations that are owned by this service adapter and should be imported by other service adapters and defined by them. |
| imports.json | This file lists all objects that are imported from other service adapters. |
| enums.json | This file contains enumerations from the API specification document(s) as well as language-agnostic declaration of custom enumerations, cloned enumerations, and the addition of fields to existing enumerations. |
| classes.json | This file contains language-agnostic specification for custom classes as well as extensions to existing classes derived from API specification document(s). |
| maps.json | This file contains language-agnostic specifications of custom map objects for use by the Service Adapters. |
| sets.json | This file contains language-agnostic specifications of custom sets for use by the service adapters. |
| arrays.json | This file contains language-agnostic specifications of custom arrays for use by the service adapters. |
| mocks.json | This file contains custom mock data structures to augment those automatically generated by Servgen. |
| testing.json | This file directives to modify the behavior of autogenerated unit tests. | specifications, or the like, constitute the language of the intent compiler 100. The following discussion describes the specifications that comprise service adapter specification document(s) 227.

In one embodiment, specifications for a service adapter consist of providing a number of JSON objects in a file with the suffix .json in a sub-folder for that service adapter with the name specs. In one embodiment, the name of the enclosing folder is the same as the name of the service adapter itself. e.g., the name of the Token service adapter Service.json In one embodiment, service.json contains the core specification for a service adapter. In one embodiment, there must exist one instance of this specification file (or its content) in order for a service adapter 107 to be autogenerated. Consider the following minimalist service.json for the SddcCore Service Adapter, which responds to a single service request, and it does not result in any API calls to a backend service. Because of this lack of dependence on a backend service, this service adapter is also a service itself.

```
{
  "name": "sddc-core",
  "version": "1",
  "service_requests": [
    {
      "service_request": "GetSddcList",
      "service_response": { "type": "Sddc", "container": "array" }
    }
  ]
}
```

| Property | Description |
|---|---|
| name | This property specifies that the name of the service adapter is sddc-core. The kebab-case for the name is usual for service adapters written in Typescript. For those written in Java, the name should be in PascalCase, e.g., SddcCore. In one embodiment, regardless of the language, the value for name specified here should match the name of the folder for the Service Adapter. Thus, for Typescript, the location of this service.json is .../sddc-core/specs/service.json, while for Java, it is .../SddcCore/specs/service.json. In either language, the class autogenerated for this Service Adapter will be SddcCoreService (to be renamed to SddcCoreServiceAdapter in future). |
| version | This property specifies the version of the service adapter. In one embodiment, this is a monotonically incrementing integer value that allows for dynamic request routing between different versions of a service adapter, when some of them are incompatible. In one embodiment, the bifröst messages will be able to target a specific version of a service adapter. |
| service-requests | This property specifies an array of service request objects that this service adapter understands and responds to. In one embodiment, in the absence of any service requests, all service adapters will respond to the GetServiceVersion request. |
| service-request | Each object in the above array of service requests, describes the service being requested, including any input parameters. At a minimum, it specifies the name of the request, e.g. (GetSddcList above). |
| service-response | In one embodiment, all requests to a service adapter, must have a response, even if it is an empty object. However, a service_response should not be confused with the response from an API call (described below), even when they are the same. In one embodiment, a service response may, at times, combine the response from multiple API calls into a single response. Also, in the case of customized service adapters, there is a response even when no API calls are invoked. To reiterate, a requestor to a service adapter only knows about the service request, the input parameters, and the service response. The requestor has no knowledge or the ability to access what API calls are performed on its behalf, nor the responses from the API calls if any. The service requests described above, can have a number of optional properties and one mandatory property: service_response, which describes the object(s) that is the response type for this request. In the example above, the requests GetSddcList responds with an array of Sddc objects. For further information, refer to the description of CommonType described earlier, which allows a language-neutral type declaration using "container", "nested", and "type". Even if the API call used to satisfy the service request returns nothing, service_response will return, at a minimum, an empty object. |

In one embodiment, a service request may, optionally require input parameters. These are categorized into two groups, e.g., service_request_query_params—usually passed onto REST API calls as query strings; and service_request_param—which, in one embodiment, includes all other parameters, even without API calls.

The following code augments the previous specification for sddc-core in the above service.json, and add examples of input parameters. In one embodiment, these are declared as arrays in either group and have similar format. In one embodiment, the order of specificity (sequence) is not important:

```
{
  "name": "sddc-core",
  "version": "1",
  "service_requests": [
    {
      "service_request": "GetSddcList",
      "service_response": { "type": "Sddc", "container": "array" }
    },
    {
      "service_request": "OperatorDeleteSddc",
      "service_request_params": [
        { "service_request_param": "sddc" }
      ],
      "service_request_query_params": [
        { "service_request_query_param": "force", "optional": true }
      ],
      "api": { "uri": "/operator/sddcs/{sddc}", "api_method": "deleteSddcs" },
      "update_store": { "delete": "SddcStore", "param": "sddc" },
      "service_response": { "type": "Task" }
    }
  ]
}
```

| Parameter Group | Description |
| --- | --- |
| service_request_query_param | In the above example, force is a query parameter. No type is specified, because query parameters are always strings, even if the API specifications declares it as something else (e.g. boolean or integer). Moreover, it is conventional to declare query parameters as optional even when the API specification states that the parameter is required. As with all specifications of CommonType, the absence of a type specification is interpreted as being of type string. In one embodiment, if the optional property is not specified, it is still possible to prevent this string from being passed to an API call by setting it to null. |
| service_request_param | Path parameters, body parameters, and parameters local to a customized service adapter, are all included in the array of service_request_params. In one embodiment, the language-neutral type of the parameter is described using CommonType, e.g., using container, nested, and type. In the above example, sddc is the UUID of an Sddc to be deleted. No other properties are specified, indicating the sddc is of type string. |

In one embodiment, the below has been added to the example service adapter specification document(s) 227.
"api": {"uri": "/operator/sddcs/{sddc}", "api_method": "deleteSddcs" }

In one embodiment, the above states that the service request OperatorDeleteSddc needs to make an API call to a backend service 202 in order to satisfy the request. The interface models REST 106 API calls, however, the same specifications may be used to specify API calls using other transports. In one embodiment, the api property to the service request can have many additional properties defined. While there are several other properties described later, in the above example, only the following properties are specified (the property api_src is implicit):

| API Property | Description |
| --- | --- |
| uri | This specifies the endpoint of the API call. In the above example specification, the REST transport is being used, hence, the endpoint is an URI path: /operator/sddcs/{sddc}. This is a relative uri, and the actual uri is constructed by prepending a base path as well as the host and most secure scheme from the API Specification document(s). |
| api_method | The above specification of an uri results in the generation of an API Class object in the respective language. This class contains all the methods (public class functions) that implement each of the operations that constitute the API calls. In one embodiment, since the intent compiler 100 models API calls to be analogous to REST calls (even if they are not), the supported methods are GET, POST, PUT, PATCH, and DELETE. If the names of these methods are not modified by the use of extensions x-vmw-vapi-methodname and x-vmw-appfabricservicename in the API Specification documents(s), then the default method names corresponding to the above will be httpGet, httpPost, httpPut, httpPatch, and httpDelete. As noted above, in one embodiment, the input parameters for this method are extracted from the service_request_params and service_request_query_params that were provided by the requestor to the service request. |
| api_source | As noted above, in one embodiment, the uri is a relative path, which is unique across multiple API specification document(s). However, it is possible to have a collision with the same uri in on API specification document with that of another, even if the base path specified in each is different. To disambiguate the two paths, api_source specifies the API specification document whose definition of the uri is to be used for this API call. Implicitly, if api_source is not specified, then the first encounter of this relative uri is used. e.g. if the uri from vmc-api-doc.yaml is to be used, then vmc should be specified as the api_source: { "uri": "/operator/sddcs/{sddc}, "api_method": "deleteSddcs", "api_source": "vmc" } |

Referring now to event handlers and broadcasts, in one embodiment, all service adapters respond to requests over the bifröst event bus 103. Additionally, some service adapters also listen to websocket events, and such service adapters are called event handlers. Most event handlers require customized code to be added to the service adapter beyond what is autogenerated, and is described herein. In one embodiment, important websocket events are task update events, which is how asynchronous service requests are handled. These events notify of the progression of asynchronous handling of requests to backend services, as well as completions and failures. In one embodiment, multiple clients within the same organization are simultaneously updated so that multiple web browsers display identical data.

In one embodiment, just as a service adapter may listen for asynchronous websocket events, any service adapter may also emit its own events, called broadcasts, over the bifröst event bus 103 that applications may listen to asynchronously. A service adapter does not have to be an event handler in order to emit events via the broadcast specification, however, as shown below, in one embodiment, a broadcast specification is required if the service adapter is required to automatically generate code for updating stores.

The following is an augmentation to the example specification from above, and is used to illustrate the specification of event handlers and broadcasts:

{
"name": "sddc-core",
"version": "1",
"broadcast": { "type": "Sddc", "change_type":

-continued

```
"SddcStateChangeType" },
"event_handler": true,
"service_requests": [
  {
    "service_request": "GetSddcList",
    "service_response": { "type": "Sddc", "container": "array" }
  },
  {
    "service_request": "OperatorDeleteSddc",
    "service_request_params": [
      { "service_request_param": "sddc" }
    ],
    "service_request_query_params": [
      { "service_request_query_param": "force", "optional": true }
    ],
    "api": { "uri": "/operator/sddcs/{sddc}", "api_method":
      "deleteSddcs" },
    "update_store": { "delete": "SddcStore", "param": "sddc" },
    "service_response": { "type": "Task" }
  }
]
}
```

In the above example, the only change was the setting of boolean event_handler to true. In one embodiment, Servgen 220 takes care of autogenerating the service adapter with all the listeners and hooks, and all that is required is a small amount of customized logic (described herein) to make it work.

In one embodiment, the broadcast property above is how consumers know what to expect in broadcast payloads from the service adapter. This property uses CommonType to specify the payload of the broadcast, which means using container, nested, and type.

In one embodiment, the change_type property specified above is meant to provide a clue as to whether the broadcast is associated with a CUD event of the payload, e.g., created, updated, or deleted. Note that the change_type property is optional, and its absence results in the autogeneration of an enumeration that contains values for these three kinds of notifications. The use of change_type, however, allows for customized enumeration of additional values that the service adapter developer would provide as hints to consuming applications, providing more flexibility.

In the above example, change_type is specified to be SddcStateChangeType, which, in one embodiment, will need the developer to provide an enumeration with that name, that at a minimum, enumerates values for created, updated, and deleted. In one embodiment, the developer can now add additional enumerations as shown in the excerpt below:

```
export enum SddcStateChangeType {
    Created = 'SddcCreated',
    Updated = 'SddcUpdated',
    Deleted = 'SddcDeleted',
    SddcUpdated = 'SddcUpdated',
    SddcCreating = 'SddcCreating',
    SddcDeleting = 'SddcDeleting',
    SddcAddingHosts = 'SddcAddingHosts',
    SddcDeletingHosts = 'SddcDeletingHosts',
    :
    :
}
```

In one embodiment, if change_type had not been specified, Servgen 220 would have autogenerated the above enumeration with values for created, updated, and deleted only.

In one embodiment, intent compiler 100 manages stores automatically. That is, Servgen 220 allows for specifications that result in the creation of bifröst stores, and adding, updating, and deleting items within it, triggered by responses to service requests automatically. To illustrate these capabilities, note the enhancement to the example service adapter specification:

```
{
  "name": "sddc-core",
  "version": "1",
  "broadcast": { "type": "Sddc", "change_type":
    "SddcStateChangeType" },
  "event_handler": true,
  "stores": [
    {
      "store": "SddcStore",
      "store_id": "Sddc",
      "type": "Sddc"
    },
    {
      "store": "ReservationStore",
      "store_id": "stores::vmc::reservation",
      "type": "ReservationWindow",
      "container": "array"
    }
  ],
  "service_requests": [
    {
      "service_request": "GetUncachedSddcList",
      "service_request_query_params": [
        { "service_request_query_param": "includeDeleted", "optional":
          true }
      ],
      "api": { "uri": "/orgs/{org}/sddcs", "api_method": "listSddcs" },
      "update_store": { "update": "SddcStore", "property": "id" },
      "service_response": { "type": "Sddc", "container": "array" }
    },
    {
      "service_request": "GetUncachedSddc",
      "service_request_params": [
        { "service_request_param": "sddc" }
      ],
      "api": { "uri": "/orgs/{org}/sddcs/{sddc}", "api_method":
        "getSddcs" },
      "update_store": { "update": "SddcStore", "param": "sddc" },
      "service_response": { "type": "Sddc" }
    },
    {
      "service_request": "GetAllTbrsReservations",
      "service_request_params": [
        { "service_request_param": "sddcState", "type":
          "SddcStateRequest" }
      ],
      "api": { "uri": "/orgs/{org}/tbrs/reservation", "api_method":
        "postTbrs" },
      "service_response": { "type": "ReservationWindow", "container":
        "map", "nested": "array" },
      "update_store": { "update": "ReservationStore" }
    }
  ]
}
```

In one embodiment, as shown above, a new property has been added for the service adapter: stores, which is an array of one more bifröst stores that will be created and owned by this service adapter. Each such autogenerated store specifies a readable name for it, as well as a UUID specified using store_id, and a CommonType which specifies the usual container, nested, and type for each element in the store. Conceptually, a bifröst store is a map of key/value pairs, where each value has a type that is specified by CommonType.

In one embodiment, there is one, and only one broadcast property specified, irrespective of how many stores are specified. Stores have their own notification mechanism using bifröst, and broadcast is used for manual broadcasts on the broadcast channel for the service adapter.

In the above example, two stores are specified: SddcStore, which contains elements which are of the type Sddc class, and ReservationStore, whose elements are arrays of type ReservationWindow class. On instantiation of the service adapter, these stores are created if they do not already exist.

In addition to the three service requests in the above example, GetUncachedSddcList, GetUncachedSddc, GetAllTbrsReservations, one embodiment has added a property update_store. Each of these update_store specifications contain additional specifiers, either update, or delete, as well as optional key retrieval qualifiers property, param, and the deprecated uuid. In one embodiment, the actual operation on the respective stores is very dependent on the service_response from each service request.

In the first of the service requests above, GetUncachedSddcList makes an API call to the backend service and returns an array of Sddc classes. The update_store specifies that the entirety of the store named SddcStore should be updated from the array of Sddc classes, and the key to that store for each element of the array should be obtaining by the specified property: id. So, as intent compiler 100 iterates through the array of Sddc classes, it would update the store with each of the Sddc classes, using each Sddc.id as the key to the store.

In one embodiment, the second service request above, GetUncachedSddc returns a single instance of an Sddc class by providing its UUID using the input parameter sddc which is a string with the requested UUID. Since the service_response is a single Sddc, the update property also specifies a qualifier param. This essentially says to scan the input parameters to the service request, looking for a parameter named sddc, and use its value as the key into SddcStore to update the Sddc there.

In one embodiment, the third and most complex service request above, GetAllTbrsReservations has a service response which is a map of an array of type ReservationWindow class. This is represented in Typescript as map<string,Array<ReservationWindow>>. In one embodiment, the update property has neither the property nor param qualifier. In one embodiment, in order to update the specified ReservationStore, Servgen 220 infers that the service_response Map needs to update the store using the map keys as store keys. That is, the store becomes a reflection of the response Map.

In general, the uuid qualifier is used to stuff the entirety of a service_response, into a single store element using the key specified by uuid. In one embodiment, the code should be changed to use one of the methods described in the example specification.

classes.json

In one embodiment, classes.json contains the specifications for either defining a new custom class, customization of an already defined class, or the inclusion of a class that is not otherwise referred to by the service adapter.

In one embodiment, the customization of classes in the service adapter layer 210 is discouraged. Instead, in one embodiment, the customization of classes belongs in the application layer 230. As such, classes.json is used to include classes that are not otherwise included by virtue of being referenced by the service adapter. Instead, the specification of Custom Classes using the intent compiler 100 component: Modelgen 232, is one way to customize classes in the Application Layer 230.

Here is an example of two classes excerpted from the sddc-core service adapter:

```
{
  "classes": [
    {
      "class": "SddcProvisioningSpec"
    },
    {
      "class": "SddcProvisioningStatus",
      "properties": [
        { "property": "provisioning_status", "optional": true },
        { "property": "progress_percent", "type": "integer", "optional": true },
        { "property": "estimated_remaining_minutes", "type": "integer", "optional": true }
      ]
    },
```

In the above excerpt, one embodiment wants to add additional properties to the SddcProvisioningStatus class that was defined in vmc-api-doc.yaml. In addition, a second class has been specified: SddcProvisioningSpec, where the original class from vmc-api-doc.yaml is defined because there are no references to it which would force its inclusion otherwise, and, in one embodiment, also specified that this class is not going to be customized by adding properties to it, or creating customizable stubs for it.

| Property | Description |
| --- | --- |
| classes | This property specifies an array of custom classes. These can be new classes that do not exist in the API Specification document(s), or they can be classes that do exist in the API Specification document(s) that one wishes to customize by adding properties for local use, or they may be declarations of classes to be defined and used, which were not included for definition by virtue of them not being referenced by the service adapter, but which are required for access from the application layer. |
| class | This property specifies the name of each class that is to be customized or just included in the definitions list and service adapter interface document (YAML). |
| properties | This property specifies an array of property objects that this class wants to add to the original class from the API specification document(s). |
| property | Each object in the above array of properties, concisely describes the property being added, including its type. The type specification uses container/nested/type from the CommonType described in previous sections. In one embodiment, this may also be specified to indicate that the property is not required in order to check the validity of the class. |
| customized | In one embodiment, e.g., by default, every class that has an entry in class.json is considered to be customizable. This results in a customizable stub being created in the top directory of the Service Adapter, as well as an autogenerated (not modifiable) Auto class being created, which in turn inherits from the original class in the API Specification document(s). Specifying customized to false, results in the inhibition of creating the customizable class stub, as well as the Auto class. The original class |

| Property | Description |
|---|---|
| | from the API Specification document(s), however, is autogenerated, and described in the Service Adapter Interface document(s), for processing by downstream Intent compiler 100 components. | maps.json

In one embodiment, maps.json contains the specifications for generating language-neutral dictionaries that map typed key/value pairs for internal use by the service adapter, either for customized code, or for custom tests.

In one embodiment, the autogenerated maps are not exposed in the service adapter interface (YAML), and therefore, such maps are not directly accessible from the application layer 230. In one embodiment, maps are manifest as ES6 Map classes for service adapters written in Typescript.

In one embodiment, maps are a legacy implementation intended to provide transportability across multiple languages. In one embodiment, creating standalone maps (not wrapped in a class) is performed in Typescript language. In one embodiment, if using Typescript is not preferred, a custom code can be used in its stead.

The following is an example of a map excerpted from the sddc-core service adapter:

```
{
  "maps": [
    {
      "map": "SddcStateNotification",
      "key_type": "string_enum",
      "type": "SddcStateChangeType",
      "imports": [
        { "import": "SddcStateChangeType" },
        { "import": "TaskStatus", "service": "task" },
        { "import": "TaskType", "service": "task" }
      ],
      "pairs": [
        { "key": "TaskStatus.Started + TaskType.DeployingSddc",
          "value": "SddcStateChangeType.SddcCreating", "type": "enum" },
        { "key": "TaskStatus.Started + TaskType.DeletingSddc",
          "value": "SddcStateChangeType. SddcDeleting", "type": "enum" },
        { "key": "TaskStatus.Started + TaskType.DeployingEsx",
          "value": "SddcStateChangeType.SddcAddingHosts", "type": "enum" },
```

In the above excerpt, one embodiment creates an ES6 Map object named SddcStateNotification. This is one of the more complex map specifications which qualifies the type for both the map key and its value, and includes string concatenation, and extensions to CommonType. Below is a detailed description of the various properties for specifying a map object.

| Property | Description |
|---|---|
| maps | In one embodiment, this property specifies an array of custom ES6 maps. These maps are only for use within the service adapter or its custom tests. The instantiated map is not exposed in the service adapter interface document and is, therefore, not referable from the application layer. |
| map | This property specifies the name of each ES6 Map that is to be instantiated. This name is referable from the service adapter and its mocks and tests, but is not exposed in the service adapter interface document. |
| key_type | This property specifies the type of the key for the ES6 Map. In one embodiment, if it is not specified, then it is assumed to be of type string. Only base types may be used to specify this, with the addition of string_enum as used in the example above. It also allows for the provision of string concatenation using the "+" operator, something that may not be acceptable in languages other than Typescript and Java.<br>In one embodiment, the specification of container/nested from CommonType is not permitted here. |
| type | This property specifies the type of the value for the ES6 Map. The type specification uses container/nested/type from the CommonType described in previous sections. |
| imports | Typically, in autogenerating an ES6 Map, Servgen is able to infer the location where all references within the ES6 Map are defined. In some cases, however, as in the example above, some help is required in the form of import specifications to determine the location of some definitions. In one embodiment, this property contains an array of symbol/location pairs to be searched for definitions. The symbol is declared using the import property, while the location is the service adapter where it is defined using the service property. In the above example, TaskStatus is to be found in the task service adapter. Omission of the service property indicates that the symbol is to be searched for in the current service adapter, as is the case in the above example for the symbol SddcStateChangeType. Instead of providing a location using the service property, it is also possible to provide an absolute or relative path to a file using the path property thus:<br>{ "import": "SddcStateChangeType", "path": "./SddcStateChangeType" } |
| pairs | This property specifies an array of key/value pairs using the properties key and value to populate the ES6 Map. In one embodiment, the type for the key and value should conform to the description for these above. | sets.json

In one embodiment, sets.json contains the specifications for generating language-neutral sets of typed objects for internal use by the service adapter, either for customized code, or for custom tests. A set is an abstract container that can be tested for the presence of an item and follows the same pattern as arrays described in a later section of this document.

In one embodiment, the autogenerated sets are not exposed in the service adapter interface (YAML), and therefore, such sets are not directly accessible from the application layer 230. Moreover, sets are currently not supported for service adapters written in Java.

In one embodiment, sets are a legacy implementation meant to be transportable across multiple languages. However, in one embodiment, standalone sets (not wrapped in a class) in languages other than Typescript are difficult to implement, so in one embodiment, custom code is used in its stead.

In the above excerpt, one embodiment wants to create a set named SddcReadyStatuses that contains objects of type string (since no CommonType was specified). Below is a detailed description of the various properties for specifying a set:

| Property | Description |
|---|---|
| sets | This property specifies an array of custom sets. In one embodiment, these sets are only for use within the service adapter or its custom tests. In one embodiment, the instantiated set is not exposed in the service adapter interface document and is, therefore, not referable from the application layer. |
| set | This property specifies the name of each set that is to be instantiated. In one embodiment, this name is referable from the service adapter and its mocks and tests, but is not exposed in the service adapter interface document. |
| type | This property specifies the type of the items in the set. In one embodiment, the type specification uses CommonType described in previous sections, however, nested is not permitted here since that would exceed the maximum nesting depth for a container (set is already a container). |
| imports | In one embodiment, when autogenerating a set, Servgen is able to infer the location where all references within the array are defined. In some cases, however, as in the example above, some help is required in the form of import specifications to determine the location of some definitions. This property contains a set of identifiers to be searched for definitions. The identifier is declared using the import property, while the location is the service adapter where it is defined using the service property. Omission of the service property indicates that the symbol is to be searched for in the current service adapter. Instead of providing a location using the service property, it is also possible to provide an absolute or relative path to a file using the path property. See the example for this in the section for arrays. |
| items | This property specifies an item to populate the set. The type for the item must conform to the description for it above. |

The following is an example of a set excerpted from the sddc-core service adapter:

```
{
  "sets": [
    {
      "set": "SddcReadyStatuses",
      "imports": [
        { "import": "SddcStatus" }
      ],
      "items": [
        { "item": "SddcStatus.Ready" },
        { "item": "SddcStatus.DeployingHosts" },
        { "item": "SddcStatus.DeletingHosts" },
        { "item": "SddcStatus.CreatingCluster" },
        { "item": "SddcStatus.DeletingCluster" },
        { "item": "SddcStatus.DeployHostsCanceling" },
        { "item": "SddcStatus.DeleteHostsCanceling" },
        { "item": "SddcStatus.CreateClusterCanceling" },
        { "item": "SddcStatus.DeleteClusterCanceling" },
        { "item": "SddcStatus.DeployHostsFailed" },
        { "item": "SddcStatus.DeleteHostsFailed" },
        { "item": "SddcStatus.DeleteClusterFailed" },
        { "item": "SddcStatus.CreateClusterFailed" },
        { "item": "SddcStatus.DeployHostsCanceled" },
        { "item": "SddcStatus.DeleteHostsCanceled" },
        { "item": "SddcStatus.CreateClusterCanceled" },
        { "item": "SddcStatus.DeleteClusterCanceled" },
        { "item": "SddcStatus.SrmActivateStarted" },
        { "item": "SddcStatus.SrmActivateFinished" },
        { "item": "SddcStatus.SrmActivateFailed" },
        { "item": "SddcStatus.SrmDeactivateStarted" },
        { "item": "SddcStatus.SrmDeactivateFinished" },
        { "item": "SddcStatus.SrmDeactivateFailed" }
      ]
    },
  ]
},
```

In one embodiment, for service adapters written in Typescript, the example specification above results in the following code being autogenerated in the service adapter:

```
import {SddcStatus } from './SddcStatus';
const arraySddcReadyStatuses: Array< string > = [
    SddcStatus.Ready,
    SddcStatus.DeployingHosts,
    SddcStatus.DeletingHosts,
    SddcStatus.CreatingCluster,
    SddcStatus.DeletingCluster,
    SddcStatus.DeployHostsCanceling,
    SddcStatus.DeleteHostsCanceling,
    SddcStatus.CreateClusterCanceling,
    SddcStatus.DeleteClusterCanceling,
    SddcStatus.DeployHostsFailed,
    SddcStatus.DeleteHostsFailed,
    SddcStatus.DeleteClusterFailed,
    SddcStatus.CreateClusterFailed,
    SddcStatus.DeployHostsCanceled,
    SddcStatus.DeleteHostsCanceled,
    SddcStatus.CreateClusterCanceled,
    SddcStatus.DeleteClusterCanceled,
    SddcStatus.SrmActivateStarted,
    SddcStatus.SrmActivateFinished,
    SddcStatus.SrmActivateFailed,
    SddcStatus.Srm DeactivateStarted,
    SddcStatus.SrmDeactivateFinished,
    SddcStatus.SrmDeactivateFailed
];
// NOTE: In one embodiment, SddcReadyStatuses is used
internally in SddcCore service. It will not be in the interface YAML.
export const SddcReadyStatuses = new Set<string>
(arraySddcReadyStatuses);
``` arrays.json

In one embodiment, arrays.json contains the specifications for generating language-neutral arrays of typed objects for internal use by the Service Adapter, either for customized code, or for custom tests.

In one embodiment, the autogenerated arrays are not exposed in the Service Adapter Interface (YAML), and therefore, such arrays are not directly accessible from the Application Layer 230. Moreover, arrays are currently not supported for Service Adapters written in Java.

In one embodiment, arrays are a legacy implementation meant to be transportable across multiple languages. However, in one embodiment, standalone arrays (not wrapped in a class) in languages other than Typescript are difficult to implement, so in one embodiment, custom code is used in its stead.

The following is an example of an array excerpted from the cloud-provider service adapter that is used for testing (mocks are described in a later section):

```
{
  "arrays": [
    {
      "array": "CloudProviders",
      "type": "AwsCloudProvider",
      "imports": [
        { "import": "AwsCloudProvider" },
        { "import": "CloudProviderMocks", "path": "../tests/cloud-provider.data.mock" }
      ],
      "items": [
        { "item": "CloudProviderMocks.MockZeroCloud( )" },
        { "item": "CloudProviderMocks.MockOneCloud( )" },
        { "item": "CloudProviderMocks.MockAWS( )" }
      ]
    }
  ]
},
```

In the above excerpt, one embodiment wants to create an array named CloudProviders that contains objects of type AwsCloudProvider. Below is a detailed description of the various properties for specifying an array:

In one embodiment, for service adapters written in Typescript, the example specification above results in the following code being autogenerated in the service adapter:

```
import { AwsCloudProvider } from './AwsCloudProvider';
import { CloudProviderMocks } from '../tests/cloud-provider.data.mock';
// NOTE: In one embodiment, CloudProviders can only be used internally
in CloudProvider service. It will not be in the interface YAML.
export const CloudProviders: Array< AwsCloudProvider > = [
  CloudProviderMocks.MockZeroCloud( ),
  CloudProviderMocks.MockOneCloud( ),
  CloudProviderMocks.MockAWS( )
];
``` mocks.json

In one embodiment, mocks.json contains the specifications for generating language-neutral populated mocks of data structures for internal use by the service adapter, either for customized code, or for custom tests, as well as for testing components in the application layer 230 by requesting a mock in response to a request to a service adapter.

In one embodiment, the autogenerated mocks are not exposed in the service adapter interface (YAML), and therefore, such mocks are not directly accessible from the Application Layer 230. In one embodiment, mocks can be accessed directly from Typescript application components if the service adapter is also written in Typescript. In one embodiment, custom code is used in its stead. In one embodiment, mock data structures are automatically generated, even in the absence of a mocks.json, for every class referred to in the service adapter, with default values for their properties based on their respective type. So, mocks.json is only required to create custom mocks with specified values, or complex combination of one or more mocks.

Here is an example of some mock specifications excerpted from the sddc-core service adapter:

| Property | Description |
|---|---|
| arrays | This property specifies an array of custom arrays. In one embodiment, these arrays are only for use within the service adapter or its custom tests. The instantiated array is not exposed in the service adapter interface document and is, therefore, not referable from the application layer. |
| array | This property specifies the name of each array that is to be instantiated. In one embodiment, this name is referable from the service adapter and its mocks and tests, but is not exposed in the service adapter interface document. |
| type | This property specifies the type of the items in the array. In one embodiment, the type specification uses CommonType described in previous sections, however, nested is not permitted here since that would exceed the maximum nesting depth for a container (array is already a container). |
| imports | In one embodiment, in autogenerating an array, Servgen is able to infer the location where all references within the array are defined. In some cases, however, as in the example above, some help is required in the form of import specifications to determine the location of some definitions. This property contains an array of identifiers to be searched for definitions. The identifier is declared using the import property, while the location is the service adapter where it is defined using the service property. In the above example, AwsCloudProvider is to be found in the cloud-provider service adapter. Omission of the service property indicates that the symbol is to be searched for in the current service adapter. Instead of providing a location using the service property, it is also possible to provide an absolute or relative path to a file using the path property as shown in the above example for the identifier CloudProviderMocks. |
| items | |

```
{
    "mocks": [
        {
            "name": "ESX1",
            "class": "EsxHost",
            "properties":
                { "property": "name", "value": "Not Really ESX1" },
                { "property": "hostname", "value": "zerocloud.esx.local1" },
                { "property": "mac_address", "value": "01-23-45-67-89-ab" }
            ]
        },
        {
            "name": "ESX2",
            "clone": "ESX1",
            "properties": [
                { "property": "name", "value": "Not Really ESX2" },
                { "property": "hostname", "value": "zerocloud.esx.local2" },
                { "property": "mac_address", "value": "01-23-45-67-89-ac" }
            ]
        },
        {
            "name": "ClusterWithPendingCloudDeletionHost",
            "clone": "Cluster1",
            "properties": [
                { "property": "esx_host_list", "value": "MockESX1( ), MockESX2( ), MockESX3( ), MockESX4( ), MockPendingCloudDeletionESX( )", "container": "array" }
            ]
        },
        {
            "name": "ClusterReconfigResponseWithEmptyCapacity",
            "class": "VsanClusterReconfigConstraints",
            "properties": [
                {
                    "property": "available_capacities",
                    "container": "map",
                    "nested": "array",
                    "type": "VsanAvailableCapacity",
                    "value": " ",
                    "empty": true
                }
            ]
        },
        {
            "name": "AwsInstanceAvailability",
            "map": "AwsProvisionMap",
            "properties": [
                { "property": "eu-west-3", "value": "MockI3InstanceTypeConfig( )", "container": "array" },
                { "property": "eu-west-2", "value": "MockI3InstanceTypeConfig( ), MockR5InstanceTypeConfig( )", "container": "array" }
            ]
        },
        {
            "name": "DefaultSegment",
            "class": "Segment",
            "properties": [
                {
                    "property": "resource_type",
                    "value": "Segment",
                    "type": "string",
                    "literal": true
                }
            ]
        },
```

In one embodiment, the above specification indicates the creation of two mocked data structures named ESX1 and ESX2, with the latter being cloned from the former. Additionally, a third complex mock called ClusterWithPendingCloudDeletionHost has been specified, which is a completely different data structure, which populates one of its properties, esx_host_list, with an array containing the previous two mocks.

In one embodiment, the result of specifying a mock is the instantiation of a callable function which returns a populated data structure, and the specified name is prefixed with the string Mock. Also, when referring to such mocks in the specifications, they are suffixed by parentheses, e.g. MockESX1( ).

The following describes the properties used in the above example:

| Property | Description |
| --- | --- |
| mocks | This property specifies an array of custom mocked classes. In one embodiment, these mocked classes are accessible for service adapters written in Typescript. In one embodiment, these mocked classes are instantiated in the application layer 230 via Modelgen 232. In one embodiment, the forceResponse function used to specify that a specific mock is returned for unit tests in the application layer 230 for a Typescript application, will be replaced by a bifrost message. |
| name | This property specifies the name of a mocked class that is to be instantiated. This name is referable from the service adapter and its mocks and tests. In one embodiment, it is not exposed in the service adapter interface document. In one embodiment, it is exposed in the service adapter interface document. When referring to this mock, prefix the name with Mock and append parentheses: ( ) which accesses the autogenerated mock function that returns the populated class. So, for example, in one embodiment, in order to access the above example mock named ESX1, refer to it as MockESX1( ) (except when cloning it, as described below). |
| class | This property specifies the class being mocked. In the above example, ESX1 is a custom mock that is instantiated using the class EsxHost. The mock is initially populated with default values for each of its properties, based on their respective type. One or more of these properties can then be independently populated with custom values as described below. |
| api_source | This is an optional qualifier for class to disambiguate which Api Specification document contains the definition for the required class, when the name collides with the definition in another YAML. e.g. "api_source": "network" specifies that the definition in network-api-doc.yaml should be used. |
| array | When the class being mocked is an array, one embodiment uses the property array instead of class, as shown in the above example for AwsInstanceAvailability. |
| map | When the class being mocked is an E56 Map, one embodiment uses the property map instead of class, as shown in the above example for AwsInstanceAvailability. |
| clone | This property specifies that a mocked class be instantiated as an exact copy of another mock so that one or more properties can be altered from that of the original mock. When this property is specified, then it is not necessary to specify the class property, as that property in the original class is used. In the above example, ESX2 is cloned from ESX1 and new values are specified for some of the properties, while keeping the rest of the properties the same as in the original mock. |
| properties | This property specifies an array of mocked class properties that are to be populated with custom values as described below. |
| items | When an array is being mocked, items is used to specify the array of element values instead of properties |

In one embodiment, each property in a mocked class that is to be assigned a mock value has additional qualifier properties described in detail below:

| Property | Description |
| --- | --- |
| property | This is the name of the mocked class property to be populated with mock values. In one embodiment, when the mock is for an ES6 Map, each property is a key for the map entry, and value, described below, is the content for this key. See the end of this section for sample code that is autogenerated to mock AwsInstanceAvailability. |
| item | In one embodiment, when an array is being mocked, item is used instead of property, and each item object has a value for that element, qualified by CommonType. |
| value | This property specifies the content to be assigned to this property. In the example above for ClusterWithPendingCloudDeletionHost, the property esx_host_list is assigned an array containing the mocked classes MockESX( ) and MockESX2( ). Note how array elements are specified with comma separation. It is valid to set the value for a property in a mocked class to be null. See empty below for an example of how to set a property with a nested container to be empty. |
| type | This property specifies the type of the value for this mock. In one embodiment, the type specification uses CommonType (content/nested/type) described in previous sections. The are a few additional type qualifiers such as literal and empty, described below. Also, refer to the example above for ClusterReconfigResponseWithEmptyCapacity, where the value is an E56 Map of an array of VsanAvailableCapacity. As with all other specifications, in one embodiment, if type is not specified, it is assumed to be string. |
| literal | When assigning a value to a mocked class property, there can be ambiguity as to what is specified. Consider the example above of the mock DefaultSegment, which mocks the Segment class. This mock tries to assign the string "Segment" to the resource_type. In one embodiment, by setting literal, the specification tells Servgen not to try to infer whether Segment should be further analyzed to be a reference to be the class segment, and to take the string literally and assign it as a quoted string, rather than as a variable or a constant. |

| Property | Description |
| --- | --- |
| empty | For nested containers that need to be assigned to a mocked class property, sometimes it is desirable to set the property to be empty. In the above example for the mock ClusterReconfigResponseVVithEmptyCapacity, the property available_capacities, is an ES6 Map container, which boasts a nested array of type VsanAvailableCapacity. By setting value: "", intent compiler 100 is specifying that the array is empty, although the ES6 Map still contains the empty array. By further setting "empty": true, intent compiler 100 is specifying that the ES6 Map itself should have no content (in which case, setting "value": "" is redundant). |
| key | In one embodiment, when an ES6 Map is mocked, it is instantiated with a default string for the key to the map. This property allows for a specified value for the map key. |

Normally, Servgen 220 pulls a class definition and includes it in the service interface document that it outputs, so that the class can be declared in the application layer 230 by Modelgen 232, if the class is referred to in a service request parameter or response, if it is a class or its ancestor, or its property is a class or its ancestor.

In one embodiment, there is a desire where some classes not captured by the above criterion need to be included so that the application can refer to it. A typical example is when a polymorphic parent class is included, but none of its polymorphic children are included in the Service Adapter Interface YAML. Mocking the desired class with no properties will get that class included. Here is an example:

```
{
    "mocks": [
```

```
{
    "name": "YourMockName",
    "class": "AwsSddcResouceConfig",
},
```

In one embodiment, the above will pull in and expose access to the AwsSddcResouceConfig class via Modelgen 232 to the application layer 230.

Sample Autogenerated Mocks

In one embodiment, for service adapters written in Typescript, this is an example of code being autogenerated in the service adapter for a few mocked classes excerpted from the above example specifications and added to the token service adapter which was used as an example in previous sections:

```
const DEFAULT_STRING = '# This is the default string for tests #';
const DEFAULT_INTEGER = 12345;
const DEFAULT_BOOLEAN = false;
const DEFAULT_OBJECT = { };
export namespace TokenMocks {
// Instantiated classes
    // Mock for AuthToken - generateMock
    export const MockJsonAuthToken = {
        auth_token: DEFAULT_STRING,
        id_token: DEFAULT_STRING,
    };
    export function MockAuthToken( ): AuthToken {
        const json = Object.assign({ }, MockJsonAuthToken);
        const baseAuthToken = new BaseAuthToken(json);
        const newMock = AuthToken.factory(baseAuthToken);
        return newMock;
    }
    // Mock for AwsKms Info - generateMock
    export const MockJsonAwsKmsInfo = {
        kms_key_provider_id: DEFAULT_STRING,
        amazon_resource_name: DEFAULT_STRING,
    };
    export function MockAwsKmsInfo( ): AwsKmsInfo {
        const json = Object.assign({ }, MockJsonAwsKmsInfo);
        const baseAwsKmsInfo = new BaseAwsKmsInfo(json);
        const newMock = AwsKmsInfo.factory(baseAwsKmsInfo);
        return newMock;
    }
    // Mock for Credential - generateMock
    export const MockJsonCredential = {
        password: DEFAULT_STRING,
        username: DEFAULT_STRING,
    };
        export function MockCredential( ): Credential {
        const json = Object.assign({ }, MockJsonCredential);
        const baseCredential = new BaseCredential(json);
        const newMock = Credential.factory(baseCredential);
        return newMock;
    }
    // Mock for EntityCapacity - generateMock
    export const MockJsonEntityCapacity = {
```

```
    total_number_of_cores: DEFAULT_INTEGER,
    cpu_capacity_ghz: DEFAULT_INTEGER,
    memory_capacity_gib: DEFAULT_INTEGER,
    number_of_ssds: DEFAULT_INTEGER,
    storage_capacity_gib: DEFAULT_INTEGER,
    number_of_sockets: DEFAULT_INTEGER,
};
export function MockEntityCapacity( ): EntityCapacity {
    const json = Object.assign({ }, MockJsonEntityCapactiy);
    const baseEntityCapacity = new BaseEntityCapacity(json);
    const newMock = EntityCapacity.factory(baseEntityCapacity);
    return newMock;
}
// Mock for EsxHostInfo - generateMock
export const MockJsonEsxHostInfo = {
    instance_type: DEFAULT_STRING,
};
export function MockEsxHostInfo( ): EsxHostInfo {
    const json = Object.assign({ }, MockJsonEsxHostInfo);
    const baseEsxHostInfo = new BaseEsxHostInfo(json);
    const newMock = EsxHostInfo.factory(baseEsxHostInfo);
    return newMock;
}
// Mock for EsxStorage Device - generateMock
export const MockJsonEsxStorageDevice = {
    device_name: DEFAULT_STRING,
    vmhba_name: DEFAULT_STRING,
    serial_number: DEFAULT_STRING,
    esx_id: DEFAULT_STRING,
};
export function MockEsxStorageDevice( ): EsxStorageDevice {
    const json = Object.assign({ }, MockJsonEsxStorageDevice);
    const baseEsxStorageDevice = new BaseEsxStorageDevice(json);
    const newMock = EsxStorageDevice.factory(baseEsxStorageDevice);
    return newMock;
}
// Mock for StorageVolume - generateMock
export const MockJsonStorageVolume = {
    // Polymorphic class parent - needs a custom default mock . . .
    // custom mock 'MockStorageVolume( )' will be returned in its place from
token.rest.mock.
    creation_time: DEFAULT_STRING,
    volume_state: DEFAULT_STRING,
    provider: DEFAULT_STRING,
    tags: new Map<string, string>([[DEFAULT_STRING, DEFAULT_STRING]]),
    id: DEFAULT_STRING,
    size: DEFAULT_INTEGER,
    encrypted: DEFAULT_BOOLEAN,
    iops: DEFAULT_INTEGER,
};
export function MockStorageVolume( ): StorageVolume {
    const json = Object.assign({ }, MockJsonStorageVolume);
    const baseStorageVolume = new BaseStorageVolume(json);
    const newMock = StorageVolume.factory(baseStorageVolume);
    return newMock;
}
// Mock for VsanAvailableCapacity - generateMock
export const MockJsonVsanAvailableCapacity = {
    size: DEFAULT_INTEGER,
    cost: DEFAULT_STRING,
    quality: DEFAULT_STRING,
};
export function MockVsanAvailableCapacity( ): VsanAvailableCapacity {
    const json = Object.assign({ }, MockJsonVsanAvailableCapacity);
    const baseVsanAvailableCapacity = new BaseVsanAvailableCapacity(json);
    const newMock =
VsanAvailableCapacity.factory(baseVsanAvailableCapacity);
    return newMock;
}
// Mock for VsanClusterReconfigBias - generateMock
export const MockJsonVsanClusterReconfigBias = {
    short_description: DEFAULT_STRING,
    full_description: DEFAULT_STRING,
    id: DEFAULT_STRING,
};
export function MockVsanClusterReconfigBias( ): VsanClusterReconfigBias {
    const json =Object.assign({ }, MockJsonVsanClusterReconfigBias);
    const baseVsanClusterReconfigBias = new
```

```
BaseVsanClusterReconfigBias(json);
    const newMock =
VsanClusterReconfigBias.factory(baseVsanClusterReconfigBias);
    return newMock;
}
// Mock for VsanDiskGroup - generateMock
export const MockJsonVsanDiskGroup = {
    cache_volume_id: DEFAULT_STRING,
    capacity_volume_ids: [DEFAULT_STRING],
};
export function MockVsanDiskGroup( ): VsanDiskGroup {
    const json = Object.assign({ }, MockJsonVsanDiskGroup);
    const baseVsanDiskGroup = new BaseVsanDiskGroup(json);
    const newMock = VsanDiskGroup.factory(baseVsanDiskGroup);
    return newMock;
}
// Mock for VsanClusterReconfigConstraints - generateMock
export const MockJsonVsanClusterReconfigConstraints = {
    available_capacities: new Map<string,
Array<VsanAvailableCapacity>>([[DEFAULT_STRING,[MockVsanAvailableCapacity( )]
]]),
    default_capacities: new Map<string,
VsanAvailableCapacity>([[DEFAULT_STRING,MockVsanAvailableCapacity( )]]);,
    reconfig_biases: [MockVsanClusterReconfigBias( )],
    default_reconfig_bias_id: DEFAULT_STRING,
    hosts: DEFAULT_INTEGER,
};
export function MockVsanClusterReconfigConstraints( ):
VsanClusterReconfigConstraints {
    const json = Object.assign({ }, MockJsonVsanClusterReconfigConstraints);
    const baseVsanClusterReconfigConstraints = new
BaseVsanClusterReconfigConstraints(json);
    const newMock =
VsanClusterReconfigConstraints.factory(baseVsanClusterReconfigConstraints);
    return newMock;
}
// Mock for InstanceTypeConfig - generateMock
export const MockJsonInstanceTypeConfig = {
    display_name: DEFAULT_STRING,
    entity_capacity: MockEntityCapacity( ),
    hosts: [DEFAULT_INTEGER],
    instance_type: DEFAULT_STRING,
};
export function MockInstanceTypeConfig( ): InstanceTypeConfig {
    const json = Object.assign({ }, MockJsonInstanceTypeConfig);
    const baseInstanceTypeConfig = new BaseInstanceTypeConfig(json);
    const newMock = InstanceTypeConfig.factory(baseInstanceTypeConfig);
    return newMock;
}
// Mock for EsxHost - generateMock
export const MockJsonEsxHost = {
    // Polymorphic class parent - needs a custom default mock . . .
    // custom mock 'MockEsxHost( )' will be returned in its place from
token.rest.mock.
    mac_address: DEFAULT_STRING,
    availability_zone: DEFAULT_STRING,
    local_devices: [MockEsxStorageDevice( )],
    custom_properties: new Map<string, string>([[DEFAULT_STRING,
DEFAULT_STRING]]),
    esx_id: DEFAULT_STRING,
    instance_type: DEFAULT_STRING,
    hostname: DEFAULT_STRING,
    name: DEFAULT_STRING,
    provider: DEFAULT_STRING,
    esx_state: DEFAULT_STRING,
    esx_credential: MockCredential( ),
};
export function MockEsxHost( ): EsxHost {
    const json = Object.assign({ ], MockJsonEsxHost);
    const baseEsxHost = new BaseEsxHost(json);
    const newMock = EsxHost.factory(baseEsxHost);
    return newMock;
}
// Mock for ConfigSpec - generateMock
export const MockJsonConfigSpec = {
    availability: new Map<string,
Array<InstanceTypeConfig>>([[DEFAULT_STRING,[MockInstanceTypeConfig( )]]]),
expiry_in_days: DEFAULT_INTEGER,
};
```

-continued

```
export function MockConfigSpec( ): ConfigSpec {
  const json = Object.assign({ }, MockJsonConfigSpec);
  const baseConfigSpec = new BaseConfigSpec(json);
  const newMock = ConfigSpec.factory(baseConfigSpec);
  return newMock;
}
// Mock for Cluster - generateMock
export const MockJsonCluster = {
  cluster_name: DEFAULT_STRING,
  volume_list: [MockStorageVolume( )],
  vsan_subcluster_uuid: DEFAULT_STRING,
  host_cpu_cores_count: DEFAULT_INTEGER,
  disk_group_list: [MockVsanDiskGroup( )],
  billed_storage_capacity: DEFAULT_INTEGER,
  cluster_capacity: MockEntityCapacity( ),
  esx_host_list: [MockEsxHost( )],
  internal_host_count: DEFAULT_INTEGER,
  aws_kms_info: MockAwsKmsInfo( ),
  cluster_vcenter_mo_id: DEFAULT_STRING,
  cluster_state: DEFAULT_STRING,
  esx_host_info: MockEsxHostInfo( ),
  cluster_id: DEFAULT_STRING,
};
export function MockCluster( ): Cluster {
  const json = Object.assign({ }, MockJsonCluster);
  const baseCluster = new BaseCluster(json);
  const newMock = Cluster.factory(baseCluster);
  return newMock;
}
// Mock for SddcConfigSpec - generateMock
export const MockJsonSddcConfigSpec = {
  region_display_names: new Map<string, string>([[DEFAULT_STRING,
DEFAULT_STRING]]),
  sddc_type_config_spec: new Map<string,ConfigSpec>{[[DEFAULT_STRING,
MockConfigSpec( )]]),
};
  export function MockSddcConfigSpec( ): SddcConfigSpec {
  const json = Object.assign({ }, MockJsonSddcConfigSpec);
  const baseSddcConfigSpec = new BaseSddcConfigSpec(json);
  const newMock = SddcConfigSpec.factory(baseSddcConfigSpec);
  return newMock;
}
// Request Params
// Response Objects
export function MockTokenGetTokenResponseObject( ):
TokenGetTokenResponseObject {
    return new TokenGetTokenResponseObject(MockAuthToken( ));
}
// Autogenerated Custom Mocks
// Mock for ESX1 - generateCustomMock
export function MockESX1( ): EsxHost {
  const json Object.assign({ }, MockJsonEsxHost);
  const baseEsxHost = new BaseEsxHost(json);
  // Properties for MockESX1
  // type: string
  baseEsxHost['name'] = 'Not Really ESX1';
  // type: string
  baseEsxHost['hostname'] = 'zerocloud.esx.local1';
  // type: string
  baseEsxHost['mac_address'] ='01-23-45-67-89-ab';
  const newMock = EsxHost.factory(baseEsxHost);
  return newMock;
}
// Mock for ESX2 - generateCustomMock
export function MockESX2( ): EsxHost {
  const json = Object.assign({ }, MockJsonEsxHost);
  const baseEsxHost = new BaseEsxHost(json);
  // Properties from MockESX1
  // Properties for MockESX2
  // type: string
  baseEsxHost['name'] = 'Not Really ESX2';
  // type: string
  baseEsxHost['hostname'] = 'zerocloud.esx.local2';
  // type: string
  baseEsxHost['mac_address'] = '01-23-45-67-89-ac';
```

```
        const newMock = EsxHost.factory(baseEsxHost);
        return newMock;
    }
    // Mock for Cluster1 - generateCustom Mock
    export function MockCluster1( ): Cluster {
        const json =Object.assign({ }, MockJsonCluster);
        const baseCluster = new BaseCluster(json);
        // Properties for MockCluster1
        // type: string
        baseCluster['cluster_id'] = '338d1f75-a8ed-40a7-8774-ee983111eaf2';
        // type: string
        baseCluster['cluster_name'] = 'Cluster-1';
        // type: string
        baseCluster['cluster_state'] = 'READY';
        // type: string
        baseCluster['cluster_capacity'] = MockEntityCapacity( );
        // type: Array<string>
        baseCluster['esx_host_list'] = [MockESX1( ), MockESX2( ), MockESX3( ),
MockESX4( )];
        const newMock = Cluster.factory(baseCluster);
        return newMock;
    }
    // Mock for ClusterWithPendingCloudDeletionHost - generateCustomMock
    export function MockClusterWithPendingCloudDeletionHost( ): Cluster {
        const json = Object.assign({ }, MockJsonCluster);
        const baseCluster = new BaseCluster(json);
        // Properties from MockCluster1
        baseCluster['cluster_id'] = '338d1f75-a8ed-40a7-8774-ee983111eaf2';
        baseCluster['cluster_name'] = 'Cluster-1';
        baseCluster['cluster_state'] = 'READY';
        baseCluster['cluster_capacity'] = MockEntityCapacity( );
        // Properties for MockClusterWithPendingCloudDeletionHost
        // type: Array<string>
        baseCluster['esx_host_list'] = [MockESX1( ), MockESX2( ), MockESX3( ),
MockESX4( ), MockPendingCloudDeletionESX( )];
        const newMock = Cluster.factory(baseCluster);
        return newMock;
    }
    // Mock for ClusterReconfigResponseWithEmptyCapacity - generateCustomMock
    export function MockClusterReconfigResponseWithEmptyCapacity( ):
VsanClusterReconfigConstraints {
        const json = Object.assign({ }, MockJsonVsanClusterReconfigConstraints);
        const baseVsanClusterReconfigConstraints = new
BaseVsanClusterReconfigConstraints(json);
        // Properties for MockClusterReconfigResponseWithEmptyCapacity
        // type: Map<string, Array<VsanAvailableCapacity >>
        baseVsanClusterReconfigConstraints['available_capacities'] = new
Map<string, Array<VsanAvailableCapacity >>( );
        const newMock =
VsanClusterReconfigConstraints.factory(baseVsanClusterReconfigConstraints);
        return newMock;
    }
    // Mock for Map AwsInstanceAvailability - generateCustomMapMock
    export function MockAwsInstanceAvailability( ): Map<string,
Array<InstanceTypeConfig>> {
        const mockMap = AwsProvisionMap;
        mockMap.set('eu-west-3', [MockI3InstanceTypeConfig( )]);
        mockMap.set('eu-west-2', [MockI3InstanceTypeConfig( ),
MockR5InstanceTypeConfig( )]);
        return mockMap;
    }
}
``` testing.json

In one embodiment, testing.json contains specifications for modifying the behavior of the autogenerated REST Mock Service (described in detail herein), as well as the autogenerated unit tests for a service adapter.

Here is an example of a testing specification modified from the reservation Service Adapter:

```
{
    "testing": [
        {
            "defaults": [
                {
                    "class": "ReservationWindow", "default":
"UpcomingReservationWindow"
                }
            ],
            "initializers": [
                {
                    "class": "ReservationUtil",
                    "method": "initializeStoreWithMocks",
                    "params": [
                        {
                            "param":"ReservationMocks.
```

```
            MockUpcomingReservationWindo
                w( )", "container":"array"
            }
        ],
        "imports": [
            {
                "import": "ReservationUtil",
                "path": "@vmc/utilities/reservation/reservation.util"
            },
            {
                "import": "ReservationMocks",
                "service": "reservation"
            }
        ]
    }
    ]
    }
    ]
}
```

In one embodiment, as shown above, two testing properties have been specified.

| Property | Description |
|---|---|
| defaults | In one embodiment, this property specifies that in the Mocked REST Service, whenever the specified class is returned from an API call (mocked), it should, instead, return the mocked class specified by defaults as shown in the above example specification. |
| initializers | In one embodiment, such as in autogenerated unit tests, it is important to preset the test environment with some custom code, encapsulated in a function call with some arguments. This property allows for the specification of such an initializer function, along with zero or more arguments that it should be called with, as shown in the above example specification. |

Specifying Replacement Responses in the Mocked REST Service

In the example specification for defaults above, it has been specified that whenever the Mocked REST service for a service adapter would have otherwise returned the class ReservationWindow (including container or nesting) as specified by the class property, it should, instead return the mock indicated by UpcomingReservationWindow (prepended with Mocked and appended with parentheses), as specified by the default property.

In one embodiment, this results in the following code being autogenerated in the service adapter:

```
export class MockReservationRestService extends
AbstractAutoRestMock {
    constructor( ) {
        super('MockReservationRestService', 'ReservationService');
    }
    protected httpPost(restRequestObject: RestObject, args?:
MessageArgs) {
        switch (restRequestObject.apiClass as string) {
            case 'API_OrgsOrgTbrsReservation': { // postTbrs
                let jsonMap = { };
                jsonMap['# This is the default string for tests #'] =
[ReservationMocks. MockUpcomingReservationWindow( )];
                this.handleData(jsonMap, restRequestObject, args);
                break;
            }
            :
            :
```

Specifying Initializers in Autogenerated Unit Tests

In the example specification for initializers above, in one embodiment, it has been specified that before each unit test, a call to a static method named initializeStore WithMocks, specified using the method property, that is implemented in the class ReservationUtil as specified with the class property, and pass it the arguments described in the params array of qualifications.

In the example, there is only one argument, that is derived from calling ReservationMocks.MockUpcomingReservationWindow( ), as specified by the param property, and this is an ES6 Map class that has a nested array. It is also indicated that it would be good for the map key to be the string YourCustomKey, as specified by the key property. Note the use of CommonType in the qualifications. In one embodiment, if key had not been specified, the default string '#This is the default string for tests #' would have been used as the map key.

For service adapters written in Typescript, the example specification above results in the following code being autogenerated in the unit tests for this service adapter:

```
beforeEach(( ) => {
    bus = BusTestUtil.bootBus( );
```

```
    UserUtil.createUserStoreForTests( );
    // Custom Test Initializers from testing.json
    ReservationUtil.initializeStoreWithMocks([ReservationMocks.
MockUpcomingReservationWindow( )]);
    restService = new MockReservationRestService( );
    reservationService = new ReservationService( );
});
```

Automatic Unit Test Generation

In one embodiment, one of the very important functions performed by Servgen 220 is the automatic generation of unit tests that provides 100% of the test coverage for all autogenerated service adapters. In one embodiment, this possible because the service adapter specification document(s) 227 contains the complete specification for all requests and responses between an application and a service adapter and includes all parameters and service response objects, which allows for testing that each service request with the specified parameters results in expected responses from the Service Adapter. In one embodiment, mock data structures and automatic unit test generation are only performed for service adapter 107 written in Typescript. In one embodiment, mock data structures and automatic unit test generation are also performed for service adapter 107 written in Java and Golang.

Mocks

In one embodiment, to implement the above unit tests, Servgen 220 will autogenerate mock data structures for all classes and enumerations used by the service adapter. An autogenerated sub-folder called tests is autogenerated for each service adapter and is populated with a number of files to support the autogeneration of unit tests. The mock data structures are automatically generated in the file xxx.data- .mocks.ts, where xxxx is replaced by the name, even in the absence of a mocks.json, for every class referred to in the service adapter, with default values for their properties based on their respective type. So, in one embodiment, mocks.json is only required to create custom mocks with specified values, or complex combination of one or more mocks.

In one embodiment, the purpose of a mock data structure is to enable simulated synthetic responses to requests to the service adapter from unit tests, without having to actually make an API call to a backend service 202, and to return the exact type of response from that simulated call, as described in the API Specification document for that service.

Mock Architecture

In one embodiment, a mock is a layered entity that is built up on 4 layers of autogeneration as depicted in FIG. 3. In one embodiment, FIG. 3 depicts a diagram of a mock architecture 301 generated by servgen 220, in accordance with an embodiment. In one embodiment, the mock architecture 301 includes readonly accessors 310, language-neutral classes 315, composite objects 320, and default foundation types 325.

In one embodiment, the content of a data mock is not relevant to generating unit tests for a Service Adapter, however, the type of mock and its internal sub-types are important and should be precise. So, in one embodiment, each layer in FIG. 3 has to be constructed by depending on the manifestation of its previous layer.

In one embodiment, for disambiguation, all mock data structures for a service adapter are enclosed in a unique namespace, which contains both internal as well as exported symbols. e.g. the mock data structures for the token service adapter is contained in a namespace called TokenMocks. In one embodiment, the namespace label is created by concatenating the service adapter's name with the suffix Mock and then converted to PascalCase.

In one embodiment, any exported symbol from the mock data structures of a service adapter would be qualified by the containing namespace. In Typescript, the namespace declaration for the task Service Adapter is:
export namespace TaskMocks {

In one embodiment, At the heart of a data mock are a small set of foundation types which are assigned default values, and all the autogenerated mock data structures arevbuilt atop the foundation types. These are the 4 default foundation types upon which all the subsequent layers are built:

DEFAULT_STRING which is a string type which has a default value of: '#This is the default string for tests #';

DEFAULT_INTEGER which is an arbitrary precision Integer with a default value of 12345;

DEFAULT_BOOLEAN which is a Boolean with a default value of false; and

DEFAULT_OBJECT which is an abstract object with a default value of { } (an empty object).

In one embodiment, for a Typescript version of a service adapter, this is the generated code for these in all data- .mock.ts files:

```
const DEFAULT_STRING = '# This is the default string for tests #';
const DEFAULT_INTEGER = 12345;
const DEFAULT_BOOLEAN = false;
const DEFAULT_OBJECT = { };
```

In one embodiment, these default values can be overridden by the appropriate specifications in testing.json and/or mocks.json.

In one embodiment, the next step in creating a mock data structure requires the construction of composite objects for every class that is referenced by the service adapter. In one embodiment, a composite object is another name for a JSON object, that is populated by using the foundation types described above. As an example, consider the composite object that is created for the AuthToken class in the token service adapter:

```
// Instantiated classes
    // Mock for AuthToken - generateMock
    export const MockJsonAuthToken = {
        auth_token: DEFAULT_STRING,
        id_token: DEFAULT_STRING,
    };
```

In one embodiment, as shown above, a JSON object is initialized to represent the properties of the AuthToken class, which consists of two properties, id_token and auth_token. Since they are both strings, both properties are populated by the foundation type: DEFAULT_STRING. In one embodiment, this JSON can be used to construct language-specific classes in a multitude of languages, including Typescript, Java, Golang, and the like.

In one embodiment, language-neutral classes are desired. In one embodiment, the above JSON object is not useful in its current form for the purpose of unit tests. Depending on the language used to implement the service adapter, the JSON object has to be converted into a language-specific class, that matches the response class generated by Apigen 213-language bindings For APIs. In one embodiment, the exact code is specific to each language, particularly languages like Golang, which do not have the concept of a class.

However, in the example mock for the AuthToken class referred to above, this is the Typescript code that is generated:

```
const json = Object.assign({ }, MockJsonAuthToken);
const baseAuthToken = new BaseAuthToken(json);
const newMock = AuthToken.factory(baseAuthToken);
```

In the embodiment shown above, the BaseAuthToken class, as autogenerated by Apigen 213, is constructed by passing the composite object: MockJsonAuthToken to its constructor. In one embodiment, the actual mechanics of converting the composite object properties into properties of the new BaseAuthToken class is left to its constructor and is opaque to all components of the intent compiler 100. In one embodiment, this opacity allows for different techniques to be employed, depending on the implementation language of the service adapter. The next step is to convert the BaseAuthToken class into the AuthToken class. In one embodiment, this is done by invoking the autogenerated factory( ) function which is an appendage of all autogenerated classes. Thus, in the above, newMock is an instance of the AuthToken class that has been fully populated using the MockJsonAuthToken Composite Object, which in turn was populated by the foundation type: DEFAULT_STRING.

Referring now to readonly accessors, in the world of object-oriented programming (OOP), it is considered bad form to have direct access to an object, and a getter function is the preferred way to have read-only access to an object and its exported properties. In support of this pattern, in one embodiment, the final step is the creation of a function that returns the constructed mock data structure and is the controlled way to provide access to it, without fear of having the mock mutated by one test, resulting in corruption for subsequent tests. The following is the entire mock for the token service adapter and the function MockAuthToken returns the desired mock. All autogenerated functions that return a mock data structure, have the prefix Mock in their name.

```
const DEFAULT_STRING = '# This is the default string for tests #';
const DEFAULT_INTEGER = 12345;
const DEFAULT_BOOLEAN = false;
const DEFAULT_OBJECT = { };
export namespace TokenMocks {
// Instantiated classes
   // Mock for AuthToken - generateMock
   export const MockJsonAuthToken = {
     auth_token: DEFAULT_STRING,
     id_token: DEFAULT_STRING,
   };
   export function MockAuthToken( ): AuthToken {
     const json = Object.assign({ }, MockJsonAuthToken);
     const baseAuthToken = new BaseAuthToken(json);
     const newMock = AuthToken.factory(baseAuthToken);
     return newMock;
   }
// Request Params
// Response Objects
   export function MockTokenGetTokenResponseObject( ):
TokenGetTokenResponseObject {
     return new TokenGetTokenResponseObject(MockAuthToken( ));
   }
}
```

In one embodiment, as shown above, two functions have been implemented: TokenMocks.MockAuthToken( ), and TokenMocks.MockTokenGetTokenResponseObject( ). In one embodiment, the former is how a mock for the Auth-Token is created, and in the latter, TokenMocks.MockTokenGetTokenResponseObject( ) function, internally calls the TokenMocks.MockAuthToken( ) function, in order to simulate the response from the GetToken request to the token Service Adapter.

In one embodiment, a custom mock is desired. The above section has described how mock data structures are automatically autogenerated from all classes to which a service adapter may refer. In more complex cases, it is desirable to have custom mock data structures created with specific values for the properties in a class. In one embodiment, these are used in customized unit tests described herein. In one embodiment, the file mocks.json specifies how such a custom mock is described.

Consider the specification in the reservation service adapter in VMC, where a custom mock, StatusInDataPlane, has been specified:

```
{
   "mocks": [
     {
       "name": "StatusInDataPlane",
       "class": "ReservationStatus",
       "properties": [
         { "property": "status", "value":
           "MaintenanceStatus.DATAPLANE",
```

```
           "type": "enum" }
         ]
     },
```

In one embodiment, the class property in the above spec causes a custom mock data structure to be instantiated from the autogenerated mock, ReservationMocks.MockReservationStatus( ). Subsequently, the property status in the new mock data structure is modified to replace its default value of DEFAULT_STRING with a new value "MaintenanceStatus.DATAPLANE", which is an enumerated string from the enum MaintenanceStatus, obtained from the API Specification document. In one embodiment, the following code is autogenerated by the Typescript version of Servgen 220. This results in the following default composite object (JSON) to be autogenerated:

```
   // Mock for Reservation Status - generateMock
   export const MockJsonReservationStatus = {
     status: DEFAULT_STRING,
   };
```

From the above, the default language-neutral class accessor function, ReservationMocks.MockReservationStatus( ) is instantiated. Further down, a custom mock class in constructed from the specifications in mocks.json:

```
// Autogenerated Custom Mocks
   // Mock for StatusInDataPlane - generateCustomMock
   export function MockStatusInDataPlane( ): ReservationStatus {
     const json = Object.assign({ }, MockJsonReservationStatus);
     const baseReservationStatus = ReservationStatus.factory(json);
     // Properties for MockStatusInDataPlane
     // type: enum
     baseReservationStatus['status'] = MaintenanceStatus.DATAPLANE;
     const newMock = ReservationStatus.factory(baseReservationStatus);
     return newMock;
   }
```

Note above a new instance of the ReservationStatus class is created by first instantiating a mock from the default autogenerated BaseReservationStatus class, and then the status property is mutated to have the specified value in mocks.json before invoking the factory( ) function to create the custom mock data structure.

Referring now to a Mocked REST service adapter, In the above, the process of creating a mock data structure has been described. The next challenge is to return one of these in response to a request to a service adapter from a unit test. Consider unit tests for our example token service adapter, which intends to test the GetToken service request to the token service adapter:

```
// GetToken Request Test
it('should perform a GetToken request',
   (done) => {
     const tokenRequestObject = new TokenGetTokenRequestObject(
       responseChannel);
```

```
            const messageId = GeneralUtil.genUUID( );
            bus.requestOnceWithId(messageId, TokenChannel.request,
    tokenRequestObject)
                .handle(
                    (tokenResponseObject: TokenGetTokenResponseObject) => {
                        const response = tokenResponseObject.payload as
    AuthToken;
                        expect(response).not.toBeUndefined( );
                        expect(response.isValid).toBeTruthy( );
                        done( );
                    },
                    (err: RestError) => {
                        console.error('Unexpected error in GetToken test: ', err);
                    }
                );
        });
        // GetToken - Negative Test
        it('should fail on a GetToken request (negative testing)',
            (done) => {
                restService.mustFail = true;
                const tokenRequestObject = new TokenGetTokenRequestObject(
                    responseChannel);
                const messageId = GeneralUtil.genUUID( );
                bus.requestOnceWithId(messageId, TokenChannel.request,
    tokenRequestObject)
                    .handle(
                        ( ) => {
                            console.error('Unexpected success in GetToken negative
    test');
                        },
                        (err: RestError) => {
                            expect(emstatus).toBe(MOCK_FAKE_ERROR);
                            done( );
                        }
                    );
            });
```

Note that two unit tests have been autogenerated to obtain 100% coverage of the GetToken request, the first with a successful response, and the second with a failure response. This pattern is common to all unit tests of service requests. The request and its parameters (none in this example) are consolidated in the autogenerated TokenGetTokenRequestObject class, and then the bus.requestOnceWithId( ) function is invoked, which results in that object being transmitted to the token service adapter.

Looking at the autogenerated code for the request handler in the token service adapter, note the following code:

```
        protected handleServiceRequest(tokenRequestObject: TokenRequestObject, args?:
    MessageArgs) {
            switch (tokenRequestObject.request) {
                case TokenServiceRequest.GetToken: {
                    const apiObject = this.genApiObject(tokenRequestObject,
                                new TokenGetTokenResponseObject( ));
                    const successHandler =
                        (context: ApiObject<TokenRequestObject,
    TokenResponseObject>, apiResponse: AuthToken,messageArgs: MessageArgs) => {
                            const serviceResponse = AuthToken.factory(apiResponse);
                            this.apiSuccessIntercept(context, serviceResponse,
    messageArgs);
                        };
                    const failureHandler =
                        (context: ApiObject<TokenRequestObject,
    TokenResponseObject>,
                            err: RestError, messageArgs: MessageArgs) => {
                            this.apiFailureIntercept(context, err, messageArgs);
                        };
                    (this.lastApi = new API_AuthToken(this.apiBridge, apiObject, args))
                        .getAuth(// Get
                            success Handler,
                            failureHandler
                        );
                    break;
                }
```

In the above, in one embodiment, a handler for a successful response to the API call to the backend service, as well as a handler for a failure response, are constructed as lambda functions, and then passed to the API_AuthToken( ) class constructor that was autogenerated by Apigen 213, specifying the API method to be invoked with any passed parameters (none in this case).

In one embodiment, looking inside the API_Auth Token( ) class and its getAuth( ) method:

```
/**
 * getAuth( )
 * Get the current users auth token.
 *
 * Operation: Get
 *
 * @param successHandler Function Handler for API response
 * @param failureHandler Function Handler for API failure
 * @response BaseAuthToken
 */
public getAuth(successHandler: Function, failureHandler: Function) {
    const _body = '';
    const apiResponseHandler = (apiObject: T, responseJSON: any, args?: MessageArgs) => {
                successHandler(apiObject, new BaseAuthToken(responseJSON), args);
    };
    this.apiBridge(this.apiObject, 'GET', this.uri, _body, apiResponseHandler, failureHandler, 'API_AuthToken', this.messageArgs);
    }
}
```

In the above, the getAuth( ) method, autogenerated by Apigen 213, calls an inherited function, this.apiBridge( ), to send a message to the rest service adapter, or any arbitrary Transport Provider, e.g., grpc. In one embodiment, looking at the implementation of the apiBridge:

```
this.serviceCall(RestChannel.request, restRequestObject,
    (restResponseObject: RestObject) => {
        this.log.info('Successful ReST call response from ' + this.callSource(apiArgs)
+ ' - ' + httpOp);
        successHandler(apiObject, restResponseObject.response, apiArgs);
    },
    (err: RestError) => {
        this.log.error('ReST call error: ' + err.message + ' from '
                + this.callSource(apiArgs) + ' - ' + httpOp);
        failureHandler(apiObject, err, apiArgs);
    }, apiArgs);
```

In one embodiment, the invocation of this.serviceCall( ) results in a bus message being sent via the Bifröst to anyone listening on the channel RestChannel.request. Typically, this would be the rest service adapter, which would then issue an HTTP request to the back service which has uri as its endpoint, and then return in successHandler, or failureHandler with the response from the backend service 202.

However, in one embodiment, a unit test is intended to test the local code and should not make an HTTP request over the wire. This is where the loosely-coupled, message-based, architectures are extremely powerful and useful. In other words, since any service adapter can be listening on RestChannel.request, it is a simple matter to shut down the normal rest service adapter, and in its stead, instantiate a Mocked REST service adapter, which would respond with mock data structures depending on the API method being invoked, without making an API call to the backend service. In one embodiment, the token service adapter, by virtue of being loosely-coupled, has no knowledge that an alternate rest service adapter has responded, and behaves exactly as if the real rest service adapter had responded, so the test coverage is valid.

In one embodiment, the Mocked REST Service Adapter is autogenerated by Servgen 220, and the one for the token service adapter is quite small:

```
export class MockTokenRestService extends AbstractAutoRestMock {
    constructor( ) {
        super('MockTokenRestService', 'TokenService');
    }
    protected httpGet(restRequestObject: RestObject, args?: MessageArgs) {
        switch (restRequestObject.apiClass as string) {
            case 'API_AuthToken': { // getAuth
                this.handleData(TokenMocks.MockAuthToken( ),
restRequestObject, args);
                break;
            }
            default:
                this.unhandledError(restRequestObject,
restRequestObject.apiClass as string);
        }
    }
}
```

In one embodiment, by default, Mocked REST service adapter finds the mock data structure that corresponds to the successful response from the mocked API request and returns it to the calling service adapter. But, what if one wants a Custom mock data structure to be returned from the Mocked REST Service Adapter? There are two ways to do this. Consider this mock data structure specified in the reservation Service Adapter:

```
{
  "name": "UpcomingReservationWindow",
  "class": "ReservationWindow",
  "properties": [
    { "property": "emergency", "value": "false", "type": "boolean" },
    { "property": "duration_hours", "value": "4", "type": "integer" },
    { "property": "start_hour", "value": "10", "type": "integer" },
    { "property": "start_date", "value": "2018-09-26" },
    { "property": "reservation_state", "value": "ReservationState.SCHEDULED", "type": "enum" },
    { "property": "metadata", "value": "MockControlPlaneDataPlaneMetaData", "type": "map" }
  ]
},
```

In one embodiment, this specification, including the property mutations, will instantiate a mock instance of the ReservationWindow class called MockUpcomingReservationWindow. In order to have the Mocked REST service adapter return this mocked class instead of the default MockReservationWindow class, an entry in testing.json is required as follows:

```
{
  "testing": [
    {
      "defaults": [
        {
          "class": "ReservationWindow", "default": "UpcomingReservationWindow"
        }
      ]
    },
```

In one embodiment, this small specification tells the Mocked REST Service Adapter corresponding to the reservation Service Adapter to return MockUpcomingReservationWindow for every response for which it would normally have returned the default MockReservationWindow class.

In one embodiment, an alternate technique to achieve the same result for a request to a service adapter is to use the forceResponse setter for any Mocked REST service adapter and assign it an object to return from the Mocked REST call. This is only available for service adapters written in Typescript, as, in one embodiment, it depends on a common language and shared namespace between the consuming application and the service adapter. In one embodiment, the setter forceResponse will result in a bifröst message to achieve the same result across disparate namespaces and implementation languages.

Referring now to a mocked service adapter, in one embodiment, the above has described how to autogenerate both default and custom mock data structures, which are returned from API calls that are intercepted by the Mocked REST service adapter. The next step is to perform the complex wiring of instantiating both the autogenerated target service adapter for a request, and also instantiating the corresponding autogenerated Mocked REST service adapter to replace the default rest iService Adapter. In one embodiment, Servgen 220 even autogenerates a mocked service adapter which takes care of instantiating both and wiring them. For the example token service adapter, yet another service adapter called MockTokenService, which automatically takes care of this:

```
export class MockTokenService extends AbstractAutoServiceMock {
  public service: TokenService;
  public restService: MockTokenRestService;
```

```
  constructor( ) {
    super('MockTokenService');
    if (ServiceLoader.getService(MockTokenRestService)) {
      ServiceLoader.destroyService(MockTokenRestService);
    }
    this.restService = ServiceLoader.addService(MockTokenRestService);
    if (ServiceLoader.getService(TokenService)) {
      ServiceLoader.destroyService(TokenService);
    }
    this.service = ServiceLoader.addService(TokenService);
    this.mustFail = false;
  }
  public getName( ): string {
    return 'TokenService';
  }
  public set mustFail(flag: boolean) {
    this.restService.mustFail = flag;
  }
  public set forceResponse(response: any) {
    this.restService.forceResponse = response;
  }
}
```

In the above, in one embodiment, the autogenerated MockTokenService destroys any existing instance of the target TokenService and MockTokenRestService, and creates new instances of both, ensuring that no previous state of these service adapters persist, so that unit tests are controlled and deterministic. Beyond that, MockTokenRestService acts as a relay for a handful of getters and setters. The mustFail( ) function forces an error response from the MockTokenRestService service adapter for any requests that follow. In one embodiment, the forceResponse( ) function causes subsequent requests to return the provided mock data structure. Both these calls should be reset to their default values (false, and null respectively) once the request completes, otherwise these states will persist for the duration of these service adapters.

In one embodiment, the service adapter does not use the MockTokenService in its unit tests since the MockTokenService is provided for use by unit tests in the application layer 230 rather than the service adapter layer 210. In one embodiment, in order to prevent unit tests in the application layer 230 making network requests as a result of making a request to a service adapter, they too, need the Mocked REST service adapter to be instantiated (as well as the target service adapter) prior to running unit tests for angular components; In one embodiment, this architecture only requires a single line of code:
const tokenService=new MockTokenService( );

In one embodiment, that is all that intent compiler 100 needed to do in order to instantiate the various service adapters and wire them together to provide an environment for their unit tests.

Regarding autogenerated unit tests, in one embodiment, with the foundation described above for all autogenerated service adapters, it is possible to autogenerate unit tests for all of them. For Typescript, autogenerated unit tests using Karma/Jasmine are generated. In one embodiment, there are also autogenerated JUnit tests for Java, and Convey tests for Golang, and the like. For the token service adapter, this is the complete unit test autogenerated in tests/token.service.spec.ts:

```
class BadRequestObject extends AbstractMessageObject
< TokenServiceRequest, any > {
  constructor(responseChannel: string) {
```

```
        super(TokenServiceRequest.BadRequest, responseChannel, { });
    }
}
describe('Token service [tests/token.service]', ( ) => {
    const responseChannel = TokenChannel.request;
    let bus: EventBus;
    let tokenService: TokenService;
    let restService: MockTokenRestService;
    beforeEach( ( ) => {
        bus = BusTestUtil.bootBus( );
        UserUtil.createUserStoreForTests( );
        restService = new MockTokenRestService( );
        tokenService = new TokenService( );
    });
    afterEach(( ) => {
        UserUtil.destroyStore( );
    });
    // GetToken Request Test
    it('should perform a GetToken request',
        (done) => {
            const token RequestObject = new TokenGetTokenRequestObject(
                responseChannel);
            const messageId = GeneralUtil.genUUID( );
            bus.requestOnceWithId(messageId, TokenChannel.request,
tokenRequestObject)
                .handle(
                    (tokenResponseObject: TokenGetTokenResponseObject) =>
{
                        const response = tokenResponseObject.payload as
AuthToken;
                        expect(response).not.toBeUndefined( );
                        expect(response.isValid).toBeTruthy( );
                        done( );
                    },
                    (err: RestError) => {
                        console.error('Unexpected error in GetToken test: ', err);
                    }
                );
        });
    // GetToken - Negative Test
    it('should fail on a GetToken request (negative testing)',
        (done) => {
            restService.mustFail = true;
            const token RequestObject = new TokenGetTokenRequestObject(
responseChannel);
            const messageId = GeneralUtil.genUUID( );
            bus.requestOnceWithId(messageId, TokenChannel.request,
tokenRequestObject)
                .handle(
                    ( ) => {
                        console.error('Unexpected success in GetToken
negative test');
                    },
                    (err: RestError) => {
                        expect(errstatus).toBe(MOCK_FAKE_ERROR);
                        done( );
                    }
                );
        });
    // GetServiceVersion Request Test
    it('should perform a GetServiceVersion request',
        (done) => {
            const tokenRequestObject = new
TokenGetServiceVersionRequestObject(responseChannel);
            const messageId = GeneralUtil.genUUID( );
            bus.requestOnceWithId(messageId, TokenChannel.request,
tokenRequestObject)
                .handle(
                    (tokenResponseObject:
TokenGetServiceVersionResponseObject) => {
                        const response = tokenResponseObject.payload as
ServiceVersion;
                        expect(response).not.toBeUndefined( );
                        expect(response.isValid).toBeTruthy( );
                        done( );
                    },
                    (err: RestError) => {
                        console.error('Unexpected error in GetServiceVersion
test: ', err);
                    }
                );
        });
    // BadRequest - Bad request negative Test
    it('should fail on a bad request (negative testing)',
        (done) => {
            const requestObject = new BadRequestObject(responseChannel);
            const messageId = GeneralUtil.genUUID( );
            bus.requestOnceWithId(messageId, TokenChannel.request,
requestObject)
                .handle(
                    ( ) => {
                        console.error('Unexpected success in BadRequest
negative test');
                    },
                    (err: RestError) => {
                        expect(err.status).toBe(SERVICE_ERROR);
                        done( );
                    }
                );
        });
    it('should exercise AuthToken model.',
        ( ) => {
            // WARNING - @deprecated build( ) used here.
            Turn off [-g | --build
after legacy code fixed.
            const varAuthToken = AuthToken.build(
                TokenMocks.MockAuthToken( )['auth_token'],
                TokenMocks.MockAuthToken( )['id_token']
            );
            expect(varAuthToken.isValid).toBeTruthy( );
            expect(varAuthToken.isValid).toBeTruthy( );
            expect(AuthToken.forTests(varAuthToken).isValid).toBeTruthy( );
        }
    );
});
```

In one embodiment, mustFail( ) is used to perform negative testing. Also note, that, in one embodiment, without any changes to these tests, they could just as easily be used for end-to-end testing of the service adapter using the real rest service adapter instead of the mocked one, resulting in roundtrip API calls to the backend services. This latter technique is used, in one embodiment, by Cligen 238 to perform scripted end-to-end tests using a CLI instead of a GUI.

At the bottom there are autogenerated tests for all the data structures used by the Service Adapter. In the above, a mock data structure is instantiated for AuthToken and then all its required properties are tested for validity. This is useful for detecting contract breakages.

Custom Unit Tests

In one embodiment, if the complete service adapter is autogenerated, then the autogenerated unit tests are sufficient to provide 100% test coverage for it, as well as providing another line of defense to guard against unannounced contract changes between the service adapter and backend services. This does not, however, account for test coverage for custom service adapters described in a later section of this document.

In one embodiment, in order to deal with these, Servgen 220 automatically generates stubs for custom unit tests that can be populated using guide rails. Here is an example of such custom stubs from the token service adapter:

```
describe('Token service custom tests [Token.custom.spec.ts]', ( ) => {
    const responseChannel ='#private::token-custom-test-response-channel';
    let bus: EventBus;
    let tokenService: TokenService;
    let restService: MockTokenRestService;
```

```
  beforeEach(( ) => {
    bus = BusTestUtil.bootBus( );
    UserUtil.createUserStoreForTests( );
    restService = new MockTokenRestService( );
    restService.mustFail = false;
    tokenService =new TokenService( );
  });
  afterEach(( ) => {
    UserUtil.destroyStore( );
  });
  it('should ** Replace This **',
    (done) => {
done( );
    }
  );
});
```

In one embodiment, using this template, the service adapter developer can add as many tests as they need in order to achieve a predefined test coverage percentage of any custom code. In one embodiment, the results may even be 100% test coverage of any custom code in a very simple way that seamlessly fits into the intent compiler 100 ecosystem. For completeness, here are the custom unit tests that are used for the sddc-core service adapter:

```
// Note: The order and number of tasks in this array are important
and will affect the tests below
const TASK_LIST: Array<any> = [
  TaskMocks.MockNascentTask( ),
  TaskMocks.MockNascentTask2( ),
  TaskMocks.MockReplacementTask( ),
  TaskMocks.MockNonSddcTask( ),
  TaskMocks.MockDeployingTask( ),
  TaskMocks.MockFinishedTask( ),
  TaskMocks.MockDeleteHostTask( ),
  TaskMocks.MockProgressTask( ),
  TaskMocks.MockAddHostTask( ),
  TaskMocks.MockDeletingTask( ),
  TaskMocks.MockDeadTask( ),        // Regression test -
this task should not create a synthetic sddc
];
describe('SddcCore service custom tests [SddcCore.custom.spec.ts]',
( ) => {
  let bus: EventBus;
  let sddcCoreService: SddcCoreService;
  let restService: MockSddcCoreRestService;
  let mockTaskService: MockTaskService;
  let ws: MockWebSocketService;
  beforeEach(( ) =>{
    bus = BusTestUtil.bootBus( );
    UserUtil.createUserStoreForTests( );
    restService = new MockSddcCoreRestService( );
    restService.mustFail = false;
    sddcCoreService = new SddcCoreService( );
    mockTaskService = new MockTaskService( );
    mockTaskService.mustFail = false;
    sddcCoreService = new SddcCoreService( );
    ws =new MockWebSocketService( );
  });
  afterEach(( ) => {
    UserUtil.destroyStore( );
  });
  // Send a number of websocket updates and ensure that they are all
  received.
  // At the end of the sequence, only 3 SDDCs will be left in the store
  // retrieve an Sddc from the store and ensure that the resource ID of
  // the finished task results in the ID of the Sddc in the store
  // The finished task should also have set the SDDC to the READY state
  it('should handle a task update.',
    (done) => {
      for (let task of TASK_LIST) {
        ws.sendSocketUpdate(task);
      }
      waitForCondition(( ) => {
        return sddcCoreService.updateCounter = = = TASK_LIST.length;
      }, ( ) => {
        expect(sddcCoreService.updateCounter).toBe
(TASK_LIST.length);
        expect(sddcCoreService.store.allValues( ).length).toBe(3);
        const sddc = sddcCoreService.store.get(TaskMocks.
MockFinishedTask( ).resource_id);
        expect(sddc.isValid).toBeTruthy( );
        expect(sddc.id).toBe(TaskMocks.MockFinishedTask( ).
resource_id);
        expect(sddc.sddc_state).toBe(SddcStatus.Ready);
        done( );
      });
    }
  );
  // If there is a failure to fetch tasks during service initialization,
  the service will be rendered unusable
  it('should handle initialization failure.',
    (done) => {
      mockTaskService.mustFail = true;
      sddcCoreService = new SddcCoreService( );
      waitForCondition(( ) =>{
        return sddcCoreService.updateCounter = = = 0;
      }, ( ) => {
        expect(sddcCoreService.serviceInitialized).toBeFalsy( );
        done( );
      });
    }
  );
  it('should calculate num hosts correctly on sddc and cluster', ( )=> {
    expect(SddcCoreMocks.MockCluster1( ).numHosts).toBe(4);
    expect(SddcCoreMocks.MockClusterWithFailedHost( ).numHosts).
toBe(4);
    expect(SddcCoreMocks.MockClusterWithPendingCloudDeletionHost
( ).numHosts).toBe(4);
    expect(SddcCoreMocks.MockReadySddc( ).numHosts).toBe(4);
    expect(SddcCoreMocks.MockReadySddcWithFailedCluster( ).
numHosts).toBe(4);
    expect(SddcCoreMocks.MockReadySddcWithPendingCloudDeletion
Cluster( ).numHosts).toBe(4);
  });
});
```

Autogenerating Store Operations

In one embodiment, a bifröst store is a session cache of typed objects, stored as key/value pairs, that can be shared across an application, and provides event triggers when state mutations through the exposed APIs occur. In one embodiment, the bifröst store will share a named store across multiple applications, thereby resembling a distributed cache. It should be noted that mutating the content of a store without using the provided APIs does not trigger events even though the shared state is locally changed.

In one embodiment, when an object element of a store or all elements are returned as the response to an API call to a backend service, it may desirable to update the store to its new state. This can be autogenerated by Servgen 220 automatically with a handful of directives in service.json, as is shown and described in the earlier example:

```
{
  "name": "sddc-core",
  "version": "1",
  "broadcast": { "type": "Sddc", "change_type":
"SddcStateChangeType" },
  "event_handler": true,
  "stores": [
    {
      "store": "SddcStore",
      "store_id": "Sddc",
      "type": "Sddc"
    }
  ],
```

In one embodiment, the above example is from the sddc-core service adapter in VMCUI. The description of the specifications for the example are provided herein, in the discussion of service.json. In one embodiment, this section will describe the resulting code that is autogenerated by Servgen. In the example above, a bifröst store has been specified in the stores array: SddcStore (for readability, in one embodiment, it is recommended to suffix the store name with Store). A store_id has also been specified as Sddc. In one embodiment, it may be noted that the store_id should not contain the ":" character as that is illegal when using STOMP, as bifröst does. However, in one embodiment, this character limitation may not be necessary when other protocols are used.

In one embodiment, a bifröst store is of type Map<string, ElementType>, and the type specified above says that ElementType is a class: Sddc. This means that, in one embodiment, SddcStore is implemented as Map<string, Sddc>. Note, the stores array can contain declarations for multiple stores owned by the Service Adapter. The following is an embodiment of what Servgen autogenerates for the above directives:

```
export class AutoSddcCoreService extends AbstractAutoEventHandler
<SddcCoreRequestObject, SddcCoreResponseObject> {
  public lastApi: any; // Unit test support
  protected readonly sddcStore: BusStore<Sddc>;
  protected version = '1';
  protected constructor( ) {
    super('SddcCoreService', SddcCoreChannel.request, SddcCoreChannel
.broadcast);
    // Create or fetch SddcStore
    this.sddcStore = this.storeManager.createStore<Sddc>('Sddc');
    this.log.info('SddcStore now available to ' + this.getName( ));
}
```

Internal Data Structures

In one embodiment, Servgen 220 internally maintains a very small data structure to completely encapsulate store operations that can be autogenerated:

```
type Store struct {
    Name         string // The name of the store
    Id           string // Store ID - e.g. stores_vmc_sddc
    Type         string // Content type'
    StateChange  string // State Change Type
    Refresh      string // Service request for re-fetching state
    Ttl          string // Time to live
    Container    string // Container
    Nested       string // Nested type
}
```

In the embodiment above, Ttl and Refresh are used to update the store by performing a polled request to the service adapter with the request specified in Refresh at a periodicity of Ttl seconds. In one embodiment, no parameters are passed to the service request, as the request is expected to not require any, e.g., OperatorGetUncachedSddcList described below, which returns an array of Sddc objects. In one embodiment, the remaining are encapsulation of the stores directive to retain the store name, store id, and the CommonType for the store, consisting of container, nested, and type, that have all been described herein.

Updating a Store

In one embodiment, Servgen 220 understands simple specifications to automatically update a store using the response from an API call. As such, it is expected that the response from an API call is either a simple object or a complex one, and different strategies are used for each. Since the store is implemented as Map<string,ComonType>, and the API response is also of CommonType (content, nested, type), each strategy involves converting the CommonType into the most efficient representation in the store. In one embodiment, an API response of Map<string, CommonType> is the most direct transformation as described below, where the API response is mirrored in the store. In one embodiment, other possible API responses such as, Array<CommonType>, Class, or the like, may require additional specifications for the key used in the store. These are all described below.

Updating the Store with an Array

In one embodiment, the above sddc-core service adapter the bifröst store is referenced by store_id, and is created if it does not already exist. In one embodiment, this reference is stored in the sddc-core service adapter, and is only accessible to itself and customized service adapter code as described in the section here. Returning to the service.json for sddc-core it is clear that the service request: OperatorGetUncachedSddcList specifies a store operation as a side effect to completing the request:

```
{
"service_request": "OperatorGetUncachedSddcList",
"description": "Operator only: ",
"service_request_query_params":
    { "service_request_query_param": "$filter", "optional": true },
    { "service_request_query_param": "includeDeleted", "optional": true }
],
"api": { "uri": "/operator/sddcs", "api_method": "listSddcs" },
"update_store": { "update": "SddcStore", "property": "id" },
"service_response": { "type": "Sddc", "container": "array" }
},
```

In one embodiment, the API call returns an array of Sddc objects as specified in service_response and there is a post-API call specifier above: update_store:

"update_store": {"update": "SddcStore", "property": "id" },

In one embodiment, the above specifier says, when updating the store with the response array from the API call, Servgen 220 should use the property id as the store key in each element of the response Sddc array from the backend service to update that element in the store, or create a new element in the store if no element for that key exists. When the API call returns from the backend service, the response is intercepted by the lambda successHandler below:

```
const successHandler =
    (context: ApiObject<SddcCoreRequestObject,
    SddcCoreResponseObject>,
        apiResponse: Array<Sddc>, messageArgs: MessageArgs) => {
        const serviceResponse = [ ];
        let storeWasEmpty = this.sddcStore.allValues( ).length = = 0;
        for (let item of apiResponse) {
            const instanceSddc = Sddc.factory(item);
            serviceResponse.push(instanceSddc);
            this.sddcStore.put(instanceSddc.id, instanceSddc,
                storeWasEmpty ? SddcStateChangeType.Created :
SddcStateChangeType.Updated);
        }
        if (storeWasEmpty) {
            storeWasEmpty = false;
            this.sddcStore.initialize( );
```

```
    this.log.info('Store SddcStore initialized in ${this.name}',
        this.getName( ));
    }
    this.apiSuccessIntercept(context, serviceResponse, messageArgs);
};
```

In one embodiment, this lambda is invoked on return from the API call, and prior to returning to the calling application, permitting modifications or other actions to be performed by the service adapter 107. In one embodiment, the store's put( )method is iteratively invoked with the key obtained from the id property as specified in the service.json for the sddc-core service adapter and the corresponding Sddc object in the store is updated (or created). In one embodiment, if the store itself did not exist prior to this moment, then the store's initialized( ) method would be invoked to trigger the related event for this action after the store update is complete. Note the specification of SddcStateChangeType enumeration that is passed to put( ) was obtained from the broadcast property in the service.json for sddc-core:

"broadcast": {"type": "Sddc", "change_type": "SddcStateChangeType" },

In one embodiment, as shown above, had change_type not been specified, an enumeration called SddcStateChangeType would have been autogenerated with fields specifying the mandatory Created, Updated, and Deleted fields. However, in one embodiment, by specifying change_type allows for a custom enumeration by any name to not only include these three mandatory fields, but to also add additional fields that can be used by the service adapter 107 as shown below:

```
export enum SddcStateChangeType {
    Created = 'SddcCreated',
    Updated = 'SddcUpdated',
    Deleted = 'SddcDeleted',
    SddcUpdated = 'SddcUpdated',
    SddcCreating = 'SddcCreating',
    SddcDeleting = 'SddcDeleting',
    SddcAddingHosts = 'SddcAddingHosts',
    SddcDeletingHosts = 'SddcDeletingHosts',
    SddcAddingCluster = 'SddcAddingCluster',
    SddcDeletingCluster = 'SddcDeletingCluster',
    SddcReconfiguringCluster = 'SddcReconfiguringCluster',
    SddcScaleUpStarted = 'SddcScaleUpStarted',
    SddcScaleUpFailed = 'SddcScaleUpFailed',
    SddcScaleUpComplete = 'SddcScaleUpComplete',
        :
        :
```

In one embodiment, this results in the autogenerated code:
this.sddcStore.put(instanceSddc.id, instanceSddc,
    storeWasEmpty ? SddcStateChangeType.Created: SddcStateChangeType. Updated);

In one embodiment, this allows bifröst to pass the changed element and the mutation type with the associated event that it triggers.

Updating a Single Element in the Store

Consider the specification for the OperatorGetUncachedSddc service request below:

```
{
    "service_request": "OperatorGetUncachedSddc",
    "service_request_params": [
        { "service_request_param": "sddc" }
    ],
    "api": { "uri": "/operator/sddcs/{sddc}", "api_method": "getSddcs" },
    "update_store": { "update": "SddcStore", "param": "sddc" },
    "service_response": { "type": "Sddc" }
},
```

In one embodiment, the API call returns a single Sddc object from the API call. Note that, in one embodiment, instead of specifying property as was done for OperatorGetUncachedSddcList previously, there is a new specification param with the value sddc. This indicates that Servgen should look in service_request_params for a parameter labelled sddc and use its value as the key for the store. This results in the following autogenerated code for the successHandler intercept:

```
const successHandler =
    (context: ApiObjec<SddcCoreRequestObject, SddcCoreResponseObject>,
apiResponse: Sddc, messageArgs:
MessageArgs) => {
    const serviceResponse = Sddc.factory(apiResponse);
    let storeWasEmpty = this.sddcStore.allValues( ).length = = 0;
    this.sddcStore.put(params['sddc'], serviceResponse,
        storeWasEmpty ? SddcStateChangeType.Created :
        SddcStateChangeType.
Updated);
    if (storeWasEmpty) {
        storeWasEmpty = false;
        this.sddcStore.initialize( );
    }
    this.apiSuccessIntercept(context, serviceResponse, messageArgs);
};
```

In one embodiment of the option above, Servgen passes params['sddc'] to the put( ) method, exactly as specified in the service.json for sddc-core. The rest of the autogenerated code is almost the same as for OperatorGetUncachedSddcList.

Updating a Store with a Map

In one embodiment, the specification has previously described how a developer can specify either property or param to the update_store directive in order to specify how an API response may be used to update the store using specific keys derived from a property in the array of response objects, or using a service_request_parameter as the key when a single object is returned from an API call. In one embodiment, the following update_store specification for the reservation Service Adapter is used when a developer desires using the keys in the map as keys for the store:

```
"service_requests": [
    {
        "service_request": "GetAllTbrsReservations",
        "service_request_params": [
            { "service_request_param": "sddcState", "type": "SddcStateRequest" }
        ],
        "api": { "uri": "/orgs/{org}/tbrs/reservation", "api_method": "postTbrs" },
        "service_response": { "type": "ReservationWindow", "container": "map", "nested":
```

```
"array" },
"update_store": { "update": "ReservationStore" }
},
```

In one embodiment, as shown in the code above, it is clear that the service_response is a complex data structure: Map<string, Array<ReservationWindow>>. As such, no additional qualifiers are need for the update_store directive, besides telling Servgen 220 which store to update with the response map. This results in the following code being autogenerated:

```
const successHandler =
    (context: ApiObject<ReservationRequestObject, ReservationResponseObject>,
apiResponse: Map<string, Array<ReservationWindow>>, messageArgs:
MessageArgs) => {
        const serviceResponse = new Map<string, Array<ReservationWindow>>( );
        let storeWasEmpty = this.reservationStore.allValues( ).length == 0;
        apiResponse.forEach((value, key) => {
            const classArray: Array<ReservationWindow> = value.map(item =>
ReservationWindow.factory (item));
            serviceResponse.set(key, classArray);
            this.reservationStore.put(key, classArray,
                storeWasEmpty ? ReservationWindowStateChange.Created :
ReservationWindowStateChange.Updated);
        });
        if (storeWasEmpty) {
            storeWasEmpty = false;
            this.reservationStore.initialize( );
            this.log.info('Store ReservationStore initialized in' + this.getName( ));
        }
        this.apiSuccessIntercept(context, serviceResponse, messageArgs);
};
```

In one embodiment, as shown in the code above, Servgen 220 iterates through all the key/value pairs in the response map from the API call to populate the store identically. In effect, the store becomes a mirror of the response map.

Updating a Store as a Single Blob

Another way to update a store with a single untyped blob that is the entirety of the response from an API call as a single Map element in the store is to specify the uuid directive in the service.json. The uuid is then used by Servgen as the key to the store and the entire API response is stored as a single map element in the store. This is a deprecated method for updating a store, and as such it is not described in detail here, although it continues to be supported by Servgen for backward compatibility.

Customizing Classes

In one embodiment, when a service adapter references an object in an Api specification document, Servgen 220 creates a class in the implementation language of the service adapter. In one embodiment, this is true when the language supports inheritance. Additionally, in one embodiment, Servgen 220 creates a specification for this class in the service adapter interface document(s) so that it can be recreated in the application layer 230 by Modelgen 232.

However, in one embodiment, there are cases, where the application would like to extend an object returned from the backend service layer 201 by either adding properties or encapsulate business logic in methods for that class so that it is hidden from the application itself. In one embodiment, Servgen 220 provides a customization facility for classes using inheritance to create a derived class with the same name that encapsulates these extensions, while the parent class continues to be autogenerated from the original object returned in the response to an API call from the backend service 202 without mutation, and responsive to changes in either/both of the Api specification document(s) 211 or in the service adapter specification document 223.

```
{
    "classes": [
        {
            "class": "SddcProvisioningSpec"
        },
        {
            "class": "SddcProvisioningStatus",
            "properties": [
                { "property": "provisioning_status", "optional": true },
                { "property": "progress_percent", "type": "integer",
                  "optional": true },
                { "property": "estimated_remaining_minutes", "type":
"integer", "optional": true }
            ]
        },
```

Consider the above specifications in the sddc-core service adapter for two classes: SddcProvisioningSpec and SddcProvisioningStatus. In one embodiment, there is a specification for SddcProvisioningSpec without any additional properties or extensions. In one embodiment, this is due to Servgen 220 creating a class and exports specifications for it to the application layer 230, whenever there is a reference to that class from the service adapter or in any of the service adapter specification document(s). In one embodiment, the above SddcProvisioningSpec class is an example of an object which has no such references in the service adapter layer 210, instead, in one embodiment, this class is used in the application layer 230. In one embodiment, this results in the creation of an immutable class, AutoSddcProvisioningSpec, in the auto sub-folder, derived from BaseSddcProvisioningSpec, which is the object returned from the backend service and converted into a class in the implementation language:

```
export class AutoSddcProvisioningSpec extends BaseSddcProvisioningSpec {//
generateAutoClass
    protected constructor (parentClass: BaseSddcProvisioningSpec) {
        super(parentClass);
    }
    // @deprecated - do not call from application space
    public static build(default_hosts_per_sddc: number,
            expire_after_in_days: number,
            max_clusters_per_sddc: number,
            max_hosts_per_sddc: number,
            max_hosts_per_sddc_on_create: number,
            min_hosts_per_sddc: number,
            sddc_type: string): AutoSddcProvisioningSpec {
        const autoSddcProvisioningSpec = new AutoSddcProvisioningSpec(new
BaseSddcProvisioningSpec({ }));
        autoSddcProvisioningSpec['default_hosts_per_sddc'] =
default_hosts_per_sddc;
        autoSddcProvisioningSpec['expire_after_in_days'] = expire_after_in_days;
        autoSddcProvisioningSpec['max_clusters_per_sddc'] = max_clusters_per_sddc;
        autoSddcProvisioningSpec['max_hosts_per_sddc'] = max_hosts_per_sddc;
        autoSddcProvisioningSpec['max_hosts_per_sddc_on_create'] =
max_hosts_per_sddc_on_create;
        autoSddcProvisioningSpec['min_hosts_per_sddc'] = min_hosts_per_sddc;
        autoSddcProvisioningSpec['sddc_type'] = sddc_type;
        return autoSddcProvisioningSpec;
    }
    public get isValid( ): boolean {
        // SddcProvisioningSpec has no required properties.
        return true;
    }
}
```

In one embodiment, the build( ) method is for use in the service adapter layer 210. In one embodiment, the build( ) method is not referenced from the application layer 230 as the implementation language in the two layers may be different and are intended to be in two different address spaces.

In addition to instantiating the class, in one embodiment, Servgen 220 also creates a customizable class called SddcProvisioningSpec in the sddc-core service adapter folder:

```
export class SddcProvisioningSpec extends AutoSddcProvisioningSpec {//
generateCustomClass
    private constructor (baseSddcProvisioningSpec: BaseSddcProvisioningSpec) {
        super(baseSddcProvisioningSpec);
    }
    public static factory(baseSddcProvisioningSpec?: BaseSddcProvisioningSpec):
SddcProvisioningSpec {
        baseSddcProvisioningSpec = baseSddcProvisioningSpec
            ? baseSddcProvisioningSpec
            : new BaseSddcProvisioningSpec({ });
        return new SddcProvisioningSpec(baseSddcProvisioningSpec).initProperties( );
    }
    // @deprecated: forTests( ) - should not be used in new code. Use build( ) instead.
    public static forTests(json: object): SddcProvisioningSpec {
        return SddcProvisioningSpec.factory(new BaseSddcProvisioningSpec(json));
    }
    // Customized derived class
    // NOTE: If the signature of AutoSddcProvisioningSpec.build( ) does not match that
of SddcProvisioningSpec.build( ),
    //it will generate a compiler error as intended, and the signature of
SddcProvisioningSpec.build( ),
    // as well as the call to AutoSddcProvisioningSpec.build( ) will have to be modified
here.
    public static build(default_hosts_per_sddc: number,
            expire_after_in_days: number,
            max_clusters_per_sddc: number,
            max_hosts_per_sddc: number,
            max_hosts_per_sddc_on_create: number,
            min_hosts_per_sddc: number,
            sddc_type: string): SddcProvisioningSpec {
        const autoSddcProvisioningSpec = AutoSddcProvisioningSpec.build(
            default_hosts_per_sddc,
            expire_after_in_days,
```

```
        max_clusters_per_sddc,
        max_hosts_per_sddc,
        max_hosts_per_sddc_on_create,
        min_hosts_per_sddc,
        sddc_type
    );
    return SddcProvisioningSpec.factory(autoSddcProvisioningSpec);
  }
  private initProperties( ): SddcProvisioningSpec {
    // ** Insert custom code here to initialize custom properties
    return this;
  }
}
```

In one embodiment, the above customizable class, SddcProvisioningSpec, is derived from the autogenerated class AutoSddcProvisioningSpec, allowing the service adapter developer to add properties and methods as needed for the implementation of the service adapter. Notice that, in one embodiment, the constructor for the class is marked private, preventing the class from being constructed by specifying the equivalent of new( ) in the implementation language. In one embodiment, one way to construct this class is by invoking either the static factory( ) method, or by the static build( ) method (which results in a call to the factory( ) method). In one embodiment, using one of these methods ensures that when the class is instantiated, the factory( ) method is always instantiated, resulting in an implicit invocation of the initProperties( ) method. Since no additional properties or logic is required, this call is a no-op in this case. Also, note that the isValid( ) method in AutoSddcProvisioningSpec should almost always returns true for this class, as it has no required properties.

In the following example, the autogenerated code for cluster is specified thus:

```
{
  "class": "Cluster",
  "properties": [
    { "property": "isReady", "type": "boolean" },
    { "property": "isFailed", "type": "boolean" },
    { "property": "isAddingHosts", "type": "boolean" },
    { "property": "isCreating", "type": "boolean" },
    { "property": "isDeleting", "type": "boolean" },
    { "property": "isDeletingHosts", "type": "boolean" },
    { "property": "isReconfiguring", "type": "boolean" },
    { "property": "numHosts", "type": "integer" },
    { "property": "nonEbsStorageCapacity", "type": "integer" },
    { "property": "isEbsCluster", "type": "boolean" }
  ]
},
```

In one embodiment, this specification adds a number of custom properties to the cluster class, allowing for the customizable class stub to be modified thus by the developer:

```
const NON_EBS_STORAGE_MULTIPLIER = 10.7;
export class Cluster extends AutoCluster {// generateCustomClass
  private constructor (baseCluster: BaseCluster) {
    super(baseCluster);
  }
  public static factory(baseCluster?: BaseCluster): Cluster {
    baseCluster = baseCluster ? baseCluster : new BaseCluster({ });
    return new Cluster(baseCluster).initProperties( );
  }
}
// @deprecated: forTests( ) - should not be used in new code.
Use build( ) instead.
```

```
  public static forTests(json: object): Cluster {
    return Cluster.factory(new BaseCluster(json));
  }
```

In one embodiment, as shown in the top section of the customized class, the autogenerated stub looks similar, if not identical, to the previous one for SddcProvisioningSpec, but the developer has added some custom code to address a new local constant, NON_EBS_STORAGE_MULTIPLIER, which may be used later. In one embodiment, looking at the bottom half of the customized class, some differences are evident:

```
// Custom derived class
  // NOTE: If the signature of AutoCluster.build( ) does not match that of
Cluster.build( ),
  //it will generate a compiler error as intended, and the signature
  of Cluster.build( ),
  // as well as the call to AutoCluster.build( ) will have to be modified
here.
        public static build(aws_kms_info: any,
            billed_storage_capacity: number,
            cluster_capacity: EntityCapacity,
            cluster_id: string,
            cluster_name: string,
            cluster_state: string,
            cluster_vcenter_mo_id: string,
            disk_group_list: Array<VsanDiskGroup>,
            esx_host_info: EsxHostInfo,
            esx_host_list: Array<EsxHost>,
            host_cpu_cores_count: number,
            internal_host_count: number,
            volume_list: Array<StorageVolume>,
            vsan_subcluster_uuid: string
  ): Cluster {
        const autoCluster = AutoCluster.build(
            aws_kms_info,
            billed_storage_capacity,
            cluster_capacity,
            cluster_id,
            cluster_name,
            cluster_state,
            cluster_vcenter_mo_id,
            disk_group_list,
            esx_host_info,
            esx_host_list,
            host_cpu_cores_count,
            internal_host_count,
            volume_list,
            vsan_subcluster_uuid
        );
        return Cluster.factory(autoCluster);
  }
  private initProperties( ): Cluster {
    this.isReady = SddcReadyStatuses.has(this.cluster_state);
    this.isFailed = this.cluster_state === SddcStatus.Failed;
```

```
    this.isAddingHosts = this.cluster_state === SddcStatus.Deploying-
Hosts;
    this.isCreating = this.cluster_state === SddcStatus.CreatingCluster
        || this.cluster_state === SddcStatus.Deploying;
    this.isDeleting = this.cluster_state === SddcStatus.DeletingCluster;
    this.isDeletingHosts = this.cluster_state === SddcStatus.Deleting-
Hosts;
    this.isReconfiguring = this.cluster_state ===
SddcStatus.ReconfiguringCluster;
    this.numHosts = this.esx_host_list ?
        this.esx_host_list.filter(h => h.esx_state !== EsxHostEsxState.
Failed
            && h.esx_state !== EsxHostEsxState.PendingCloudDeletion).
            length : 0;
    this.isEbsCluster = this.volume_list && this.volume_list.length > 0;
    this.nonEbsStorageCapacity = this.isEbsCluster ? 0:
    Math.floor(this.numHosts *
NON_EBS_STORAGE_MULTIPLIER);
    return this;
    }
}
```

In one embodiment, it is noted that the specified custom properties have been added to the custom stub, but the properties themselves are not declared, and are inherited from the immutable parent class, AutoCluster, as shown below:

```
export class AutoCluster extends BaseCluster {// generateAutoClass
    public isAddingHosts: boolean;
    public isCreating: boolean;
    public isDeleting: boolean;
    public isDeletingHosts: boolean;
    public isEbsCluster: boolean;
    public isFailed: boolean;
    public isReady: boolean;
    public isReconfiguring: boolean;
    public nonEbsStorageCapacity: number;
    public numHosts: number;
    protected constructor (parentClass: BaseCluster) {
        super(parentClass);
    }
    // @deprecated - do not call from application space
    public static build(aws_kms_info: AwsKmsInfo,
                billed_storage_capacity: number,
                cluster_capacity: EntityCapacity,
                cluster_id: string,
                cluster_name: string,
                cluster_state: string,
                cluster_vcenter_mo_id: string,
                disk_group_list: Array<VsanDiskGroup>,
                esx_host_info: EsxHostInfo,
                esx_host_list: Array<EsxHost>,
                host_cpu_cores_count: number,
                internal_host_count: number,
                volume_list: Array<StorageVolume>,
                vsan_subcluster_uuid: string,
                ): AutoCluster {
        const autoCluster = new AutoCluster(new BaseCluster({ }));
        autoCluster['aws_kms_info'] = aws_kms_info;
        autoCluster['billed_storage_capacity'] = billed_storage_capacity;
        autoCluster['cluster_capacity'] = cluster_capacity;
        autoCluster['cluster_id'] = cluster_id;
        autoCluster['luster_name'] = cluster_name;
        autoCluster['cluster_state'] = cluster_state;
        autoCluster['cluster_vcenter_mo_id'] = cluster_vcenter_mo_id;
        autoCluster['disk_group_list'] = disk_group_list;
        autoCluster['esx_host_info'] = esx_host_info;
        autoCluster['esx_host_list'] = esx_host_list;
        autoCluster['host_cpu_cores_count'] = host_cpu_cores_count;
        autoCluster['internal_host_count'] = internal_host_count;
        autoCluster['volume_list'] = volume_list;
        autoCluster['vsan_subcluster_uuid'] = vsan_subcluster_uuid;
        return autoCluster;
    }
    public get isValid( ): boolean {
        const isValidProperty = (prop: any, propName: string): boolean = >{
            if (prop === undefined) {
                console.warn('Cluster.' + propName + 'is undefined');
            }
            return prop !== undefined;
        };
        return (
            // Custom properties declared for Cluster
            isValidProperty(this.isAddingHosts, 'isAddingHosts') &&
            isValidProperty(this.isCreating, 'isCreating') &&
            isValidProperty(this.isDeleting, 'isDeleting') &&
            isValidProperty(this.isDeletingHosts, 'isDeletingHosts') &&
            isValidProperty(this.isEbsCluster, 'isEbsCluster') &&
            isValidProperty(this.isFailed, 'isFailed') &&
            isValidProperty(this.isReady, 'isReady') &&
            isValidProperty(this.isReconfiguring, 'isReconfiguring') &&
            isValidProperty(this.nonEbsStorageCapacity,
                'nonEbsStorageCapacity') &&
            isValidProperty(this.numHosts, 'numHosts') &&
            true
        );
    }
}
```

In one embodiment, there are a number of things to note in the code above. For example, in one embodiment, the custom properties are codified in the autogenerated parent class. Further, in one embodiment, all the custom properties have been deemed to be required, so they have to be present when isValid( ) is invoked.

Going back to autogenerated custom stub, the initProperties( ) method is invoked when the class is constructed using the factory( ) or build( ) methods, which, as stated before, is one embodiment for instantiating this class, allowing for custom logic to be implemented in initProperties( ). In one embodiment, additional methods can be defined to operate on the properties or for any other necessity.

Thus, in one embodiment, customizing classes is used by service adapter developers. In one embodiment, applications that need custom classes might not use this strategy. Instead, in one embodiment, an alternate strategy for instantiating custom classes in the application layer 230 is described in the section for Modelgen 232 and is, in one embodiment, the facility that a developer in the application layer 230 should use.

Customizing Service Adapters

In one embodiment, a facility that Servgen 220 provides is the ability to customize a service adapter in an encapsulated and easily isolatable set of specifications, that apply to any autogenerated service adapter, irrespective of its implementation language. In one embodiment, these customizations can include one, some or all of the following: an addition of additional custom service requests to the Service Adapter, with or without API calls to backend services; a combination of multiple API calls to backend services into a single Service Adapter request; Interceptor hooks before and after API calls to backend services for preprocessing or post-processing; and reacting to websocket events.

Creating Custom Service Adapters

In one embodiment, unlike custom classes, a service adapter is created as customizable. In other words, in one embodiment, for a service adapter, an autogenerated, immutable, parent service adapter will get created in the auto sub-folder, and the service adapter class name is prefixed with Auto. Thus, for the example being cited for the sddc-core Service Adapter, the autogenerated parent is created as AutoSddcCoreService in the auto sub-folder, and a derived, mutable service adapter SddcCoreService is created in the main folder for sddc-core.

The following is an embodiment of an excerpt from the service.json (refer to service.json) service adapter specification document for sddc-core:

```
{
  "name": "sddc-core",
  "version": "1",
  "broadcast": { "type": "Sddc", "change_type":
    "SddcStateChangeType" },
  "event_handler": true,
  "stores": [
    {
      "store": "SddcStore",
      "store_id": "Sddc",
      "type": "Sddc"
    }
  ],
  "service_requests": [
    {
      "service_request": "GetSddcList",
      "service_response": { "type": "Sddc", "container": "array" }
    },
    {
      "service_request": "GetSddc",
      "service_request_params": [
        { "service_request_param": "sddc" }
      ],
      "service_response": { "type": "Sddc", "container": "array" }
    },
    {
    "service_request": "OperatorGetUncachedSddcList",
    "description": "Operator only: ",
    "service_request_query_params": [
      { "service_request_query_param": "$filter", "optional": true },
      { "service_request_query_param": "includeDeleted",
        "optional": true }
    ],
    "api": { "uri": Voperator/sddcs", "api_method": "listSddcs" },
    "update_store": { "update": "SddcStore", "property": "id" },
    "service_response": { "type": "Sddc", "container": "array" }
  },
```

In one embodiment, the preamble to the service adapter specification has been previously described, as declaring the name and version of the sddc-core service adapter, and also declaring that the sddc-core service adapter listens to websocket events. In one embodiment, the autogenerated, immutable, parent AutoSddcCoreService creates a unique expression due to that event handler directive, as does the declaration stores specify that sddc-core service adapter is the owner of a bifröst store called Sddc, as described herein. The following is the top portion of the autogenerated parent AutoSddcCore:

```
export class AutoSddcCoreService extends
AbstractAutoEventHandler<
SddcCoreRequestObject, SddcCoreResponseObject> {
  public lastApi: any; // Unit test support
  protected readonly sddcStore: BusStore<Sddc>;
  protected version = '1';
  protected constructor( ) {
    super('SddcCoreService', SddcCoreChannel.request,
SddcCoreChannel.broadcast);
    // Create or fetch SddcStore
    this.sddcStore = this.storeManager.createStore<Sddc>('Sddc');
    this.log.info('SddcStore now available to' + this.getName( ));
  }
}
```

Typically, a service adapter parent class (AutoSddcCoreService in this case) is derived from an abstract class called AbstractAutoService. However, in one embodiment, since the sddc-core service adapter has specified that it is an event_handler in its service.json, AutoSddcCoreService is derived from the abstract class AbstractAutoEventHandler, which provides an abstraction for websocket listeners.

In one embodiment, the constructor for this service instantiates its super class and initializes the store that it owns. However, in one embodiment, things start to get more interesting with the next set of specifications in service.json:

```
"service_requests": [
  {
    "service_request": "GetSddcList",
    "service_response": { "type": "Sddc", "container": "array" }
  },
  {
    "service_request": "GetSddc",
    "service_request_params": [
      { "service_request_param": "sddc" }
    ],
    "service_response": { "type": "Sddc", "container": "array" }
  },
  {
    "service_request": "OperatorGetUncachedSddcList",
    "description": "Operator only: ",
    "service_request_query_params": [
      { "service_request_query_param": "$filter", "optional": true },
      { "service_request_query_param": "includeDeleted",
        "optional": true }
    ],
    "api": { "uri": "/operator/sddcs", "api_method": "listSddcs" },
    "update_store": { "update": "SddcStore", "property": "id" },
    "service_response": { "type": "Sddc", "container": "array" }
  },
```

In one embodiment, of a service.json service adapter specification document, when a service adapter requested specification does not contain an api property, omitting the specification of a corresponding API call to a backend service as described in service.json, then that is called a custom request, which distinguishes it from other service adapter requests that do specify the api property corresponding to an entry point described in an API Specification document.

In the above example, two custom requests have been specified, GetSddcList, and GetSddc, which look like other requests by virtue of being able to receive request parameters, as well as being able to respond with a typed response to the request.

Handling Service Requests

In one embodiment, all service requests to a service adapter like sddc-core are intercepted from the bifröst event bus 103 by the abstract parent AbstractAutoService (AbstractAutoEventHandler is a child of AbstractAutoService) which takes care of marshaling and unmarshaling payloads from the consumer application and then calling the handler method in the derived service adapter: handleServiceRequest( ) as shown below for sddc-core:

```
protected handleServiceRequest(sddcCoreRequestObject: SddcCoreRequestObject,
args?: MessageArgs) {
  switch (sddcCoreRequestObject.request) {
    case SddcCoreServiceRequest.GetSddcList: {
      // Non-API Service Request - needs custom code in derived class
```

```
      SddcCoreService break;
   }
   case SddcCoreServiceRequest.GetSddc: {
      // Non-API Service Request - needs custom code in derived class
      SddcCoreService break;
   }
   case SddcCoreServiceRequest.OperatorGetUncachedSddcList: {
      const apiObject = this.genApiObject(sddcCoreRequestObject,
         new SddcCoreOperatorGetUncachedSddcListResponseObject( ));
      const params = sddcCoreRequestObject. payload as SddcCoreOperatorGet
UncachedSddcListParams;
      const successHandler =
         (context: ApiObject<SddcCoreRequestObject, SddcCoreResponse
         Object>, apiResponse: Array<Sddc>, messageArgs: MessageArgs) =>{
         const serviceResponse = [];
         let storeWasEmpty = this.sddcStore.allValues( ).length == 0;
         for (let item of apiResponse) {
            const instanceSddc = Sddc.factory(item);
            serviceResponse.push(instanceSddc);
            this.sddcStore.put(instanceSddc.id, instanceSddc,
               storeWasEmpty ? SddcStateChangeType.Created :
SddcStateChangeType.Updated);
         }
         if (storeWasEmpty) {
            storeWasEmpty = false;
            this.sddcStore.initialize( );
            this.log.info('Store SddcStore initialized in ${this.name}', this.getName( ));
         }
         this.apiSuccessIntercept(context, serviceResponse, messageArgs);
      };
      const failureHandler =
         (context: ApiObject<SddcCoreRequestObject, SddcCoreResponseObject>,
         err: RestError, messageArgs: MessageArgs) => {
         this.apiFailureIntercept(context, err, messageArgs);
      };
      (this.lastApi = new API_OperatorSddcs(this.apiBridge, apiObject, args))
      .listSddcs(// Get
         params['$filter'],
         params['includeDeleted'],
         success Handler,
         failure Handler
      );
      break;
   }
}
```

Interestingly, in one embodiment, the two custom requests, GetSddcList, and GetSddc, don't have any implementation code, and are expected to be manually populated in the derived customizable service adapter, SddcCoreService, overriding the handlers for them here in AutoSddcCoreService. The non-custom request, OperatorGetUncachedSddcList, does have autogenerated code that performs an API call and returns a response, after performing a few local operations. The hooks successHandler, failureHandler, apiSuccessIntercept, and apiFailureIntercept are described in detail in the section Intercepting Service Requests And Responses.

Custom Service Adapter Requests

The following example describes one embodiment used to customize a custom request, when the receiving class is immutable. In one embodiment, the inheritance in languages like Typescript, Java, Golang, and the like, provide the developer with the capability to override an operation in a derived class. For example, in the sddc-core Service Adapter, note the following:

```
/**
 *Service requests are all handled in the autogenerated parent class, except for
 *service requests that don't require API calls, in which case they are handled here.
 * @param {SddcCoreRequestObject}sddcCoreRequestObject
 * @param {MessageArgs}args
 */
protected handleServiceRequest(sddcCoreRequestObject: SddcCoreRequestObject,
args?: MessageArgs) {
   // requeue requests if service initialization is still in progress.
   if (!this.serviceInitialized) {
      this.reQueueRequest(sddcCoreRequestObject, args);
      return;
   }
   switch (sddcCoreRequestObject.request) {
      case SddcCoreServiceRequest.GetSddcList: {
         super.handleServiceRequest(sddcCoreRequestObject, args);
```

```
        this.log.info('SddcCoreService received request:'
            + SddcCoreServiceRequests[sddcCoreRequestObject.request]);
        const apiObject = this.genApiObject(sddcCoreRequestObject, new
    SddcCoreGetSddcListResponseObject( ));
        super. apiSuccessIntercept(apiObject, this.sddcStore.allValues( ), args);
        break;
      }
    case SddcCoreServiceRequest.GetSddc: {
        super.handleServiceRequest(sddcCoreRequestObject, args);
        this.log.info('SddcCoreService received request:'
            + SddcCoreServiceRequests[sddcCoreRequestObject.request]);
        const apiObject = this.genApiObject(sddcCoreRequestObject, new
    SddcCoreGetSddcResponseObject( ));
        const sddcId = (sddcCoreRequestObject.payload as
    SddcCoreGetSddcParams).sddc;
        const sddc = this.decache(sddcId);
        if (!sddc) {
            this.postError(sddcCoreRequestObject.channel,
               new RestError('Sddc ID: ' + sddcId + 'not found!', 0, ''));
            return;
        }
        super.apiSuccessIntercept(apiObject, sddc? [sddc] : [], args);
        break;
      }
      // TODO: IMPORTANT **make sure to handle case 'GetFilteredList' when sddc-
    state service goes away **
      default:
        super.handleServiceRequest(sddcCoreRequestObject, args);
    }
  }
}
```

In one embodiment, the above handler contains custom code to satisfy the two custom requests, GetSddcList, and GetSddc, while passing all other requests for normal handling by the parent AutoSddcCoreService. Note that, in one embodiment, the two custom handlers first invoke the super class in order to permit any preprocessing (none in this particular service adapter) and then perform some local operations to generate responses to these services. Then, in one embodiment, the inherited method, apiSuccess Intercept( ) is invoked to send the response back to the consumer application. In one embodiment, the apiSuccessIntercept, and apiFailureIntercept are described in detail herein.

Event Handler

As stated herein, in one embodiment, declaring a service adapter as an event_handler changes it to be derived from AbstractAutoEventHandler, instead of from AbstractAutoService. In one embodiment, the parent AbstractAutoEventHandler declares a number of methods that are expected to be overridden by derived classes, of which the following are some examples of commonly used ones:

```
/**
  *Required method for state initialization at app restart after user is authenticated
  */
protected abstract initializeState( ): void;
/**
  *Optional method for task state updates that can be overridden in the derived
class.
  * @param task
  */
protected taskStateUpdate(task: Task): void {
    // override in derived classes that handle task updates.
}
/**
  *Optional method for non-task updates (e.g. alerts) that can be overridden in the
derived class.
  * @param webSocketObject
  */
protected nonTaskHandler(webSocketObject: WebsocketObject): void {
    // override in derived classes that handle non-task updates.
}
```

In one embodiment, AbstractAutoEventHandler calls the initializeState( ) method in the derived child class in order for it to do any necessary preparations before it can handle websocket events. After that, if a websocket event is received, in one embodiment, it will call either taskState-Update( ) or nonTaskHandler( ) in the derived child service adapter. Here is an excerpt from taskStateUpdate( ) as implemented in the sddc-core service adapter.

```
/**
    *This is the entry point for websocket task events
    *
    *@param {Task} task
    */
    protected taskStateUpdate(task: Task): void {
        super.taskStateUpdate(task);
        this.log.info('SddcCore: Websocket updateh!\n');
        let sendNotification = false;
        this.updateCounter++;
        if (!task.operatesOnSddc) {
          return;
        }
        // Save the resource_is of a MultiAz task so that we can ignore all SingleAz
tasks with the same resource_id
        if (task.isDeployingMultiAz) {
          this.mutliAzTasks.add(task.resource_id);
        } else if (!task.isMultiAzTask && this.mutliAzTasks.has(task.resource_id)) {
          // ignore all single-AZ tasks when a multi-AZ deploy task with the same
resource_id is in progress
          return;
        }
        let sddc = task.resource_id ? this.decache(task.resource_id) : null;
        const syntheticSddc = this.decache(task.id);
        if (!task.isNascent && !!syntheticSddc) {
          this.replaceSyntheticSddc(task, syntheticSddc);
          return;
        }
        :
        :
```

Composite Service Adapter Requests

In one embodiment, there is a 1-to-1 correspondence between a service adapter request and an associated backend service API call extracted from the API Interface document(s) for non-custom requests such as GetSddcList above. However, in one embodiment, if the service adapter request cannot be satisfied by a single API call to a backend service, but instead requires multiple calls, perhaps even to different backend servers; Servgen provides an elegant mechanism for specifying a custom request whose response is the composite of responses to multiple API endpoints, perhaps with additional local processing in the service adapter.

For example, consider a new custom request called DeleteNamedSddc, which takes a request parameter, name, with the intent of destroying an Sddc whose name matches the passed parameter name. In one embodiment, to implement that in a single service adapter request, (since the only available API for deleting an Sddc requires its id and not its name), one embodiment fetches all the Sddc objects using the existing GetUncachedSddcList request and scans the response for an Sddc whose name matches the one provided name request parameter, extracting the id property from the matching Sddc; invoking the DeleteSddc Service Adapter request with that id; and then returning from the Delete-NamedSddc with an appropriate response.

In one embodiment, to effect this, the following is specified in the service.json:

```
{
    "service_request": "GetUncachedSddcList",
    "service_request_query_params":
        { "service_request_query_param": "includeDeleted", "optional": true }
    ],
    "api": ( "uri": "/orgs/{org}/sddcs", "api_method": "listSddcs" },
    "update_store": { "update": "SddcStore", "property": "id" },
    "service_response": { "type": "Sddc", "container": "array" }
},
{
    "service_request": "DeleteSddc",
    "service_request_params":
        { "service_request_param": "sddc" }
    ],
    "service_request_query_params": [
        { "service_request_query_param": "force", "optional": true },
        { "service_request_query_param": "retain_configuration", "optional": true },
```

```
    { "service_request_query_param": "template_name", "optional": true }
  ],
  "api": { "uri": "/orgs/{org}/sddcs/{sddc}", "api_method": "deleteSddcs" },
  "update_store": { "delete": "SddcStore", "param": "sddc" },
  "service_response": { "type": "Task" }
},
{
  "service_request": "DeleteNamedSddc",
  "service_request_params":
    [
      { "service_request_param": "sddc_name" }
    ],
  "service_response": { "type": "string" }
},
```

In one embodiment, the two ordinary requests, GetUncachedSddcList, and DeleteSddc, already exists in the service.json for the sddc-core service adapter and remain unchanged. In one embodiment, in order to implement the new composite request, a new custom request, DeleteNamedSddc has been specified above, and it will use a name parameter of type string (default type if not specified), and on completion of the request, is expected to return the id of the Sddc that matched name and was deleted. In one embodiment, failure of any of the operations will result in a failure response to the consumer application unless intercepted. In the example below, only successful completions are intercepted, while failures go directly to the consumer.

In one embodiment, in the autogenerated request handler in AutoSddcCoreService, the handler for GetUncachedSddcList exists:

```
case SddcCoreServiceRequest.OperatorGetUncachedSddcList: {
    const apiObject = this.genApiObject(sddcCoreRequestObject,
            new SddcCoreOperatorGetUncachedSddcListResponseObject( ));
    const params = sddcCoreRequestObject.payload as SddcCoreOperatorGet
UncachedSddcListParams;
    const successHandler =
        (context: ApiObject<SddcCoreRequestObject, SddcCoreResponseObject>,
                apiResponse: Array<Sddc>, messageArgs: MessageArgs) => {
            const serviceResponse = [ ];
            let storeWasEmpty = this.sddcStore.allValues( ).length == 0;
            for (let item of apiResponse) {
                const instanceSddc = Sddc.factory(item);
                serviceResponse.push(instanceSddc);
                this.sddcStore.put(instanceSddc.id, instanceSddc,
                        storeWasEmpty ? SddcStateChangeType.Created :
SddcStateChangeType.Updated);
            }
            if (storeWasEmpty) {
                storeWasEmpty = false;
                this.sddcStore.initialize( );
                this.log.info(`Store SddcStore initialized in ${this.name}`, this.getName( ));
            }
            this.apiSuccessIntercept(context, serviceResponse, messageArgs);
        };
    const failureHandler =
        (context: ApiObject<SddcCoreRequestObject, SddcCoreResponseObject>,
        err: RestError, messageArgs: MessageArgs) => {
            this.apiFailureIntercept(context, err, messageArgs);
        };
    (this.lastApi = new API_OperatorSddcs(this.apiBridge, apiObject, args))
        .listSddcs(// Get
        params['$filter'],
        params['includeDeleted'],
        successHandler,
        failureHandler
    );
    break;
}
```

As does the request handler for DeleteSddc:

```
case SddcCoreServiceRequest.DeleteSddc: {
    const apiObject = this.genApiObject(sddcCoreRequestObject,
            new SddcCoreDeleteSddcResponseObject( ));
    const params = sddcCoreRequestObject.payload as SddcCoreDeleteSddcParams;
    const successHandler =
        (context: ApiObject<SddcCoreRequestObject, SddcCoreResponseObject>,
                apiResponse: Task, messageArgs: MessageArgs) => {
```

```
      const serviceResponse = Task.factory(apiResponse);
      this.sddcStore.remove(params['sddc'], SddcStateChangeType.Deleted);
      this.apiSuccessIntercept(context, serviceResponse, messageArgs);
    };
    const failureHandler =
      (context: ApiObject<SddcCoreRequestObject, SddcCoreResponseObject>,
      err: RestError, messageArgs: MessageArgs) => {
    this.apiFailureIntercept(context, err, messageArgs);
    };
    (this.lastApi = new API_OrgsOrgSddcsSddc(this.apiBridge, apiObject, args,
  this.callerOrgId, params['sddc']))
  .deleteSddcs(// Delete
      params['force'],
      params['retain_configuration'],
      params['template_name'],
      success Handler,
      failure Handler
    );
    break;
  }
```

In one embodiment, only a placeholder for the new custom request, DeleteNamedSddc is generated:

```
protected handleServiceRequest(sddcCoreRequestObject: SddcCoreRequestObject,
args?: MessageArgs) {
  switch (sddcCoreRequestObject.request) {
    case SddcCoreServiceRequest.DeleteNamedSddc: {
      // Non-API Service Request - needs custom code in derived class
SddcCoreService
      break;
    }
```

So, in one embodiment, in order to implement the custom request, which is a composite of the above two requests, the following is performed in the customizable service adapter, SddcCoreService:

```
/**
 * Service requests are all handled in the autogenerated parent class, except for
service requests that don't
 *require API calls, in which case they are handled here.
 *
 * @param {SddcCoreRequestObject} sddcCoreRequestObject
 * @param {MessageArgs} args
 */
protected handleServiceRequest(sddcCoreRequestObject: SddcCoreRequestObject,
args?: MessageArgs) {
    // requeue requests if service initialization is still in progress.
    if (!this.serviceInitialized) {
      this.reQueueRequest(sddcCoreRequestObject, args);
      return;
    }
    switch (sddcCoreRequestObject.request) {
      case SddcCoreServiceRequest.DeleteNamedSddc: {
        super.handleServiceRequest(sddcCoreRequestObject, args);
        sddcCoreRequestObject['custom_request'] =
SddcCoreServiceRequest.GetSddcList;
        sddcCoreRequestObject.request =
SddcCoreServiceRequest.DeleteNamedSddc;
        const apiObject = this.genApiObject(sddcCoreRequestObject, new
SddcCoreGetUncachedSddcResponseObject( ));
        super.handleServiceRequest(sddcCoreRequestObject, args);
        break;
      }
```

In the example above, the implementation for satisfying the new DeleteNamedSddc custom request turns around and calls the parent AutoSddcCoreService's handleServiceRequest( ) method but passes it the GetSddcList request to replace the original DeleteNamedSddc request. In one embodiment, this is an asynchronous call, and the result will be returned in a callback to the apiSuccessIntercept( ), which is intercepted as shown below (more about intercepts are discussed in the section on intercepting service requests and responses). In one embodiment, there is no need to pass a flag that can be interrogated by apiSuccessIntercept( ) to distinguish that the response from a segment of a composite request is being intercepted. The apiSuccessIntercept( ) has already been autogenerated in AutoSddcCoreService thus, as has the companion apiFailureHandler:

```
protected apiSuccessIntercept(apiObject:
ApiObject<SddcCoreRequestObject, SddcCoreResponseObject>,
        payload: any,
            args?: MessageArgs) {
        this.apiSuccessHandler(apiObject, payload, args);
}
protected apiFailureIntercept(apiObject:
ApiObject<SddcCoreRequestObject, SddcCoreResponseObject>,
            err: RestError, args?: MessageArgs) {
        this.apiFailureHandler(apiObject, err, args);
}
```

In one embodiment, this method would normally return the response from the GetUncachedSddcList request above back to the consumer application, but the second segment, DeleteSddc, has yet to be implemented, so the apiSuccessIntercept( ) itself must be intercepted in order to make the second request, DeleteSddc:

In one embodiment, the flow is changed by overriding the above interception method in the customized service adapter as follows:

```
protected apiSuccessIntercept(apiObject:
ApiObject<SddcCoreRequestObject, SddcCoreResponseObject>,
                payload: any,
                args?: MessageArgs) {
    if (apiObject.requestObject['custom_request']) {
        switch (apiObject.requestObject.request) {
            case SddcCoreServiceRequest.GetSddcList:
                const sddcList: Array<Sddc> = payload;
                const params = apiObject.requestObject.payload as
SddcCoreOperatorGetUncachedSddcListRequestObject;
                for (let sddc of sddcList) {
                    if (sddc.name === params['sddc_name']) {
                        apiObject.requestObject.request =
SddcCoreServiceRequest.DeleteSddc;
                        apiObject.requestObject.payload = sddc.id;
                        this.handleServiceRequest(apiObject.requestObject,
                        args);
                        return;
                    }
                }
                this.postError(apiObject.requestObject.channel,
this.serviceRequestError, args);
                return;
            case SddcCoreServiceRequest.DeleteSddc:
                // The Sddc id can be retrieved from the request object
                apiObject.responseObject.payload =
                apiObject.requestObject.payload;
                break;
        }
    }
    super.apiSuccessIntercept(apiObject, payload, args);
}
```

In one embodiment, the return from the GetUncachedSddcList request is intercepted in the above custom apiSuccessIntercept( ), followed by local processing to extract the id of the Sddc whose name matches the one provided to the original DeleteNamedSddc request that persists in the request object that has passed through in apiObject. So, now, in one embodiment, a second request can be sent to the parent's handleServiceRequest( ), this time with DeleteSddc as the request, and sddc.id from the matched sddc as the request parameter.

In one embodiment, on successful return from the DeleteSddc request, the service response is set to the id that was passed to the request, which is still stored in the payload for the request object in apiObject and drop through to call super.apiSuccessIntercept( ) to complete processing for the original DeleteNamedSddc request and return the response to the consumer application.

In one embodiment, the above strategy can be used to create composite request handling for any arbitrary request to the service adapter 107 which may result in numerous and unlimited secondary requests to an arbitrary sequence of service adapter requests. One benefit of using this approach is that the custom request has no knowledge of how each request element of the composite is processed by the parent AutoServiceSddcCore, nor does it need to know which APIs to invoke in the backend service, as would have been necessary if an alternate strategy was employed.

Thus, the embodiments described herein provide a unique, novel, and elegant strategy to employ atop the autogenerated service adapter, with a minimal amount of custom code, unaffected by implementation details elsewhere.

Intercepting Service Requests And Responses

In one embodiment, the process of autogeneration lays out a structured flow that begins with a request to a service adapter and completes with either a successful response or a failure back to the requestor. Between these two points, autogeneration may result in one or more API calls to backend services, and/or data transformation within the service adapter, before and/or after executing each API call, all opaque to the developer.

Often, it is necessary to alter this clean flow with custom code because of aspects such as, but not limited to: The request parameters have to be massaged before making an API call to one or more backend service(s); An internal state has to be incrementally created across multiple API calls to backend services; An API response has to massaged for ease of rendering by an application to work better with the implementation language of the consumer application; Multiple API calls are needed to multiple servers to satisfy a service request, requiring intermediate processing in both directions; Temporarily process logic in a service adapter that was missed in a backend service, perhaps for expediency to meet a deadline, until it is rectified in the backend service; and the like.

Philosophy of Design

In one embodiment, one, some, or all of the above enumerated conditions result in a desire for inserting custom code surgically and cleanly into the autogenerated flow from the consumer to a service adapter, on to one or more backend services, a response to the service adapter from the backend service, potentially more custom code to mutate this response, before responding back to the consumer, including handling any error conditions in the response.

For all of these cases and more, Servgen 220 provides hooks where the request-response flow may be interrupted with custom code to satisfy unique requirements that cannot be autogenerated. In one embodiment, in order to provide a means to the developer to inject custom code, the layout of the autogenerated code is cleanly divided into code that is immutable and code that is customizable as described herein.

In one embodiment, a beneficial side-effect of this clean separation of autogenerated code and custom code is the ease with which the custom code can be identified, isolated, and removed when the need for the original insertion no longer persists. In one embodiment, the clean separation also exposes the quantity of code that may need further review to identify candidate code for migration from the service adapter to the backend service(s) where possible.

In one embodiment, the strategy used to provide clean separation between autogenerated code and encapsulated custom code depends heavily on inheritance, a facility of OOP for a child class to inherit properties and methods from a parent class. In one embodiment, using inheritance allows for a common pattern to be implemented across languages like Java, Typescript, C++, and a few others. Unfortunately, such a facility does not exist for languages like Go, and as they do, or as other languages are available, Service Adapters that are implemented using Go, may not be as customizable.

Interrupting Request/Response Flow

Figure 4:
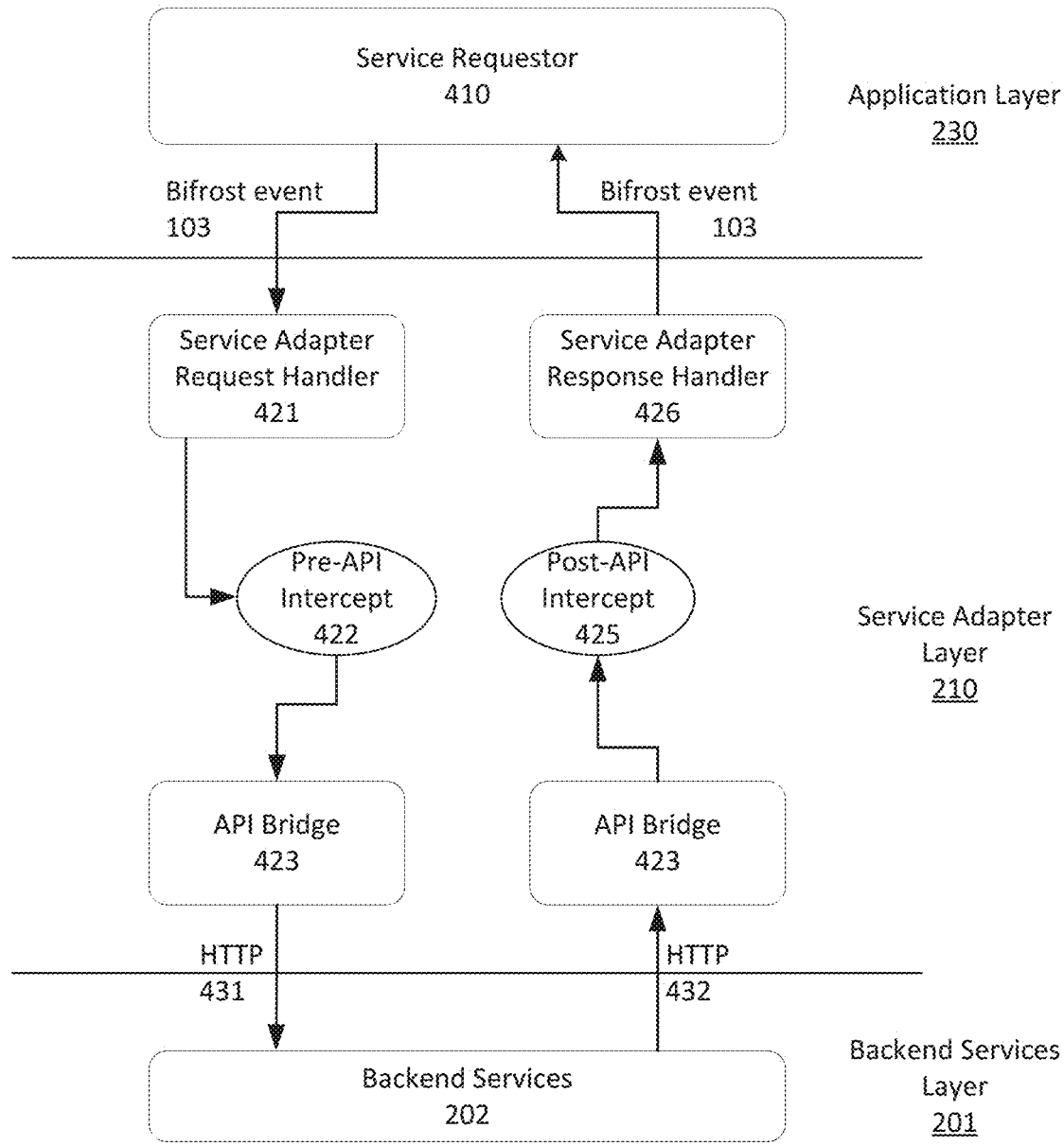
FIG. 4 depicts a diagram of an interrupting request/response flow of a service request used by service adapter generator, in accordance with an embodiment.

FIG. 4 depicts a diagram of an interrupting request/response flow of a service request used by servgen 220, in accordance with an embodiment. In one embodiment, the flow of a service request from a consumer (e.g., service requestor 410) to a service adapter request handler 421, to pre-API intercept 422, through API bridge 423 and on to backend services 202. Backend services 202 responds through API bridge 423, to Post-API intercept 425, to service adapter response handler 426, and back to the consumer (e.g., service requestor 410) for both successful operations and failures.

In one embodiment, Servgen 220 provides facilities (hooks) to intercept and mutate service requests from consumer applications before passing it to a backend service, and also to intercept the responses from backend services for further processing before sending the response back to the original consumer application. In FIG. 4, the boxes depict the normal flow, while the ovals pre-API intercept 422 and post-API intercept 425 show the intercept of the flow in two locations to insert custom code.

In one embodiment, the labels HTTP 431 and or HTTP 432 can (one or both) be replaced by a different transport, such as for example, websocket, gRPC, etc., as the API Bridge 423 allows for arbitrary transport mechanisms to be employed, including using the bifröst event bus 103.

Pre-API Intercept

In one embodiment, interception is supported using lambda functions that can be inserted into custom code. The customization of code has already been described in detail in the section customizing service adapters, by injecting code in the customizable stub produced by Servgen 220. As an example, consider the following code from the sddc-core service adapter. The autogenerated code in AutoSddcCoreService.handleServiceRequest contains:

```
case SddcCoreServiceRequest.DeleteSddc: {
    const apiObject = this.genApiObject(sddcCoreRequestObject,
        new SddcCoreDeleteSddcResponseObject( ));
    const params = sddcCoreRequestObject.payload as SddcCoreDeleteSddcParams;
    const successHandler =
        (context: ApiObject<SddcCoreRequestObject, SddcCoreResponseObject>,
            apiResponse: Task, messageArgs: MessageArgs) => {
        const serviceResponse = Task.factory(apiResponse);
        this.sddcStore.remove(params['sddc'], SddcStateChangeType.Deleted);
        this.apiSuccessIntercept(context, serviceResponse, messageArgs);
    };
    const failureHandler =
        (context: ApiObject<SddcCoreRequestObject, SddcCoreResponseObject>,
            err: RestError, messageArgs: MessageArgs) => {
        this.apiFailureIntercept(context, err, messageArgs);
    };
    (this.lastApi = new API_OrgsOrgSddcsSddc(this.apiBridge, apiObject, args,
        this.callerOrgId, params['sddc']))
    .deleteSddcs(// Delete
        params['force'],
        params['retain_configuration'],
        params['template_name'],
        successHandler,
        failureHandler
    );
    break;
}
```

In one embodiment, the above code shows how the autogenerated request handler formats the request payload for transmission to the apiBridge to perform the API call to the backend service. Consider a contrived example where it is desired that the Service Adapter reject any service requests to delete an Sddc if its id is 123-456-7890. In one embodiment, in order to implement this check/reject logic, the autogenerated Customizable Service Adapter Stub will have to be enhanced as follows:

```
/**
 *Service requests are all handled in the autogenerated parent
class, except for service requests that don't
 * require API calls, in which case they are handled here.
 *
 *@param {SddcCoreRequestObject}sddcCoreRequestObject
 *@param {MessageArgs}args
 */
protected handleServiceRequest(sddcCoreRequestObject:
SddcCoreRequestObject, args?: MessageArgs) {
    switch (sddcCoreRequestObject.request) {
        case SddcCoreServiceRequest.DeleteSddc: {
            const params = sddcCoreRequestObject.payload as
SddcCoreDeleteSddcParams;
            if (params['sddc'] === '123-456-7890') {
                this.postError(sddcCoreRequestObject.channel,
this.serviceRequestError, args);
            } else {
                super.handleServiceRequest(sddcCoreRequestObject,
args)
            }
            break;
        }
        default:
            super.handleServiceRequest(sddcCoreRequestObject, args);
    }
}
```

In one embodiment, by using a typical OOP pattern, the handleServiceRequest( ) method in AutoSddcCoreService has been overridden in the derived SddcCoreService by implementing it. The above is an example of Pre-API Intercept, which, in one embodiment, is careful to only intercept the DeleteSddc request and pass all other requests unchanged to the parent AutoSddcCoreService by invoking super.handleServiceRequest( ) with the parameters it received.

In one embodiment, once it is intercepted, it is a matter of injecting any custom code therein. In the above, there is a check to see if the sddc parameter to the request is the one that is being guarded against and returns an error to the consumer by calling this.postError( ) with an appropriate error, otherwise the request is passed on to the parent AutoSddcCoreService, which handles it normally in its autogenerated code. In one embodiment, the customized SddcCoreService has no need to understand how to perform the API call as it is just a gatekeeper in this case.

In other words, in one embodiment, the Pre-API Intercept is a matter of overriding any service request by implementing an override for the parent request handler and inserting some custom code before calling the request handler in the parent autogenerated service to perform a potentially mutated API call to the backend services(s). However, it should be appreciated that this is a powerful facility and in the above example a few lines of custom code have been injected in the flow in a surgical manner, without having to perturb any of the autogenerated code.

Post-API Intercept

In one embodiment, when there is a response from an API call to a backend service, Servgen 220 provides a number of methods in the autogenerated parent service adapter to intercept the API response before transmitting the response back to the requesting consumer. In one embodiment, these methods can be overridden in the customized service adapter and implements the strategy for Post-API Interception. In one embodiment, the autogenerated service adapter declares these two methods as follows:

```
protected apiSuccessIntercept(apiObject:
ApiObject<SddcCoreRequestObject, SddcCoreResponseObject>,
    payload: any,
    args?: MessageArgs) {
  this.apiSuccessHandler(apiObject, payload, args);
}
protected apiFailureIntercept(apiObject:
ApiObject<SddcCoreRequestObject, SddcCoreResponseObject>,
    err: RestError, args?: MessageArgs) {
  this.apiFailureHandler(apiObject, err, args);
}
```

Note that in one embodiment, these two methods, one for intercepting a successful return from an API call and the other for an error response, are hooks that call the respective methods in AbstractAutoService to format a response message and transmit it to the requesting consumer with the API response payload. In one embodiment, by using the override pattern for OOP, interception is provided by overriding these in the customized service adapter and inserting custom code therein. An example shown previously in customizing service adapters demonstrated how multiple API calls can be daisy chained by using Post-API Interception.

```
protected apiSuccessIntercept(apiObject:
ApiObject<SddcCoreRequestObject, SddcCoreResponseObject>,
payload: any, args?: MessageArgs) {
  if (apiObject.requestObject['custom_request']) {
    switch (apiObject.requestObject.request) {
      case SddcCoreServiceRequest.GetSddcList:
        const sddcList: Array<Sddc> = payload;
        const params = apiObject.requestObject.payload as
SddcCoreOperatorGetUncachedSddcListRequestObject;
```

```
        for (let sddc of sddcList) {
          if (sddc.name === params['sddc_name']) {
            apiObject.requestObject.request =
SddcCoreServiceRequest.DeleteSddc;
            apiObject.requestObject.payload = sddc.id;
            this.handleServiceRequest(apiObject.requestObject,
              args);
            return;
          }
        }
        // No name match found
        this.postError(apiObject.requestObject.channel,
this.serviceRequestError, args);
        return;
      case SddcCoreServiceRequest.DeleteSddc:
        // The Sddc id can be retrieved from the request object
        apiObject.responseObject.payload =
          apiObject.requestObject.payload;
        break;
    }
  }
  super.apiSuccessIntercept(apiObject, payload, args);
}
```

In one embodiment, the apiSuccessHandler has been overridden in the customized service adapter. Since this same method can be invoked for every service request with a successful response, care must be taken to ensure that any code being inserted is applicable to a specific service request. In the above, one can discriminate on the original service request by interrogating apiObject. In one embodiment, this is a convenient package of data that accompanies the API call and then back, and contains the original (perhaps augmented) request object, as well as the response object that will be transmitted back to the requesting consumer.

In one embodiment, since the above implements daisy-chaining, an additional flag is used to distinguish this specific request to GetSddcList from other consumers making the same request, without daisy chaining. In one embodiment, this is done by inserting a custom parameter in the request handler of the customized service adapter thus:
sddcCoreRequestObject['custom_request']=SddcCoreServiceRequest. DeleteNamed Sddc;

In one embodiment, the developer can use the flag or choose another alternate strategy to notify apiSuccessIntercept( ) with this or any other data. In the above example, the customized service adapter tests for the existence of this flag and chains another API call to the backend, otherwise it just calls the parent's apiSuccessIntercept( ) to process normally. In the above, after the chain of API calls (just one in this case) has completed, the custom intercept code changes what is being returned to the requestor by modifying the response payload.

In one embodiment, the other hook, apiFailureHandler( ) can be utilized similarly in order to intercept a failure response from an API call, and the same chaining strategy could be used to retry the call if appropriate.

In one embodiment, at the end of the customized intercept call, there should be a call to super.apiSuccessIntercept( ) or apiFailureIntercept( ) to complete the response to the requestor. In one embodiment, without that call, no response will be transmitted which could potentially cause the consumer application to hang indefinitely.

Modelgen 232

Modelgen 232 is a models and operations generator. In one embodiment, Modelgen 232 uses the service adapter interface document(s) 223 output by the Servgen 220 to instantiate runtime language bindings for models and operations (e.g., models and operations 233 and/or 234), one group of these for each service adapter, in a multitude of languages, using the same plugin strategy used by all Intent compiler components.

In one embodiment, the role of Modelgen 232 is to translate service adapter interface documents 223 into language-specific bindings in a number of supported programming languages to be manifest as models and operations in the application layer 230. In one embodiment, Modelgen 232 is the 4th stage of the compiler's pipeline.

Specifications and Languages

In one embodiment, Modelgen 232 reads the service adapter interface documents 223 output by Servgen 220 using LibSwagger and creates models and operation interfaces to all detected service adapters, while hiding the bifröst event bus 103 interfaces, so that developers only have to make procedural calls with asynchronous callback handlers that are relatively simple to implement and maintain. In one embodiment, because all interfaces and models are autogenerated, changes to contracts are quickly exposed, simplifying maintenance of downstream applications.

In one embodiment, Modelgen 232 outputs models and operational interfaces use Typescript, and golang, however, because of the plugin architecture employed by all intent compiler 100 components, additional languages can be supported. In general terms, Modelgen 232 converts an abstraction of specifications as produced by Servgen 220, into models and operations in supported languages. In this sense, it is also a translation engine that is analogous to Apigen 213, except that, instead of creating bindings to API calls, Modelgen 232 creates bindings to service adapter requests and responses.

Configuring Modelgen

In one embodiment, there is a configuration folder that is specific to Modelgen 232 using --config-dir that contains three sub-folders: app, components, and models. In one embodiment, each of these sub-folders contains one or more configuration files to control the behavior of Modelgen 232, and those of Appgen 236, and Cligen 238. While the sub-folders are described below, only the models sub-folder is relevant to Modelgen 232, while the rest are relevant to Appgen 236 and Cligen 238.

app

In one embodiment, this subfolder contains a single configuration file: app.json, which specifies the environment and framework that is to be used in autogeneration of the application layer 230. The following is an example of app.json from VMC-UI:

```
{
    "name": "vmc-ui",
    "framework": "angular",
    "version": "8",
    "language": "typescript"
}
```

The following describes each of the properties above and, in one embodiment, are only used by Appgen 236:

| Property | Description |
| --- | --- |
| name | This is the name of the target application |
| framework | This identifies the framework used by the target application. |
| version | This is the version of the framework. In the above, Angular version 8 is specified |
| language | This is the implementation language of the application. Note: this only specifies the language of the implementation in the Application Layer. In one embodiment, it is independent of the language used in the implementation of the Service Adapters and the backend services. |

In one embodiment, the components sub-folder contains configuration files for autogenerated Application Components (currently only Angular Components), that are used by Appgen 236. This is an example for the sddc-summary component from VMCUI:

```
{
    "component": "sddc-summary",
    "location": "src/components/",
    "services": [
        { "service": "sddc-core" },
        { "service": "edrs" },
        { "service": "provisioning" }
    ],
    "css": false,
    "html": false
}
```

In one embodiment, these properties are only used by Appgen, and are described in the table below:

| Property | Description |
| --- | --- |
| component | This property specifies the name of component sub-folder that is to be autogenerated. In the above, sddc-summary is the sub-folder in which the component SddcSummary will be created by Appgen. |
| location | For the component to be created in the above component sub-folder, the location property describes the parent folder for it, relative to the root of the project tree. |
| services | services is an array of Service Adapters that are used by this component and is also used to autogene rate parent classes for this component. |
| service | Each element of the services array contains the name of the Service Adapter that the component needs to access for Operations and Models. |
| css | This boolean specifies whether a <component>.scss file should be autogenerated by Appgen. In one embodiment, if not specified, the default value is assumed to be true. |

| Property | Description |
| --- | --- |
| html | This boolean specifies whether a <component>.html file should be autogenerated by Appgen. In one embodiment, if not specified, the default value is assumed to be true. |

Models

In one embodiment, this folder is used exclusively by Modelgen 232 and in one embodiment, only has a single configuration file called customized.json, which declares which classes and operations autogenerated by Modelgen should be structured for customization by the application developer in order to extend them. In one embodiment, specification of the --no-customization flag can causes this file to be ignored, which is useful when go is used, as the absence of inheritance in that language hinders the use of this strategy for customizations. The following is an example of customized.json obtained from VMCUI:

```
{
  "customized_operations": [
    { "operation": "reservation" },
    { "operation": "app-alerts" },
    { "operation": "vsan" },
    { "operation": "sddc-core" },
    { "operation": "subscriptions" },
    { "operation": "provisioning"}
  ],
  "customized_classes": [
    { "class": "NgwMessage", "service": "app-alerts"},
    { "class": "DelegatedAccessSshResponse", "service": "delegated-access" },
    { "class": "DelegatedAccessVCenterUserResponseInfo", "service": "delegated-access" }
  ]
}
```

The following is the detailed description of the properties in this configuration file:

| Property | Description |
| --- | --- |
| customized_operations | This property specifies an array of autogenerated operations which the developer can customize or extend. |
| operation | In one embodiment, each element of the array described using customized_operations appears here. Note: in one embodiment, the name of the operation and the name of the Service Adapter that corresponds to this operation are identical. |
| customized_classes | This property specifies an array of autogenerated classes and the Service Adapter that owns it, which the developer can customize or extend. |
| class | The class sub-property in each element of customized_classes specifies the name of the autogenerated class which the application developer can customize or extend. |
| service | The service sub-property in each element of customized_classes specifies the name of the aService Adapter which owns the class specified by the class property above. |

Autogenerating Models

In one embodiment, Modelgen 232 uses the service adapter interface documents 223 generated by Servgen 220 in order to create models that are described in each of those documents. In one embodiment, these models are created in the sub-folder for each service adapter under the parent folder specified by the --outdir option. The following is an example embodiment of the AuthToken model autogenerated for the token Service Adapter:

```
export class AuthToken {
  // Treat this model as immutable except when passing as a parameter
  to an API call.
  public id_token?: string;
  public auth_token?: string;
  constructor (json?: any) {
    if (json) {
      Object.assign(this, json);
    }
  }
  public get isValid( ): boolean {
    const isValidProperty = (prop: any, propName: string): boolean => {
      if (prop === undefined) {
      }
      return prop ! == undefined;
    };
    return (
      isValidProperty(this.id_token, 'id_token') &&
      isValidProperty(this.auth_token, 'auth_token') &&
      true
    );
  }
}
```

In the above example, class AuthToken the constructor allows for a JSON object to be passed as an argument to new( ) to populate the properties for the model. Additionally, in one embodiment, an isValid( ) method is autogenerated for the autogenerated AuthToken to check if all the required properties are present in the class. In one embodiment, this is useful for testing mocked objects.

Customizing Models

As with Servgen, in one embodiment, an application developer can extend an autogenerated model for languages that support inheritance. In one embodiment, by default, models are not customizable and any modifications made to a model is overwritten by the next run of Modelgen 232.

In one embodiment, in order to allow a model to be customizable and not overwritten on subsequent autogeneration, an entry is used in customized.json in the models sub-folder in the folder specified to the --config-dir option. In the example above for models, the model for the class NgwMessage for the Service Adapter app-alerts has been specified as customizable by inserting the following in the customized_classes array:

```
"customized_classes": [
    { "class": "NgwMessage", "service": "app-alerts"}
]
```

In one embodiment, the above provided code is sufficient to change the autogeneration behavior of Modelgen in the following way: A new sub-folder called auto is created; The original autogenerated model for NgwMessage is created as AutoNgwMessage in the auto sub-folder; A customizable model NgwMessage is created in the app-alerts main folder and it inherits from AutoNgwMessage; and Except for a protected region in the customizable model, the developer can augment the model as necessary.

Below is an example of one embodiment of the customizable file, ngw-message.model.ts that is autogenerated for NgwMessage. Note the import of the autogenerated parent class at the top:

```
import { AutoNgwMessage } from './auto/auto.ngw-message.model';
// Customizable Class derived from AutoNgwMessage.model - defined
in AppAlertsService
export class NgwMessage extends AutoNgwMessage {
    // Declare any custom properties here. Preferably use getters/setters
    instead of properties.
    public viewType: string;
// BEGIN NO-CHANGE BLOCK ********** DO NOT CHANGE
ANYTHING IN BELOW BLOCK **********
    public constructor(json?: any) {
        super( );
        if (json) {
            Object.assign(this, json);
        }
        this.initProperties( );
    }
    private initProperties( ) {
// END NO-CHANGE BLOCK ********** DO NOT CHANGE
ANYTHING IN ABOVE BLOCK **********
        if (this.type && this.type.indexOf('::') !== -1) {
            const t = this.type.split('::');
            this.type = t[0];
            this.viewType = t[1];
```

}
}
}

In the above example, the method initProperties( ) is the constructor hook that allows for the initialization of any custom properties or code that the developer requires. Performing new( ) on the NgwMessage class results in the invocation of initProperties.

In one embodiment, once a model is customized, it will not be overwritten by subsequent autogeneration by Modelgen 232, however, the parent class, AutoNgwMessage, will continue to be rewritten with each autogeneration, perhaps even changing as the API contract changes, oblivious to the application, unless a breaking change is encountered. In one embodiment, since the customized model can no longer be overwritten in its entirety, special regions in the file are reserved for use by Modelgen 232. These regions are demarcated by II BEGIN NO-CHANGE BLOCK and II END NO-CHANGE BLOCK markers, and no modifications should be done within these markers, as the content could be overwritten by future versions of Modelgen, should the implementation require it. In one embodiment, new properties can be added to NgwMessage above the beginning of the no-change block, and custom code can be added below the no-change block. In the above example, a new property, viewType has been added to NgwMessage, and initProperties( ) populates it below the no-change block.

Autogenerating Operations

In one embodiment, Modelgen 232 uses the service adapter interface documents generated by Servgen 220 in order to create operations that are described in each of those documents in order to perform service requests to the respective Service Adapters by providing a procedural interface to the application and hiding the target and transport to perform them. In one embodiment, these models are created in the sub-folder for each Service Adapter under the parent folder specified by the --outdir option described herein.

The following in an example embodiment of the autogenerated operations for the token Service Adapter in VMCUI:

```
// @dynamic
export class TokenOperations extends AbstractOperations {
    protected static _instance: TokenOperations | null;
    public static destroy( ): void {
        this._instance = null;
    }
    public static getInstance( ): TokenOperations {
        return this._instance || (this._instance = new TokenOperations( ));
    }
    private constructor( ) {
        super('TokenOperations');
    }
    public getServiceVersion(successHandler: MessageFunction<ServiceVersion>,
                errorHandler: MessageFunction<GeneralError>): void {
        const requestObject = new TokenGetServiceVersionRequestObject
(TokenChannel.request);
        if (this.fabric.isXsrfTokenEnabled( )) {
            requestObject.headers = {
                ...requestObject.headers,
                [this.fabric.getXsrfTokenStoreKey( )]: this.fabric.getXsrfToken( )
            };
        }
        this.callService(requestObject.channel, requestObject, successHandler,
errorHandler);
    }
    public getToken(successHandler: MessageFunction<AuthToken>,
                errorHandler: MessageFunction<GeneralError>): void {
        const requestObject = new TokenGetTokenRequestObject
(TokenChannel.request);
        if (this.fabric.isXsrfTokenEnabled( )) {
```

-continued

```
        requestObject.headers = {
            ...requestObject.headers,
            [this.fabric.getXsrfTokenStoreKey( )]: this.fabric.getXsrfToken( )
    };
        }
        this.callService(requestObject.channel, requestObject, successHandler,
errorHandler);
    }
}
```

As is apparent in the above example, in one embodiment, Modelgen 232 creates a singleton class called TokenOperations, which implements all the methods necessary to make service requests to the token Service Adapter and return the response to the caller. In the example, the token Service Adapter only supports 2 requests: getToken and getServiceVersion, the latter request is available for all Service Adapters.

In one embodiment, in order to use the autogenerated operations, a reference to the operations class instance should be obtained by invoking the static method getInstance( ). In languages other than Typescript (e.g. Go), a pointer rather than a reference to the instance of TokenOperations is returned. In one embodiment, for application components generated by Appgen 236, the parent class for the component will already have done this, and will be contained in this.tokenOperations inherited from the parent. Subsequently, this reference or pointer will be used to invoke the operations.

In one embodiment, since the operations are asynchronous, when invoking them, the caller should provide a success handler and an error handler as arguments to the operation, and these lambda functions will be invoked on return from the service request with successful completion, or failure, respectively. In one embodiment, both the parameters provided as well as the response from the operation are typed to minimize specification errors.

The following is an example of invoking the token operations:

```
/**
 *Auth service required by and provided to the Dimension module.
 */
```

-continued

```
@Injectable( )
export class DimensionAuthService implements IAuthService {
    protected readonly tokenOperations = TokenOperations.getInstance( );
    getLatestToken( ): Promise<AuthToken> {
        return new Promise((resolve, reject) => {
            const successHandler = token => {
                resolve(token);
            };
            const failureHandler = error => {
                reject(error);
            };
            this.tokenOperations.getToken(successHandler, failureHandler);
        });
    }
}
```

Note how a reference to the singleton TokenOperations is obtained by calling the getInstance( ) method, and the specification of successHandler and failureHandler in the above example, followed by the invocation of the getToken( ) operation and the handling of the responses and errors.

In one embodiment, in addition to performing operations, if a Service Adapter owns a bifröst store, Modelgen 232 provides the capability to subscribe to events that notify changes to the state of the store(s). Below is an example of store events that are autogenerated for the reservation Service Adapter in VMCUI. The first few are store operations, while the ones that return the Subscription type, are subscriptions to state-change events in the store which can be subscribed to with notification handlers to provide asynchronous reaction to store events. Note: in one embodiment, the subscriptions should be persisted so that they are not garbage-collected, resulting in a null reference.

```
/** Get access to the store instance */
public getReservationStore( ): BusStore<Array<ReservationWindow>> {
    return BusUtil.getBusInstance( ).stores.getStore<Array<ReservationWindow>>
(ReservationStores. ReservationStore);
}
/** Abstraction for updating the store */
public putReservationStore(uuid: string, value: Array<ReservationWindow>) {
    this.getReservationStore( ).put(uuid, value, ReservationWindowStateChange.
Updated);
}
/** Abstraction for fetching from the store */
public getFromReservationStore(uuid: string): Array<ReservationWindow> {
    return this.getReservationStore( ).get(uuid);
}
/** Abstraction for fetching all elements from the store */
public getAllFromReservationStore( ): Array<Array<ReservationWindow>> {
    return this.getReservationStore( ).allValues( );
}
/** Abstraction for deleting an element from the store */
public deleteFromReservationStore(uuid: string) {
    this.getReservationStore( ).remove(uuid, ReservationWindowStateChange.
Deleted);
}
/** When the store is ready, handler will be executed and passed store contents */
```

-continued

```
public whenReservationStoreReady(readyHandler: MessageFunction<Map<UUID,
Array<ReservationWindow>>>): void {
  this.getReservationStore( ).whenReady(
    (map: Map<UUID, Array<ReservationWindow>>) => {
      readyHandler(map);
    });
}
/** When a new item in the store added, the handler will be executed and passed the
new model */
public whenReservationStoreValueAdded(addedHandler:
MessageFunction<Array<ReservationWindow>>): Subscription {
  return this.getReservationStore( ).onAllChanges(ReservationWindowStateChange.
Created)
    .subscribe((added: Array<ReservationWindow>) => {addedHandler(added);});
}
/** When an item in the store is updated, the handler will be executed and passed an
updated model */
public whenReservationStoreValueUpdated(updatedHandler:
MessageFunction<Array<ReservationWindow>>): Subscription {
    return this.getReservationStore( ).onAllChanges(ReservationWindowState
Change.Updated)
      .subscribe((updated: Array<ReservationWindow>) => {
updatedHandler(updated); });
}
/** When item in the store is deleted, the handler will be executed and passed the
deleted model */
public whenReservationStoreValueDeleted(deletedHandler:
MessageFunction<Array<ReservationWindow>>): Subscription {
  return this.getReservationStore( ).onAllChanges(ReservationWindow
StateChange.Deleted)
    .subscribe((deleted: Array<ReservationWindow>) => { deletedHandler(deleted);
});
}
/** Listen for any change to the specified store element */
public whenReservationStoreReservationWindowStateChange(uuid: string,
changeHandler: MessageFunction<Array<ReservationWindow>>, changeType?:
ReservationWindowStateChange): StoreStream<Array<ReservationWindow>> {
  let stream: StoreStream<Array<ReservationWindow>>;
  if (changeType == null) {
    stream = this.getReservationStore( ).onChange(uuid);
  } else {
    stream = this.getReservationStore( ).onChange(uuid, changeType);
  }
  stream.subscribe((reservationWindow: Array<ReservationWindow>) => {
changeHandler(reservationWindow); });
  return stream;
}
/** Listen for any specified change to the store */
public whenReservationStoreStateChanges(changeHandler:
MessageFunction<Array<ReservationWindow>>, ...
stateChangeType: ReservationWindowStateChange[ ]):
StoreStream<Array<ReservationWindow>> {
  let changes = [ ];
  changes = changes.concat(stateChangeType);
  const stream: StoreStream<Array<ReservationWindow>> =
this.getReservationStore( ).onAllChanges.apply(this.getReservationStore( ), changes);
  stream.subscribe((reservationWindow: Array<ReservationWindow>) => {
changeHandler(reservationWindow); });
  return stream;
}
```

Broadcast Listeners

In one embodiment, in addition to handling events from state changes in the bifröst store, Modelgen 232 also generates listeners for broadcasts from service adapters. The following is an example of a listener in SddcCoreOperations which listens for broadcasts on SddcCoreChannel.broadcast:

```
public listen(changeHandler: SddcCoreChangeFunction<Sddc>): MessageHandler {
  const handler = this.bus.listenStream(SddcCoreChannel.broadcast);
  handler.handle(
    (notification: SddcCoreChangeNotification) => {
      if (changeHandler) {
        changeHandler(notification.notification, notification.notificationType);
```

```
    }
  },
  (err: GeneralError) => {
     this.log.error('Failure in SddcCoreOperations.listen( ) - ' + err.message);
  }
);
return handler;
}
```

Customizing Operations

In one embodiment, as with customizing service adapters using Servgen, an application developer can extend auto-generated operations for languages that support inheritance. In one embodiment, by default, operations are not customizable and any modifications made to the operations is overwritten by the next run of Modelgen. In order to allow operations to be customizable and not overwritten on subsequent autogeneration, an entry can be required in customized.json in the models sub-folder in the folder specified to the --config-dir option. In the example above for models, the operations for the sddc-core operations have been specified as customizable by inserting the following in the customized_operations array:

```
"customized_operations": [
    { "operation": "sddc-core" }
],
```

In one embodiment, just doing the above is sufficient to change the autogeneration behavior of Modelgen 232 in the following way: A new sub-folder called auto is created if it doesn't already exists; The original autogenerated operations for SddcCoreOperations is created as AutoSddcCoreOperations in the auto sub-folder; A customizable operations file for SddcCoreOperations is created in the sddc-core main folder and it inherits from AutoSddcCoreOperations; Except for a protected region in the customizable operations file, the developer can augment the operations as necessary.

In one embodiment, sddc-core.operations.ts is the customizable file that is autogenerated for SddcCoreOperations. Note the import of the autogenerated parent class at the top:

```
// SddcCore Service API - Customizable methods derived from
AutoSddcCoreOperations
export class SddcCoreOperations extends AutoSddcCoreOperations {
// BEGIN NO-CHANGE BLOCK ********** DO NOT CHANGE
ANYTHING IN BELOW BLOCK **********
    private static _instance: SddcCoreOperations | null;
    public static destroy( ): void {
       this._instance = null;
    }
    public static getInstance( ): SddcCoreOperations {
       return this._instance || (this._instance = new SddcCoreOperations( ));
    }
    private constructor( ) {
       super( );
    }
// END NO-CHANGE BLOCK ********** DO NOT CHANGE
ANYTHING IN ABOVE BLOCK **********
/**
    *Get total count of hosts in an org. Ignores ZEROCLOUD hosts.
    * @param {string}orgId org ID you want to retrieve count of hosts
from
    * @returns {Observable<number>}observable that will contain the
number of hosts
    */
    public getTotalOrgHosts(orgId: string): number {
```

```
       let sddcs = this.getAllSddcsByOrg(orgId);
       let result = sddcs.reduce((acc, sddc) => {
          if (!sddc.isDeleting && !sddc.isFailed && sddc. provider !==
SddcProvider.ZeroCloud && sddc.numHosts) {
             return acc + sddc.numHosts;
          } else {
             return acc;
          }
       }, 0);
       return result;
    }
    public getAllSddcsByOrg(orgId: string): Array<Sddc> {
       return this.getAllFromSddcStore( ).filter(
          (sddc: Sddc) => {
             return sddc.org_id === orgId;
          }
       );
    }
// Add your custom operations below this line
// NOTE: Operations should be stateless as they are shared.
}
```

In the above example code, two new operations have been added to SddcCoreOperations: getTotalOrgHosts( ) and getAllSddcsByOrg( ) while the existing operations have been preserved. In one embodiment, because of the availability of inheritance in Typescript, any existing autogenerated operation could have been overridden here as well.

In one embodiment, customized operations will not be overwritten by subsequent autogeneration by Modelgen 232, however, the parent class, AutoSddcCoreOperations, will continue to be rewritten with each autogeneration, perhaps even changing as the API contract changes, oblivious to the application, unless a breaking change is encountered. In one embodiment, since the customized operations can no longer be overwritten in its entirety, special regions in the file are reserved for use by Modelgen 232. In one embodiment, these regions are demarcated by //BEGIN NO-CHANGE BLOCK and //END NO-CHANGE BLOCK markers, and no modifications should be done within these markers, as the content could be overwritten by future versions of Modelgen 232, should the implementation require it.

Using Modelgen

The following is a detailed description of how to invoke Modelgen 232:

Usage: modelgen [-dDFhlmnNrRtvVw] [-b ${HOME}/ui]

[-c "~/ui/src/config"] [-i value]

[-l typescript | go] [-o ~/go/src]

[-y "-api-doc.yaml"] [parameters . . . ]

| Option | Description |
| --- | --- |
| -b <path> \| --root=<path> | This option declares the absolute path to the root of the Project directory. All subsequent location specifications are relative to this root path. If this option is skipped, Modelgen defaults to ${HOME}/ui for historical reasons. Path specifications may include the "~" (tilde) character which will be replaced by the HOME folder of the invoking user, or "~<user>", which will be replaced by the HOME folder of the specified <user>. |
| -c <path> \| --configdir=<path> | This option specifies the path to the directory where the Application Configuration Documents reside. This is an absolute (not relative) path to the folder. |
| -d \| --debug | Used by Modelgen developers to emit debug output. |
| -D \| --detectduplicates | Sometimes several Service Adapters will express ownership of a class (e.g., Sddc), because the developer failed to use imports declarators in their Service Adapter Specification Documents, resulting in that class being instantiated multiple times among different Service Adapters, instead of a unique Service Adapter asserting ownership with the exports declarator, and other Service Adapters referring to that one instance, as is the architectural intent. With this option, Modelgen will detect the occurrence of these duplicated classes and print out the offending Service Adapters and the classes they duplicate. These are only warnings, and execution will continue uninterrupted. |
| -F \| --force | This option is used to specify that even customized operations and models will be overwritten on execution. Use with caution. |
| -h \| --help | Displays all the options recognized by Modelgen. |
| -i <path> \| --interface-dir=<path> | This option specifies the path to the directory where the Service Adapter Interface Documents from Servgen reside, relative to the project root. |
| -l "typescript" \| --language="typescript" | This option is used to specify the language plugin to be used for the output from Modelgen. |
| -N \| -nomaps | When the Service Adapter is implemented using Typescript, both Apigen and Servgen will convert inbound additionalProperties in the API Specification document into an E56 Map class, and convert them back to a JSON dictionary on outbound requests. Thus, the Application Layer code only needs to deal with an E56 Map, independent of the underlying data structure. When the application makes a service request, the E56 Map is converted back to a JSON dictionary by Apigen before making the API request to the backend service. This does not apply to implementations in Java and Go. There are cases where the application may not wish to deal with E56 Map classes, and the original JSON dictionary is desired. By specifying --no-maps Modelgen does the opposite of Apigen, by converting inbound classes containing properties of type E56 Map from a Service Adapter to JSON dictionary inbound, and back to an E56 Map outbound. |
| -n \| no-customization | Disable model customization. This is for languages like go, which do not support inheritance, which is essential for creating derived customizable models by Modelgen. |
| -o <output folder> \| outdir=<output folder> | This specifies the path to the root of the output folder within which sub-folders for each Service Adapter will be autogenerated to contain their models and operations. |
| -R \| --rest | Normally, Modelgen generates operations which call the bifröst event bus in order to send service requests to a Service Adapter. The use of --rest specifies that Modelgen should instead generate HTTP requests to the backend service, bypassing the Service Adapter. This feature is used for supporting Cligen - CLI Application Generator. |
| -r \| --recover | Used by Modelgen developers to continue processing even when a fatal error is encountered. |
| -t \| --trace | Used by Modelgen developers to emit trace level output. |
| -V \| --version | Displays Modelgen version. |
| -v \| --verbose | Used by Modelgen developers to emit verbose level output. |
| -w \| --nowarnings | This option suppresses warning messages from Modelgen (not recommended, except while debugging, and/or overwhelmed by a stream of warnings). |

Example Use

VMC-UI using Typescript modlegen -b ~/ui -c ~/ui/src/config -i src/services/interfaces -o ~/ui/src/models AppFabric sample (vm) using golang for use by Cligen: modelgen --no-customization --language=go --configdir=~/vm/ui/src/config -b ~/vm/ui -o ~/go/src/go_models_vm -i src/services/interfaces Appgen 236

In one embodiment, Appgen 236 is a GUI Application generator. In one embodiment, Appgen 236, in conjunction with an application specification document 235, and the models and operations generated by Modelgen 232 (e.g., models and operations 233 and/or 234), produces a GUI application 237 that is "almost" ready to run, e.g., only needing the addition of a small amount of rendering code to complete it.

In one embodiment, the role of Appgen 236 is to combine the application specification document 235 used to configure a new application, with the models and operations output by Modelgen to instantiate an executable GUI application, with stubs for rendering in supported UI frameworks, such as Angular and React. This component is also the 5th stage of the Intent Compiler's pipeline.

Specifications and Languages

In one embodiment, Appgen 236 instantiates application components and abstractions that provide autogenerated bindings to Modelgen's models and operations, and modifies the various framework files to provide an execute-ready application. In one embodiment, Appgen 236 adds hooks to the generated applications to trivially invoke all service adapters that it needs, as well as hooks to quickly render response models. In one embodiment, Appgen 236 outputs applications using Typescript and Angular, however, because of the plugin architecture employed by all intent compiler 100 components, additional languages and frameworks can be supported with relative ease.

Specification Files

In one embodiment, Appgen 236 relies on a set of specification documents that serve as configuration for auto-generating GUI applications. These consist of an application specification document 235, and a collection of component specification document(s). Both these sets of specification documents reside in their own sub-folders in the configuration folder specified using the --config-dir option.

Application Specification Document

In one embodiment, the application specification document 235 contains metadata for a GUI application. These specifications are for the language used to compile an application and the framework employed by it. This file is named app.json and resides in the app sub-folder in the configuration folder specified via the --config-dir option to Appgen described further down in this document. app.json has the following JSON format:

```
{
    "name": "vmc-ui",
    "framework": "angular",
    "version": "8",
    "language": "typescript"
}
```

The above specifications apply to VMC-UI. The table below is a description of the properties that comprise it:

| Property | Description |
| --- | --- |
| name | This is the name for the application. |
| framework | This specifies the framework used by the application. |
| version | The version of the framework. |
| language | The language to be used for compiling the application. |

Component Specification Document

In one embodiment, there is a component specification document for each autogenerated framework component (e.g. Angular component) in the application in the sub-folder components in the configuration folder specified via the --config-dir option to Appgen 236. In one embodiment, each framework component is described in its respective component specification document. By convention, the file name for each framework component is a lower kebab-case string in conformance with Angular naming conventions. In one embodiment, the Angular naming conventions may change when different components such as React components (or the like) are implemented. The following is an example of the component specification document for Sddc-DetailComponent used in VMC-UI, which is stored in sddc-detail.json:

```
{
    "component": "sddc-detail",
    "location": "src/components",
    "services": [
        {"service": "sddc-core" },
        {"service": "reservation" },
        {"service": "provisioning" }
    ],
    "css": false
}
```

The details of the properties for this specification document are described in the table below:

| Property | Description |
| --- | --- |
| component | This is the name of the component in lower kebab case. So sddc-detail becomes SddcDetailComponent. |
| location | This is the location of the parent folder, relative to the project root, where the sub-folder for this component will be created. |
| services | The services property is an array of the Service Adapters used by this component. |
| service | Each element of the services array declares the lower kebab-case name of aService Adapter. |
| css | This property is a boolean for whether a scss is created for the component. The default is true. |
| html | This property is a boolean for whether a html is created for the component. The default is true. |
| test_stub | This property is a boolean for whether a unit test stub is created for the component. The default is true. |

Appgen Autogeneration Steps

In one embodiment, Appgen 236 performs the following operations on launch:

1. Reads the Application Specifications document from app.json in config-dir/app.
2. Reads all the Service Adapter Interface Specification document(s) in order to create references to operations used by each application component.
3. Reads all the Component Specification document(s) in config-dir/components in order to create new application components unless they already exist.
4. For application components that only access a single Service Adapter, creates a shared parent class that can be inherited by this and other application components in order to instantiate the operations class for this Service Adapter, in the abstractions sub-folder under components-dir.
5. For application components that access multiple Service Adapters, a combined abstract parent class is created in each of the application components' respective folders with references to instantiated operations classes for all the Service Adapters used by each application component.
6. Creates a css stub for each new application component unless css: false is specified in the Component Specification document for the respective application component.
7. Creates an html stub for each new application component unless html: false is specified in the Component Specification document for the respective application component.
8. Creates a unit test stub for each new application component unless test_stub: false is specified in the Component Specification document for the respective application component.
9. Creates each application component which inherits from either a shred abstract class or one specific to the respective application component.
10. Modifies .gitignore to ignore autogenerated files when committing to git.

11. Modifies app.modules.ts to add each newly created application component.
12. Creates app.component.scss if it doesn't already exist.
13. Creates app.component.html if it doesn't already exist.
14. Creates app.component.ts stub if it doesn't already exist.
15. Once these are done, the GUIapplication is ready to be compiled and run.

Using Appgen

The following is a detailed description of how to invoke Appgen.

appgen2 [-ACdFHhnrtvVw] [-a "@vmc"] [-b ${HOME}/ui] \
[-c "${PWD}/src/config"] [-i value] [-l typescript | java] \
[-O "src/components/abstractions"]
-O src/components/abstractions \
--alias=@vmw/appfabric-sample Cligen 238

Figure 5:
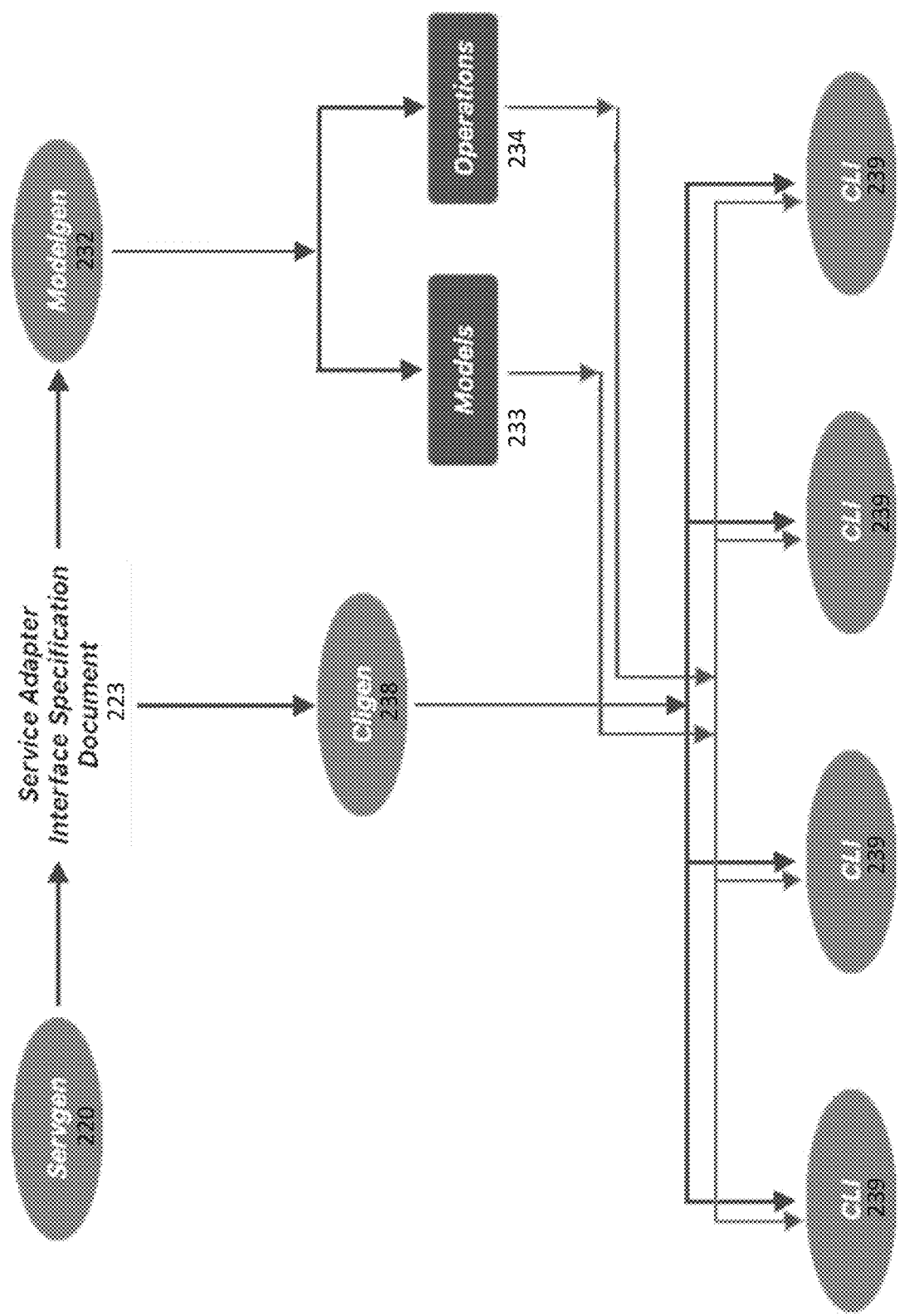
FIG. 5 depicts a flow diagram of an architecture of a CLI application generator, in accordance with an embodiment.

Referring now to FIG. 5, a flow diagram of an architecture for Cligen 238 is shown in accordance with an embodiment. Cligen 238 is a CLI application generator. In one embodiment, Cligen 238 uses the service adapter interface document(s) 223 output by the Servgen 220 and the operations and models generated by Modelgen 232 (e.g., models and operations 233 and/or 234) to create a CLI application 239 for each service adapter, that is ready to run immediately, providing command line access to all requests and responses advertised from the service adapter 107 layer.

While a large part of intent compiler 100 is there to support the autogeneration of GUI applications 237, the same framework and patterns allow for the creation of CLI

| Option | Description |
| --- | --- |
| -A, \| --app-modules | Typescript/Angular only. Updates app.modules.ts with the new component(s). |
| -a, \| --alias="@vmc" | Typescript only. Specifies a shortcut alias to be used for imports. Ignored in other frameworks. |
| -b <path> \| --root=<path > | This option declares the absolute path to the root of the Project directory. Most subsequent location specifications are relative to this root path. If this option is skipped, Appgen defaults to ${HOME}/ui for historical reasons. Path specifications may include the "~" (tilde) character which will be replaced by the HOME folder of the invoking user, or "~<user>", which will be replaced by the HOME folder of the specified <user>. |
| -C \| --app-component | Typescript/Angular only. Autogeneration of app/app.component.ts for the component with auto-instantiation of references to operations for all used services and inheritance chains. If the file already exists, -F \| --force will be required to overwrite it. |
| -c <path>\| --config-dir=<path> | This option specifies the path to the directory where the Application Configuration Documents reside. This is an absolute (not relative) path to the folder. |
| -d \| --debug | Used by Appgen developers to emit debug output. |
| -F \| --force | This option is used to specify that even customized files will be overwritten on execution. Use with caution. This is mainly for use by developers. |
| -H \| --app-html | Typescript/Angular only. Autogeneration of app.component.html for the component with its selector. If the file already exists, -F \| --force will be required to overwrite it. |
| -h \| --help | Displays all the options recognized by Appgen. |
| -i <dir> \| --interface-dir=<dir> | Directory for autogenerated service interface YAMLs relative to servicedir. |
| -l "typescript" \| --language="typescript" | This option is used to specify the language plugin to be used for the output from Appgen. |
| -n \| --not-vmc | All projects other than VMC-ui should use this flag to prevent the inclusion of TestUtil and UserUtil in autogenerated tests for components. |
| -o "src/components /abstractions" \| --components-dir="src /components /abstractions" | This specifies the path to the root of the output folder where abstract parents for application components that only use a single service reside. When a component uses more than one service, a combined services abstract parent is autogenerated in the component's folder. |
| -r \| --recover | Used by Appgen developers to continue processing even when a fatal error is encountered. |
| -s \| --symlink | Create a symlink between the configuration file for a component in config-dir/components in the component's folder, as well as updating .gitignore. |
| -t \| --trace | Used by Appgen developers to emit trace level output. |
| -V \| --version | Displays Appgen version. |
| -v \| --verbose | Used by Appgen developers to emit verbose level output. |
| -w \| --no-warnings | This option suppresses warning from Appgen (not recommended, except while debugging, and/or overwhelmed by a stream of warnings). |

Example Use
  VMC UI
appgen2 --alias=@vmc --config-dir=~/ui/src/config \
-b ~/ui src/services/interfaces -O src/components/abstractions
  AppFabric Sample
appgen2       --config-dir=~/go/src/appfabinit/app-fabric-sample/ui/src/config \
-b ~/go/src/appfabinit/app-fabric-sample/ui \
~/go/src/appfabinit/app-fabric-sample/ui/src/services/interfaces \ applications 239. It should be noted that, in one embodiment, while GUI applications 237 are the most appropriate form of interaction for most customers, for most iT administrators, the interaction is via scripts that perform a series of operations across their managed systems in a repetitive fashion. In one embodiment, this environment is appropriate for creating CLI applications 239 which are capable of invoking the same requests to a service adapter as a GUI application would.

Moreover, in one embodiment, by using the same building blocks of models 233 and operations 234, it is possible to create CLI applications 239, one for each service adapter, that can themselves be embedded in a bash or PowerShell script to provide access to all service requests advertised by that service adapter. In one embodiment, this allows the construction of a large number of scripts that do not need to be modified when the underlying API interfaces change, as the CLI applications 239 can be autogenerated each time and will automatically issue the correct requests and display the appropriate responses.

In one embodiment, autogenerating a CLI is a multi-step process, that depends on the execution of multiple intent compiler 100 components to build/rebuild each CLI application, each of which has a direct correspondence to an autogenerated service adapter. While the system is an Intent Compiler 100, the output from Cligen 238 is source code, which needs to be compiled with a traditional compiler in order to generate the CLI executables—just as the GUI application needs to be compiled using typescript after the intent compiler 100 components have generated typescript source code (or Java or Go).

In one embodiment, the following steps should be undergone before an autogenerated CLI is ready for use:

1. In one embodiment, Apigen 213 will process all the available Api Specification document(s) 211 to autogenerate language bindings for all APIs.

2. In one embodiment, Servgen 220 will process these same Api Specification document(s) 211, along with Service Adapter Specification document(s) 227 in order to autogenerate service adapters.

3. In one embodiment, once the service adapter(s) have been autogenerated, Servgen 220 also autogenerates service adapter interface specification document(s) 223, and in one embodiment, one for each service adapter.

4. In one embodiment, Modelgen 232 processes the service adapter interface specification document(s) 223, and autogenerates models 233 and operations 234 for each service adapter, in typescript for binding with GUI applications 237, and also in go for CLI applications.

5. In one embodiment, Cligen 238 processes the service adapter interface specification document(s) 223, and for each Service Adapter it generates a CLI application 239 that can explore as well as execute each service request (including custom service requests, unless --rest is specified to Modelgen 232, which results in requests going directly to the backend service, bypassing the iService Adapter).

6. In one embodiment, Each CLI application operates independently to invoke its corresponding service adapter and automatically adjusts for changes underlying APIs.

Autogeneration Steps

In general, Cligen 238 is a "glue", in that it creates a CLI for each service adapter, each of which is bound to the operations 234 and models 233 generated by Modelgen 232. In one embodiment, the CLI applications 239 invoke the operations with no knowledge of how the requests are transported to a service adapter and the bulk of the hard work is done by Modelgen 232, to format the requests and parameters and ship them off to the service adapter with the chosen transport (e.g., bifröst messages to the service adapter 107, HTTP requests to the backend service 202, or the like).

In one embodiment, once the normal autogeneration for GUI applications 237 has completed, resulting in the generation of all the service adapter interface specification document(s) 223 having been completed, the steps to begin the autogeneration of the CLI applications 239 begin. In one embodiment, Modelgen 232 has to be rerun to build go models 233 and operations 234 with the required options for generating either bifröst message-based operations to the service adapters, HTTP/REST requests directly to the backend services 202, bypassing the service adapters, or the like.

Generating Bifröst Message Operations

In one embodiment, by default and/or in the absence of a contrary option, Modelgen 232 generates operations that rely on the bifröst event bus 103 in order to communicate with each service adapter to satisfy the service requests from CLI applications 239. In one embodiment, the following code will generate models 233 and operations 234 using go with the service adapter interface specification document(s) 223 autogenerated for VMC-UI:

modelgen --no-customization --language=go --config-dir=~/ui/src/config -b ~/ui -o ~/go/src/go_models_vmc -i src/services/interfaces Note the specification of --no-customization option to Modelgen 232 above. This is necessary for go, which may not support inheritance—a capability that is one method used by intent compiler 100 for customizing autogenerated models 233 and operations 234.

Generating HTTP Operations

In one embodiment, in order for autogenerated operations to use HTTP/REST requests instead of bifröst event bus 103 messages, the—rest option is specified to Modelgen 232:

modelgen --rest --no-customization --language=go --config-dir=~/ui/src/config -b ~/ui -o ~/go/src/go_models_vmc -i src/services/interfaces In one embodiment, when using HTTP/REST operations, the corresponding service adapter is bypassed and the request is directly handled by the corresponding backend service 202. This means that, in one embodiment, custom service requests implemented in the service adapter, as described previously, are no longer available, and neither are class customizations from the Service Adapter described in previous sections, accessible to the CLI application.

Generating CLI Applications

In one embodiment, to generate all the autogenerated CLI applications 239, Cligen 238 is invoked by specifying the location of the service adapter interface specification document(s) 223 as well as the location of the directory where Modelgen 232 has placed the operations 234 and models 233, as well as the location of the directory where the CLI applications 239 are to be stored:

cligen -o ~/go/src/cli -i ~/vm/ui/src/services/interfaces -m go_models_vm

In one embodiment, Cligen 238 creates the source code for each CLI application 239. In one embodiment, the final step requires compiling the source code using go build. Subsequently, the CLI applications 239 are ready for use.

Using Cligen

The following is a detailed description of how to invoke Cligen 238:

| Option | Description |
| --- | --- |
| -d \| --debug | Used by Cligen developers to emit debug output. |
| -F \| --force | This option is used to specify that even customized files will be overwritten on execution. Use with caution. This is mainly for use by sewing-machine developers. |

| Option | Description |
| --- | --- |
| -h \| --help | Displays all the options recognized by Cligen. |
| -i <path> \| --interface-dir=<path> | This option specifies the path to the directory where the Service Adapter Interface Specification document(s) from Servgen reside. |
| -l "" \| --language="" "go go | This option is used to specify the language plugin to be used for the output from Cligen. |
| -m "dir" \| --models-dir="dir" | Directory for autogenerated operations and models created by Modelgen. |
| -o "~/go/src/cli" \| --outdir="~/go/src/cli" | This specifies where the output cli executables will be stored on completion of Cligen. |
| -r \| --recover | Used by Cligen developers to continue processing even when a fatal error is encountered. |
| -t \| --trace | Used by Cligen developers to emit trace level output. |
| -V \| --version | Displays Cligen version. |
| -v \| --verbose | Used by Cligen developers to emit verbose level output. |
| -w \| --no-warnings | This option suppresses warning from Cligen (not recommended, except while debugging, and/or overwhelmed by a stream of warnings). |
| -y "-api-doc.yaml" \| --yaml-suffix="-api-doc.yaml" | By convention, all API Specification documents are expected to have -api-doc.yaml as the suffix for the filename that contains them. This option allows for a different name pattern to be sought by Cligen. |

CLI Applications

In one embodiment, CLI applications 239 generated by Cligen 238 follow similar (and/or identical) patterns and honor similar (and/or identical) command line options. For example, in one embodiment, the following options are common to all CLI applications 239:

| Option | Description |
| --- | --- |
| -d \| --debug | Used by Cligen developers to emit debug output. |
| -h \| --help | Displays all the options recognized by the CLI application. |
| -I \| --list-requests | Display all the service requests that are recognized by the corresponding Service Adapter. |
| -s \| --show-class=value | Display a class and all its properties that is owned by the corresponding Service Adapter. |
| -t \| --trace | Used by Cligen developers to emit trace level output. |
| -V \| --version | Displays the version of the CLI application. Since the CLI application is autogenerated, this version will be identical to the version of Cligen that was used to autogenerate it, which is necessary for recreating it. |
| -v \| --verbose | Used by Cligen developers to emit verbose level output. |

As an example, consider the CLI applications 239 autogenerated for the vm service adapter by Cligen. In order to list the service requests that can be entertained by that service adapter, the application is launched with the --list-requests option:

./vm --list-requests

In one embodiment, this results in the following output:
vm GetServiceVersion
vm PostVmChangeVmPowerState {vmPowerOperationRequest: Vm PowerOperationRequest}
vm PostVmCreateVm {vmCreateRequest: VmCreateRequest}
vm PostVmDeleteVm {vmDeleteRequest: VmDeleteRequest}
vm GetVmGetVmsByHost
vm GetVmListVms In the above code, the vm CLI application recognizes 6 different service requests and the parameters that need to be supplied to each one respectively. In one embodiment, all service adapters recognize the GetServiceVersion request. This request has no input parameters and can be simply invoked as follows:

./vm GetServiceVersion

In one embodiment, the output from the CLI application is a prettified JSON as shown below:

```
{
  "name": "com.vmware.appfabric.vm.autogen.services.Vm.VmService",
  "version": "1"
}
```

The above code is a unique identifier for the vm service adapter and its version. In one embodiment, multiple versions of a service adapter can simultaneously exist, and the one that will respond to a service request is the one that matches the version declarator for it.

Exploring Classes

In the above results from ./vm --list-requests, note that some of the requests require parameters, which are classes. In order to understand the composition of these classes, the CLI application can be used as a command line API Explorer. Consider the service request VmCreateRequest which requires a class parameter, VmCreateRequest, in order to create a virtual machine. To display its composition, the following is invoked:

./vm --show-class=VmCreateRequest

This produces the following JSON output:

```
{
    "name": "string",
    "virtualHardware": "VirtualHardware"
}
```

The output shows that the VmCreateRequest class has a property which is itself a class named VirtualHardware. The command is repeated for this new class:

./vm --show-class=Virtual Hardware

As before, a JSON output shows the composition of the class VirtualHardware:

```
{
    "devices": "Array<VirtualDevice>",
    "memoryMB": "integer",
    "numCPU": "integer"
}
```

Here, one of the properties of VirtualHardware is an array of yet another class, VirtualDevice. So, once again, the command is repeated with this new class VirtualDevice:

./vm --show-class=VirtualDevice resulting in the following output:

```
{
    "deviceName": "string",
    "deviceType": "string",
    "key": "integer",
}
```

In one embodiment, there are no additional classes to explore as all the properties of VirtualDevice are base types and not classes. It is now possible to construct the JSON for VmCreateRequest, and provide that as a command line parameter to the PostVmCreateVm service request to the vm service adapter.

Managing Responses

Using the example above for the vm CLI application, consider the invocation of the GetVmListVms service request to the vm Service Adapter, which returns an array of virtual machines:

```
./vm GetVmListVms
{
    "virtualMachines": [
        {
            "hardware": {
                "devices": [
                    {
                        "deviceName": "VirtualDisk-1",
                        "deviceType": "VirtualDisk",
                        "key": 1
                    },
                    {
                        "deviceName": "VirtualDisk-2",
                        "deviceType": "VirtualDisk",
                        "key": 2
                    }
                ],
                "memoryMB": 8192,
                "numCPU": 4
            },
```

```
            "name": "sample-vm-3",
            "runtimeInfo": {
                "host": "191.168.12.252",
                "powerState": "poweredOff"
            },
            "vmRef": {
                "vcGuid": "b3eba0d6-7b91-43c3-a124-0e5b6242b9cc",
                "vmId": "1b58ba9c-8959-412a-80cf-f3db0dd9bea0"
            }
        },
        {
            "hardware": {
                "devices": [
                    {
                        "deviceName": "VirtualDisk-1",
                        "deviceType": "VirtualDisk",
                        "key": 1
                    }
                ],
                "memoryMB": 1024,
                "numCPU": 1
            },
            "name": "sample-vm-2",
            "runtimeInfo": {
                "host": "191.168.12.225",
                "powerState": "poweredOff"
            },
            "vmRef": {
                "vcGuid": "8cbd3b9b-685e-4d33-a14b-317dfab32e7e",
                "vmId": "3b55392a-3c71-446f-b716-62d4b2b0460f"
            }
        },
        {
            "hardware": {
                "devices": [
                    {
                        "deviceName": "VirtualDisk-1",
                        "deviceType": "VirtualDisk",
                        "key": 1
                    },
                    {
                        "deviceName": "VirtualDisk-2",
                        "deviceType": "VirtualDisk",
                        "key": 2
                    },
                    {
                        "deviceName": "VirtualUSB-3",
                        "deviceType": "VirtualUSB",
                        "key": 3
                    }
                ],
                "memoryMB": 2048,
                "numCPU": 2
            },
            "name": "sample-vm-1",
            "runtimeInfo": {
                "host": "191.168.12.46",
                "powerState": "poweredOff"
            },
            "vmRef": {
                "vcGuid": "5c5170b3-fc43-4392-a7c6-356e4a35892b",
                "vmId": "e2a6721e-0940-4416-a749-6b82cfbcfd7c"
            }
        }
    ]
}
```

In one embodiment, in order to manipulate this JSON output and extract some relevant information from it for use in a script, publicly available tools like jq can be used. The following snippet is an example of how to extract the name of each virtual machine which can be done with the following command:

./vm GetVmListVms | jq '.virtualMachines[ ].name'

In one embodiment, the above produces the following list of names:

"sample-vm-3"
"sample-vm-2"
"sample-vm-1"

In one embodiment, these names can then be manipulated as needed within a shell script or with other jq filters.

Wch 224

What changed (Wch) 224 is a semantic differ. In one embodiment, Wch 224 can highlight, at the semantic level, the differences between any two versions of an API Specification document 211. In one embodiment, this is necessary because Swagger-2 and OpenApi-3 specifications can be re-ordered arbitrarily without any semantic differences or changes to an API contract, which renders source file differs of little use.

For example, in one embodiment, when a specification is changed there are two files. The original file and a new modified file. Previously, a developer could compare the two files in an attempt to determine the parts that had been changed in the updated specification. However, this can be a deleterious process. For example, one or more changes that are identified could include "fake changes" e.g., the moving of a piece of code from a first location in the spec to a second location. Thus, it would appear to be a change in the one-to-one comparison, but it would not actually affect the operation of the specification.

However, unlike the prior art, in one embodiment, what changed (Wch) 224 reads both specifications at the semantic level, and Wch 224 builds both models, identifies any model changes, what is affected by the change (e.g., other aspects, other specifications, etc.), and the like. Thus, in one embodiment, Wch 224 can compare two versions of a specification file and identify operational changes such as what has been added, deleted, changed, updated, and the like.

In one embodiment, this allows an engineer to quickly identify changes to the API contract and rapidly address any areas of impact. In other words, managing the API is simplified as the developer will be provided with the actual operational changes (what has been added, deleted, changed, updated, and the like) and then be able to quickly determine if any of the changes will affect the developer or not.

Frequently, when working with API specification documents, it is desirable to understand what changed between two versions of the document, especially when the changes are extensive and include additions/deletions/updates. It is certainly possible to use a tool such as diff in order to understand the textual differences between the two files. However, this does not convey the semantics and impact of such changes. As an example, in one embodiment, it is completely acceptable to re-arrange definitions and operations around at will within an OpenApi document with absolutely no changes to the semantics of the document or breaking the API contract, while generating a massive amount of useless source file differences.

However, this does not (easily) aid an engineer to understand if there are changes that they need to make to their code that depends on the contract articulated in the latest version of an API Specification Document. In one embodiment, this is where another intent compiler 100 component: wch 224, provides assistance in quickly and automatically providing the necessary information about semantic changes, which can be consumed by a GUI application 237 (or a CLI application 239) to visually render the semantic changes in an easily digestible format. In one embodiment, this means that the engineer will instantly know If any of their code Is affected by the changes to the API specification document.

In one embodiment, to facilitate universal consumption of the information obtained from the semantic differences between two versions of an API Specification document, wch 224 outputs JSON arrays of the changes, which can then be easily consumed and rendered in a web browser.

In one embodiment, a typical output may look like this:

```
{
  "classes_added": [
    {
      "className": "SddcStateRequested",
      "context": {
        "line": 16190,
        "col": 2,
        "old": null,
        "new": [
          "            additionalProperties:",
          "                type: string",
          "",
          "   SddcStateRequested:",
          "      type: object",
          "      properties:",
          "        sddcs"
        ]
      }
    },
    {
      "className": "SupportWindows",
      "context": {
        "line": 16208,
        "col": 2,
        "old": null,
        "new": [
          "            - \"CANCELED\"",
          "            - \"COMPLETED\"",
          "",
          "   SupportWindows:",
          "      type: object",
          "      properties:",
          "        support_window_id:"
        ]
      }
    }
  ],
  "classes_removed": [
    {
      "className": "SddcStateRequest",
      "context": {
        "line": 16183,
        "col": 2,
        "old": [
          "            additionalProperties:",
          "                type: string",
          "",
          "   SddcStateRequest:",
          "      type: object",
          "      properties:",
          "        sddcs:"
        ],
        "new": null
      }
    },
    {
      "className": "SupportWindow",
      "context": {
        "line": 16201,
        "col": 2,
        "old": [
          "            - \"CANCELED\"",
          "            - \"COMPLETED\"",
          "",
          "   SupportWindow:",
          "      type: object",
          "      properties:",
          "        support_window_id:"
        ],
        "new": null
      }
    }
  ]
}
```

```
],
"properties_added": [
    {
        "className": "AwsAccount",
        "propertyName": "new_payer_account_type",
        "pathsAffected": [
            "/operator/aws",
            "/operator/aws/{awsAccountId}",
            "/operator/aws/{awsAccountId}/regionazmapping",
            "/operator/aws/{awsAccountId}/state"
        ],
        "context": {
            "line": 10842,
            "col": 10,
            "old": null,
            "new": [
                "        type: string",
                "        org_id:",
                "        type: string",
                "        new_payer_account_type:",
                "        type: string",
                "        enum:",
                "           - INTERNAL"
            ]
        }
    },
``` wch Output

In one embodiment, this is the complete list of JSON objects that wch outputs to describe the semantic changes between two versions of an API Specification document. The data structures below are golang struct declarations. The JSON Tags on the right are the JSON properties that are output when this struct is marshaled.

Context

In one embodiment, whenever a semantic difference is detected by wch, it is captured in a Context struct called Ctxt, which contains the line number and column number in the relevant API Specification document where the discrepancy is detected. In one embodiment, depending on the nature of the nature of the change, this may be the line number for the older or newer version of the document. e.g., if an entity is added to the newer version of the document, then the context is a line/column in the newer document. However, if an entity is deleted in the newer version of the document, then the context is a line/column in the older document where the entity used to exist. This is the definition of the Context struct:

```
// Line numbers where possible, otherwise Line == 0
// 'Old' and 'New' are the actual lines in the old and new Yaml files
// Each of them contains 3 lines before and 3 lines after,
with 'Line' in the middle
type Ctxt struct {
    Line    int         'json:"line"'
    Col     int         'json:"col"'
    Old     []string    'json:"old"'
    New     []string    'json:"new"'
}
```

Change

In one embodiment, a Change struct describes the nature of a change and consists of the following:

```
// Description of change
type Change struct {
    ChangeType string 'json:"changeType"'
    Entity string 'json:"entity"'
    From string 'json:"from"'
    To string 'json:"to"'
    Context Ctxt 'json:"context"'
}
```

As shown above, in one embodiment, changeType describes the nature of the change, e.g. Type, or Format, or something more elaborate like Extension Added. The properties from, and to, show the previous and new values from the transpired change. In one embodiment, the property entity is usually blank, except for when the RHS of a Vendor Extension in the API Specification document changes. In those cases, entity contains the key for the extension. The Ctxt struct is described above and contains the line/column information for the change.

ClassAdded

In one embodiment, the classAdded object is emitted when a new definition appears in the newer version of the API Specification document. This object has the following properties:

```
// A new class in the new YAML
type ClassAdded struct {
    Name    string              'json:"className"'
    Class   *model.Definition   'json:"-"'
    Context Ctxt                'json:"context"'
}
```

In one embodiment, className is the name of the definition label that changed and context is the location of the change in the newer document.

ClassRemoved

The ClassRemoved object is emitted when a className definition which existed in the older document, is no longer present in the newer one. In one embodiment, this object has similar properties to ClassAdded described above:

```
// A deleted class from the old YAML
type ClassRemoved struct {
    Name    string              'json:"className"'
    Class   *model.Definition   'json:"-"'
    Context Ctxt                'json:"context"'
}
```

Thus, in one embodiment, className is the name of the class that was deleted, and context refers to the older document where it used to exist.

PropertyAdded

In one embodiment, when a new property in a Class appears in the newer version of the document, then a PropertyAdded object is emitted:

```
// A new property in the new YAML
type PropertyAdded struct {
    Class           string      'json:"className"'
    Property        string      'json:"propertyName"'
    PathsAffected   []string    'json:"pathsAffected"'
    Context         Ctxt        'json:"context"'
}
```

In one embodiment, className is the name of the Class which owns the property which was added; and propertyName is the name of the added property. In one embodiment, context is as before, but there is a new array called pathsAffected. This array lists all the API endpoints that are affected by this change. e.g. in the example below:

```
"properties_added": [
  {
    "className": "AwsAccount",
    "propertyName": "new_payer_account_type",
    "pathsAffected": [
      "/operator/aws",
      "/operator/aws/{awsAccountId}",
      "/operator/aws/{awsAccountId}/regionazmapping",
      "/operator/aws/{awsAccountId}/state"
    ],
    "context": {
      "line": 10842,
      "col": 10,
      "old": null,
      "new": [
        "         type: string",
        "         org_id:",
        "         type: string",
        "         new_payer_account_type:",
        "         type: string",
        "         enum:",
        "           - INTERNAL"
      ]
    }
  },
```

As seen above, in one embodiment, the property new_payer_account_type has been added to the class Sddc. This impacts the URIs (API endpoints) that refer to this class in either the input parameters to the API operation, or the response payload from the API call. In this case, context refers to line/column in the newer document.

PropertyRemoved

In one embodiment, the removal of a property from a class in the newer document results in a PropertyRemoved object being emitted. This is structured similar to the previous PropertyAdded struct:

```
// A deleted property from the old YAML
type PropertyRemoved struct {
    Class         string     `json:"className"`
    Property      string     `json:"propertyName"`
    PathsAffected []string   `json:"pathsAffected"`
    Context       Ctxt       `json:"context"`
}
```

In one embodiment, the only difference here is that context refers to the older document.

PropertyChanged

In one embodiment, when the content of a property changes in a class in the newer document, then a PropertyChanged object is emitted:

```
// A changed property in the new YAML
type PropertyChanged struct {
    Class         string     `json:"className"`
    Property      string     `json:"propertyName"`
    PathsAffected []string   `json:"pathsAffected"`
    ChangeType    []Change   `json:"changeType"`
}
```

In one embodiment, there is a new field here: ChangeType, which is an array of Change objects, that was described above. In one embodiment, each Change object contains a Ctxt object which describes the context for the change to the property. This is an example:

```
"properties_changed": [
  {
    "className": "AdditionalHostSpec",
    "propertyName": "additional_host_count",
    "pathsAffected": null,
    "changeType": [
      {
        "changeType": "Type",
        "entity": "",
        "from": "integer",
        "to": "string",
        "context": {
          "line": 16409,
          "col": 8,
          "old": [
            " description: Represents part of a structure of host provisioning spec.",
            " properties:",
            "   additional_host_count:",
            "     type: integer",
            "     description: The additional valid host count.",
            "   storage_policy_reconfig_info:",
            "     type: object"
          ],
          "new": [
            " description: Represents part of a structure of host provisioning spec.",
            " properties:",
            "   additional_host_count:",
            "     type: string",
            "     description: The additional valid host count.",
            "   storage_policy_reconfig_info:",
            "     type: object"
          ]
        }
      }
    ]
  },
```

In the above example changeType states that the type of the property changed from integer to string, but no URI was affected by the change, as indicated by pathsAffected having a value of null.

In one embodiment, if the name of a property changes, wch will not emit a ChangeType object. Instead, a PropertyRemoved object and a PropertyAdded object will be emitted. This is also true when the name of a Class or the URI endpoint changes—e.g., an Add/Remove pair instead of a Change is emitted.

PathAdded

In one embodiment, when a new API endpoint (URI) appears in the newer document, a PathAdded object is emitted, consisting of:

```
// A new URI in the new YAML
type PathAdded struct {
    Uri     string        `json:"uri"`
    Path    *model.Path   `json:"-"`
    Context Ctxt          `json:"context"`
}
```

In one embodiment, the structure of this object is output as an array:

```
"paths_added": [
  {
    "uri": "/orgs/{org}/featureset",
    "context": {
      "line": 241,
      "col": 2,
      "old": null,
      "new": [
```

-continued

```
    "#",
    "# Features Service API",
    "#",
    " /orgs/{org}/featureset:",
    "  get:",
    "    tags:",
    "    - features"
    ]
   }
  }
 ],
```

PathRemoved

Similar to PathAdded, in one embodiment, a PathRemoved object is emitted if an API endpoint (URI) that used to exist in the older document, no longer does so in the newer document. This is the structure of the object:

```
// A deleted URI from the old YAML
type PathRemoved struct {
    Uri      string      `json:"uri"`
    Path     *model.Path `json:"-"`
    Context  Ctxt        `json:"context"`
}
```

The following is a sample output:

```
"paths_removed": [
 {
  "uri": "/orgs/{org}/features",
  "context": {
    "line": 240,
    "col": 2,
    "old": [
      "#",
      "# Features Service API",
      "#",
      " /orgs/{org}/features:",
      "  get:",
      "    tags:",
      "    - features"
    ],
    "new": null
  }
 }
],
```

As noted above, in one embodiment, there is no PathChanged object emitted by wch. Instead, a pair of PathAdded and PathRemoved objects are emitted.

OperationAdded

In one embodiment, when a new Operation appears for an existing API endpoint (URI) appears in the newer document, then a OperationAdded object is emitted by wch. This has the following structure:

```
// A new method in a path in the new YAML
type OperationAdded struct {
    Uri        string  `json:"uri"`
    Operation  string  `json:"operationName"`
    Context    Ctxt    `json:"context"`
}
```

The above object describes the API endpoint (URI) where the operation was added, and the type of operation, which is one of Get, Post, Put, Patch, or Delete.

Here is an example object emitted:

```
"operations_added": [
 {
  "uri": "/operator/aws/{awsAccountId}/resume",
  "operationName": "Put",
  "context": {
    "line": 795,
    "col": 4,
    "old": null,
    "new": [
      "    schema:",
      "        $ref: '#/definitions/ErrorResponse'",
      "  /operator/aws/{awsAccountId}/resume:",
      "    put:",
      "      tags:",
      "      - awsAccount",
      "      - operator"
    ]
  }
 }
],
```

OperationRemoved

Conversely, in one embodiment, OperationRemoved is emitted by wch when an operation, which used to exist in an API endpoint (URI) in the older document, no longer does so in the newer one, and is structured thus:

```
// A deleted method in a path from the old YAML
type OperationRemoved struct {
    Uri        string  `json:"uri"`
    Operation  string  `json:"operationName"`
    Context    Ctxt    `json:"context"`
}
``` an example of this is:

```
"operations_removed": [
 {
  "uri": "/operator/aws/{awsAccountId}/resume",
  "operationName": "Post",
  "context": {
    "line": 793,
    "col": 4,
    "old": [
      "    schema:",
      "        $ref: '#/definitions/ErrorResponse'",
      "  /operator/aws/{awsAccountId}/resume:",
      "    post:",
      "      tags:",
      "      - awsAccount",
      "      - operator"
    ],
    "new": null
  }
 }
],
```

OperationChanged

In one embodiment, the Type of an Operation (e.g. Get, Put, etc.) cannot be changed. The Operation can only be added or deleted to effect this. However, there are vendorextended entities in the Operation that may change. In one embodiment, when that happens, wch emits an OperationChanged object, with changeType describing the nature and context of the change:

```
// A changed method in the new YAML
type OperationChanged struct {
```

```
    Uri          string      'json:"uri"'
    Operation    string      'json:"operationName"'
    ChangeType   [ ]Change   'json:"changeType"'
}
```

In one embodiment, as with property changes, there is an array of changeType objects describing the change, as in the example below:

```
"operations_changed": [
  {
    "uri": "/operator/aws/{awsAccountId}",
    "operationName": "delete",
    "changeType": [
      {
        "changeType": "Service Name",
        "entity": "",
        "from": "aws",
        "to": "awstl",
        "context": {
          "line": 682,
          "col": 26,
          "old": [
        "    description: |"
        "        SUBJECT TO CHANGE/Internal",
        "        x-vmw-vapi-methodname: delete",
        "        x-vmc-ui-servicename: aws",
        "        x-vmw-vapi-lifecyle-internal:",
        "        parameters:",
        "          - $ref: '#/parameters/awsAccountIdParam'"
          ],
          "new": [
        "    description: |",
        "        SUBJECT TO CHANGE/Internal",
        "        x-vmw-vapi-methodname: deleter",
        "        x-vmc-ui-servicename: awstl",
        "        x-vmw-vapi-lifecyle-internal:",
        "        parameters:",
        "          - $ref: '#/parameters/awsAccountIdParam'"
          ]
      }
    ]
  },
```

In the above example, a Vendor Extension changed, and it also resulted in a change to the Service Name and Method Name for the operation.

ParameterAdded

In one embodiment, when a query or requestBody parameter for an Operation in an API endpoint (URI) is added in the newer document, wch emits a ParameterAdded object:

```
// A parameter added to a method in the new YAML
type ParameterAdded struct {
    Uri        string   'json:"uri"'
    Operation  string   'json:"operationName"'
    Parameter  string   'json:"parameterName"'
    Context    Ctxt     'json:"context"'
}
```

In one embodiment, no such object is emitted when a path parameter is added to an operation, since doing so changes the API endpoint (URI), which results in a pair of PathRemoved and PathAdded objects being emitted instead. Here is an example output:

```
"parameters_added": [
  {
    "uri": "/operator/sddcs/{sddc}",
    "operationName": "delete",
```

```
    "parameterName": "bleepBloop",
    "context": {
      "line": 1227,
      "col": 16,
      "old": null,
      "new": [
    "        deprecated: true",
    "        parameters:",
    "          - $ref: '#/parameters/sddcParam'",
    "          - name: bleepBloop",
    "            in: query",
    "            description: meh",
    "            required: false"
      ]
    }
  }
],
```

ParameterRemoved

In one embodiment, when a query or requestBody parameter for an Operation in an API endpoint (URI) is removed from the newer document, wch emits a ParameterRemoved object:

```
// A parameter removed from a method in the old YAML
type ParameterRemoved struct {
    Uri        string   'json:"uri"'
    Operation  string   'json:"operationName"'
    Parameter  string   'json:"parameterName"'
    Context    Ctxt     'json:"contextu"'
}
```

In one embodiment, no such object is emitted when a path parameter is removed from an operation, since doing so changes the API endpoint (URI), which results in a pair of PathRemoved and PathAdded objects being emitted instead. Here is an example output:

```
"parameters_removed": [
  {
    "uri": "/operator/sddcs/{sddc}",
    "operationName": "delete",
    "parameterName": "force",
    "context": {
      "line": 1225,
      "col": 14,
      "old": [
    "        deprecated: true",
    "        parameters:",
    "          - $ref: '#/parameters/sddcParam'",
    "          - name: force",
    "            in: query",
    "            description: \u003e",
    "              If = 'true', will delete forcefully.
                   Beware: do not use the force"
      ],
      "new": null
    }
  },
```

ParameterChanged

In one embodiment, when a query or requestBody parameter for an Operation in an API endpoint (URI) is changed in the newer document, wch emits a ParameterChanged object:

```
// A parameter changed in a method in the new YAML
type ParameterChanged struct {
    Uri             string          'json:"uri"
```

```
Operation        string      'json:"operationName"'
Parameter        string      'json:"parameterName"'
ChangeType       [ ]Change   'json:"changeType"'
}
```

In one embodiment, no such object is emitted when a path parameter is changed as an operation, since doing so changes the API endpoint (URI), which results in a pair of PathRemoved and PathAdded objects being emitted instead. Here is an example output:

```
"parameters_changed": [
  {
    "uri": "/orgs/{org}/sddcs/{sddc}/size",
    "operationName": "post",
    "parameterName": "sddcSizeConfig",
    "changeType": [
      {
        "changeType": "ParamType",
        "entity": "",
        "from": "body",
        "to": "query",
        "context": {
          "line": 1358,
          "col": 10,
          "old": [
            "   - $ref: '#/parameters/orgParam'",
            "   - $ref: '#/parameters/sddcParam'",
            "     name: sddcSizeConfig",
            "     in: body",
            "     required: true",
            "     schema:",
            "       $ref: '#/definitions/SddcSizeConfig'"
          ],
          "new": [
            "   - $ref: '#/parameters/orgParam'",
            "   - $ref: '#/parameters/sddcParam'",
            "     name: sddcSizeConfig",
            "     in: query",
            "     required: true",
            "     schema:",
            "       type: object"
          ]
        }
      },
      {
        "changeType": "Type",
        "entity": "",
        "from": "SddcSizeConfig",
        "to": "Map\u003cstring, Array\u003c integer \u003e\u003e",
        "context": {
          "line": 1361,
          "col": 12,
          "old": [
            "    If = 'disable', will disable the access to vCenter and workload VM of the Sddc.",
            "    If = 'enable', will enable the access to vCenter and workload VM of the Sddc.",
            "    required: true",
            "    type: string",
            "    responses:",
            "      '202':",
            "        description: ACCEPTED"
          ],
          "new": [
            "    in: query",
            "    required: true",
            "    schema:",
            "      type: object",
            "      additionalProperties:",
            "        type: array",
            "        items:"
          ]
        }
      },
      {
        "changeType": "Format",
        "entity": "",
        "from": "",
        "to": "int64",
        "context": {
          "line": 1366,
          "col": 16,
          "old": null,
          "new": [
            "        type: array",
            "        items:",
            "          type: integer",
            "          format: int64",
            "    responses:",
            "      '200':",
            "        description: OK"
          ]
        }
      }
    ]
  }
],
```

ResponseChanged

In one embodiment, the response from an API call cannot be added or deleted, it can only be changed, since every API call can only have a single response. Thus, in one embodiment, when the response to an operation is changed, wch emits a ResponseChanged object which describes the changes:

```
// A change to a response from a method in the new YAML
type ResponseChanged struct {
  Uri          string      'json:"uri"'
  Operation    string      'json:"operationName"'
  ChangeType   [ ]Change   'json:"changeType"'
}
```

In one embodiment, the emitted object from wch is similar to those already described above. Here is an example:

```
"responses_changed": [
  {
    "uri": "/operator/aws/{awsAccountId}/regionazmapping",
    "operationName": "patch",
    "changeType": [
      {
        "changeType": "Type",
        "entity": "",
        "from": "AwsAccount",
        "to": "Sddc",
        "context": {
          "line": 785,
          "col": 33,
          "old": [
            "      '200':",
            "        description: OK",
            "        schema:",
            "          $ref: '#/definitions/AwsAccount'",
            "      '401':",
            "        description: Unauthorized",
            "      '403':"
          ],
          "new": [
            "      '200':",
            "        description: OK",
            "        schema:",
            "          $ref: '#/definitions/Sddc'",
            "      '401':",
            "        description: Unauthorized",
            "      '403':"
          ]
        }
      }
    ]
```

-continued

```
        }
      }
    ]
  },
```

Changes

In one embodiment, all of the objects described above are wrapped in a super object called Changes, which contains arrays of every object above:

```
// This the JSON that is output
type Changes struct {
    ClassesAdded       [ ]ClassAdded       'json:"classes_added"'
    ClassesRemoved     [ ]ClassRemoved     'json:"classes_removed"'
    PropertiesAdded    [ ]PropertyAdded    'json:"properties_added"'
    PropertiesRemoved  [ ]PropertyRemoved  'json:"properties_
                                            removed"'
    PropertiesChanged  [ ]PropertyChanged  'json:"properties_
                                            changed"'
    PathsAdded         [ ]PathAdded        'json:"paths_added"'
    PathsRemoved       [ ]PathRemoved      'json:"paths_removed"'
    OperationsAdded    [ ]OperationAdded   'json:"operations_added"'
    OperationsRemoved  [ ]OperationRemoved 'json:"operations_
                                            removed"'
    OperationsChanged  [ ]OperationChanged 'json:"operations_
                                            changed"'
    ParametersAdded    [ ]ParameterAdded   'json:"parameters_added"'
    ParametersRemoved  [ ]ParameterRemoved 'json:"parameters_
                                            removed"'
    ParametersChanged  [ ]ParameterChanged 'json:"parameters_
                                            changed"'
    ResponsesChanged   [ ]ResponseChanged  'json:"responses_
                                            changed"'
}
```

In one embodiment, additional changes may be reported in future versions of wch, however, the above objects describe the entirety of the API Contract and any additional reports would not affect the engineer's code.

Using Wch

The following is a description of an embodiment to invoke wch 224:

wch [-dhtvVw]<current document> <new document>

| Option | Description |
| --- | --- |
| -d \| --debug | Used by Wch developers to emit debug output. |
| -h \| --help | Displays all the options recognized by Wch. |
| -t \| --trace | Used by Wch developers to emit trace level output. |
| -V \| --version | Displays Wch version. |
| -v \| --verbose | Used by Wch developers to emit verbose level output. |
| -w \| --no-warnings | This option suppresses warning from Wch (not recommended, except while debugging, and/or overwhelmed by a stream of warnings) or when invoked programmatically using LibSewingMachine. |

Appomatic 217

Appomatic 217 is an application generation orchestrator. In one embodiment, Appomatic 217 orchestrates all of the above components to rapidly create a complete GUI application 237, which is operational when it receives project-specific code.

In one embodiment, Appomatic is the component orchestrator for intent compiler 100 (e.g., sewing machine). In one embodiment, this component is used to build a new GUI application 237 from an API Specification document. In one embodiment, the generated application is complete with Service Adapters (in Typescript or Java) that can invoke backend service requests and return responses to the application. In one embodiment, one, some, or all internal models 233 and operations 234, including service adapter interface documents 223 are created dynamically, as are all configuration files, and the entire application is wired to execute immediately. In one embodiment, the resulting application can then be tailored to meet the needs of the engineer developing the application.

Autogenerating a Complete Application

In one embodiment, in order to generate an application for a single API Specification document, Appomatic 217 performs the following operations:

1. One embodiment launches Apigen 213 with the provided API Specification document to produce language bindings in the specified language.

2. One embodiment launches Specgen 219 to create Service Adapter Specification documents and application configuration files that can be consumed by Servgen 220 and Appgen 236.

3. One embodiment launches Servgen 220 with the generated Service Adapter Specification documents, the API Specification document, and the language bindings produced by Apigen 213 to create all the Service Adapters needed to enable API calls from the application layer 230.

4. One embodiment launches Modelgen 232 to operate on the service adapter interface documents produced by Servgen 220 in the previous operation and create models and operations in the application layer 230.

5. One embodiment launches Appgen 236 to create a GUI application 237 using the models 233 and operations 234 created by Modelgen 232 and the application configuration documents 227 created by Specgen 219 for an immediately executable application that only requires modifications to the rendering logic.

Using Appomatic

The following is a detailed description of one embodiment used to invoke Appomatic:

appomatic [-AdDFGghmnqrStvVw] [-a "@appomatic"] [-M value] [-N value] [-O value] [-P value] [-Q value] [-Y value] [-y "-api-doc.yaml"] [parameters . . . ]

| Option | Description |
| --- | --- |
| -A \| --apigen | Run Apigen. Without this option Apigen will not be executed and existing language bindings will be used by subsequent Sewing Machine components. This option is not required if --autogen is specified. |
| -a, \| --alias="@vmc" | Typescript only. Specifies a shortcut alias to be used for imports. |
| -D \| --no-disambiguate | This option is passed on to Specgen in order to specify that the mangled API Class Name should not be appended to service requests to disambiguate them when a single Service Adapter Specification document is created from the entire API Specification document. |
| -d \| --debug | Used by Appomatic developers to emit debug output. |
| -F \| --force | This option is used to specify that even customized files will be overwritten on execution. Use with caution. This is mainly for use for new applications that have yet to be customized. |
| -G \| --appgen | Run Appgen. Without this option Appgen will not be executed and any artifacts from previous runs will not be regenerated. This option is not required if --autogen is specified. |
| -g \| --autogen | This option specifies that after Specgen has generated all specification and configuration files, the application should be autogenerated. This is the combination of all the options to run the individual Sewing Machine components. |
| -h \| --help | Displays all the options recognized by Appomatic. |
| -l "typescript" \| --language="typescript" | This option is used to specify the language plugin to be used for the output from the launched Sewing Machine components. |
| -M \| --modelgen-options=value | This option allows specific options to be passed to Modelgen on launch. Multiple options can be specified by separating them with the "!" separator. |
| -m \| --modelgen | Run Modelgen. Without this option Modelgen will not be executed and any artifacts from previous runs will not be regenerated. This option is not required if --autogen is specified. |
| -N \| --appgen-options=value | This option allows specific options to be passed to Appgen on launch. Multiple options can be specified by separating them with the "!" separator. |
| -n \| --new | This option is used to create a new application from scratch. If the application already exists, Appomatic will complain and refuse to do anything unless the --force option is also provided. |
| -O \| --apigen-options= value | This option allows specific options to be passed to Apigen on launch. Multiple options can be specified by separating them with the "!" separator. |
| -P \| --specgen-options=value | This option allows specific options to be passed to Specgen on launch. Multiple options can be specified by separating them with the "!" separator. |
| -Q \| --servgen-options=value | This option allows specific options to be passed to Servgen on launch. Multiple options can be specified by separating them with the "!" separator. |
| -q \| --quick | Run the minimal amount of operations to build a skeletal application. This will not run npm install or autogenration. |
| -r \| --recover | Normally, Appomatic will stop processing and exit when it encounters an error. With this option, it will try to continue processing even if it fails. Do not specify this for production code. |
| -S \| --servgen | Run Servgen. Without this option Servgen will not be executed and any artifacts from previous runs will not be regenerated. This option is not required if --autogen is specified. |
| -t \| --trace | Used by Appomatic developers to emit trace level output. |
| -V \| --version | Used by Appomatic developers to emit verbose level output. |
| -v \| --verbose | Used by Appomatic developers to emit verbose level output. |
| -w \| --no-warnings | This option suppresses warning from Appomatic (not recommended, except while debugging, and overwhelmed by a stream of warnings). |
| -Y \| --add-YAML=value | Set the YAML file for the new app (can only have one). This is the seed from which all subsequent specification documents and configuration files are generated. |
| -y "-api-doc.yaml" \| --yaml-suffix="-api-doc.yaml" | By convention, all API Specification documents are expected to have -api-doc.yaml as the suffix for the filename that contains them. This option allows for a different name pattern to be sought by Appomatic. |

Example Use

Example VMC UI using Java Service Adapters
appomatic -l java --new -D --alias=@vmc --add-YAML=~/ui/src/services/api/vmc-api-doc.yaml --autogen ~/vmc Example VMC UI using Typescript Service Adapters
-F --new --alias=@vmc --add-YAML=~/ui/src/services/api/vmc-api-doc.yaml --autogen ~/vmc Linty In one embodiment, linty is a Swagger 2.0 YAML validator which supports the JSON Schema Draft 4 standard. In one embodiment, Linty not only supports Swagger 2.0, but also OpenApi 3.0 API specifications with an abstract rules-based engine that can be locally augmented, and the like.

Using Linty

The following is a detailed description of how to invoke linty:

linty [-dhtvV] [-b ${HOME}/ui] [-p<YAML folder>] [-s "-api-doc.yaml"] [yaml files . . . ]

| Option | Description |
| --- | --- |
| -b <path> \| --root=<path> | This option declares the absolute path to the root of the Project directory. Most subsequent location specifications are relative to this root path. If this option is |

| Option | Description |
|---|---|
| | skipped, Linty defaults to ${HOME}/ui for historical reasons. Path specifications may include the "~" (tilde) character which will be replaced by the HOME folder of the invoking user, or "~<user>", which will be replaced by the HOME folder of the specified <user>. |
| -d \| --debug | Used by Linty developers to emit debug output. |
| -h \| --help | Displays all the options recognized by Linty. |
| -p <relative path> \| --apiDir=<relative path> | This option is optional and specifies the path of the API folder, relative to the project root specified using --root above. The API folder is the location whereAPI Specification files reside. |
| -s "-api-doc.yaml" \| --suffix="-api-doc.yaml" | By convention, all API Specification documents are expected to have -api-doc.yaml as the suffix for the filename that contains them. This option allows for a different name pattern to be sought by Linty. |
| -t \| --trace | Used by Wch developers to emit trace level output. |
| -V \| --version | Displays Linty version. |
| -v \| --verbose | Used by Linty developers to emit verbose level output. |
| -w \| --no- | This option suppresses warning from Linty (not recommended, except while debugging, and/or overwhelmed by a stream of warnings). |

Interesting Statistics

In one embodiment, the intent compiler 100 (e.g., Sewing Machine) and all its components were architected and designed with high performance in mind, as was the choice of golang for its implementation language. Consequently, execution of most components takes only a few milliseconds to a few seconds, with most of its time spent launching the various components, which is, in one embodiment, dependent on the speed of the platform on which they are run and the number of specification files that are processed.

The statistics below are from running the various components on an 18-core iMac Pro, with OSX 10.14.6 and 256 GB RAM on an AMD 4.6 GHz cpu. Most of these tests were performed using VMCUI, and this information is provided herein for purposes of demonstration, not limitation.

| Intent compiler (Sewing Machine) Component | Test Environment | Real Time |
|---|---|---|
| Linty | ~17K lines vmc-api-doc.yaml with multiple validation errors. | 10.09 seconds |
| LibSwagger | ~17K lines vmc-api-doc.yaml. | 1.18 seconds |
| Wch | Through LibSewingMachine, comparing two versions of vmc-api-doc.yaml with multiple changes. | 0.16 seconds |
| Specgen | ~17K lines vmc-api-doc.yaml. | 1.31 seconds |
| Apigen | ~17K lines vmc-api-doc.yaml with Typescript output to single file. | 2.68 seconds |
| Servgen | 9 Api Specification documents consisting of ~25K lines, using the specs for the sddc-core Service Adapter with 8 Service Adapter Specification documents with a total of 1102 lines. | 0.60 seconds |
| Servgen | 9 Api Specification documents consisting of ~25K lines, using 94 Service Adapter Specification documents in vmc with a total of 5342 lines, autogenerating ~83K lines of code. | 0.90 seconds |
| Modelgen | 29 Service Adapter Interface documents, with a total of ~13K lines. | 0.17 seconds |
| Appgen | 28 component specification files in VMCUI. | 0.11 seconds |
| Cligen | 1 Service Adapter Interface Specification document of 464 lines. | 0.03 seconds |

As discussed earlier, in one embodiment, modularity and a clear separation of function, is purposely built in the architecture and design of the Intent compiler 100. In one embodiment, the modularity and clear separation of function is provided between all components of FIG. 2. In one embodiment, the modularity and clear separation of function is provided between some of the components of FIG. 2 while other components of the intent compiler 100 design are part of the same module and/or interactive functionality.

For example, in a modularity and clear separation of function embodiment, no component has knowledge of another component, nor does one component ever directly access the internal implementation or data structures of another component, except for operations and data structures that are explicitly exported for external consumption. Each component relies on a set of input artifacts, and conversely produces its own unique artifacts for consumption by other components.

In one embodiment, this pattern of sequential execution of operations, with the output artifacts of one or more components used as the input of components that are downstream from those, is called pipelining, and such an approach to writing tools and utilities has the obvious benefit of avoiding the creation of large, unwieldy, brittle, and unmaintainable applications.

Additionally, as mentioned herein, speed of execution is an important metric for all Intent compiler components. In one embodiment, Golang was chosen as the implementation language for its speed of compilation, and the speed of the compiled component binary, which runs natively on most platforms. Moreover, multi-threaded concurrent execution of the binaries, maximally consumes the horsepower of the underlying hardware, something not possible with single-threaded platforms like the single-threaded Node.js platform, used to run applications written in Typescript/Javascript and other languages intended for browser-based applications, or the ecosystem baggage that comes with languages like Java. Instead, Golang produces native binary executables, that have been built for each specific target platform(s), with no external dependencies or a required ecosystem.

Example Computer System Environment

Figure 6:
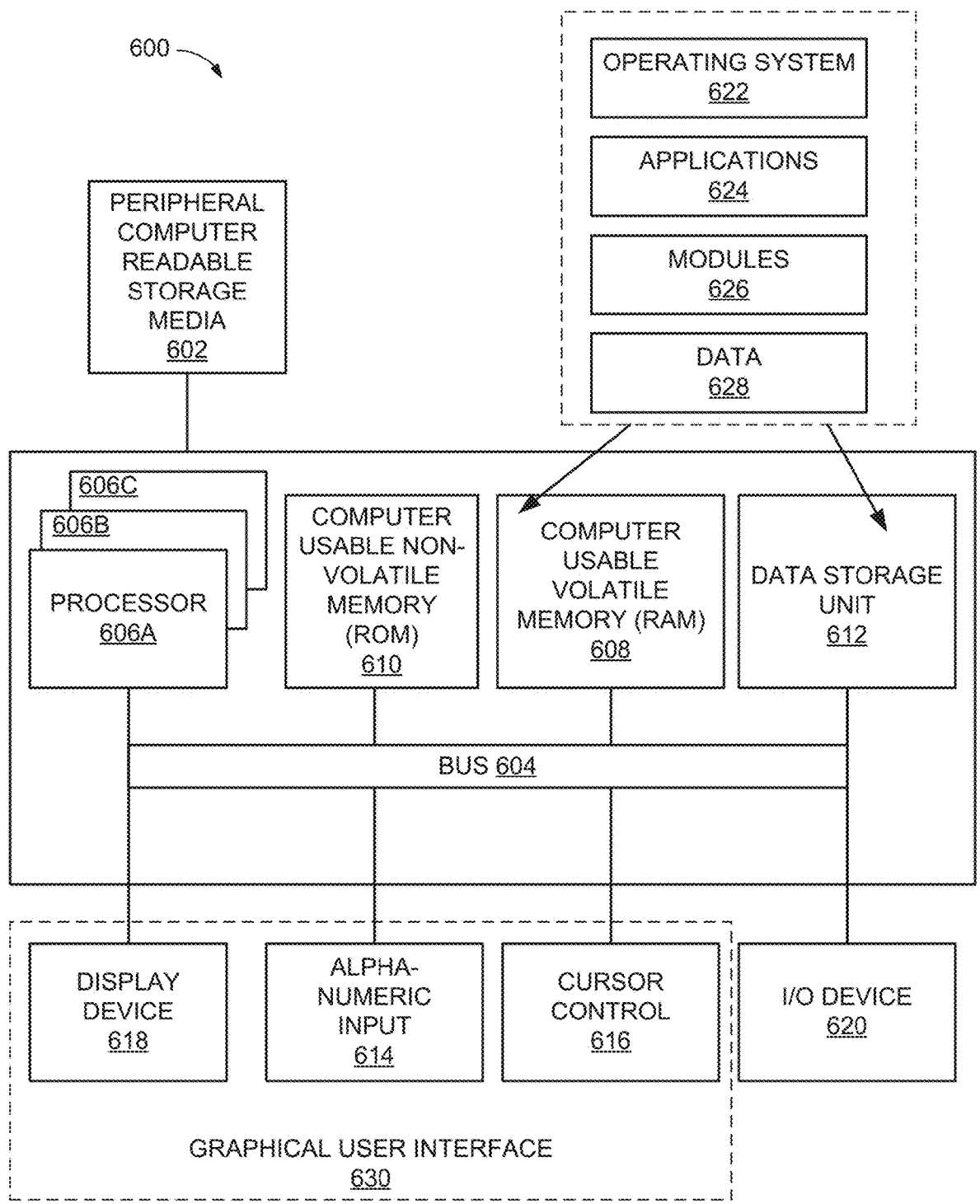
FIG. 6 illustrates an example computer system upon which the present invention can be implemented, in accordance with an embodiment.

With reference now to FIG. 6, all or portions of some embodiments described herein are composed of computer-readable and computer-executable instructions that reside, for example, in computer-usable/computer-readable storage media of a computer system. That is, FIG. 6 illustrates one example of a type of computer (computer system 600) that can be used in accordance with or to implement various embodiments which are discussed herein. It is appreciated that computer system 600 of FIG. 6 is only an example and that embodiments as described herein can operate on or in a number of different computer systems including, but not limited to, general purpose networked computer systems, embedded computer systems, routers, switches, server devices, client devices, various intermediate devices/tiers, standalone computer systems, media centers, handheld computer systems, multi-media devices, virtual machines, virtualization management servers, and the like. Computer system 600 of FIG. 6 is well adapted to having peripheral tangible computer-readable storage media 602 such as, for example, an electronic flash memory data storage device, a floppy disc, a compact disc, digital versatile disc, other disc-based storage, universal serial bus "thumb" drive, removable memory card, and the like coupled thereto. The tangible computer-readable storage media is non-transitory in nature.

System 600 of FIG. 6 includes an address/data bus 604 for communicating information, and a processor 606A coupled with bus 604 for processing information and instructions. As depicted in FIG. 6, system 600 is also well suited to a multi-processor environment in which a plurality of processors 606A, 606B, and 606C are present. Conversely, system 600 is also well suited to having a single processor such as, for example, processor 606A. Processors 606A, 606B, and 606C may be any of various types of microprocessors. System 600 also includes data storage features such as a computer usable volatile memory 608, e.g., random access memory (RAM), coupled with bus 604 for storing information and instructions for processors 606A, 606B, and 606C. System 600 also includes computer usable non-volatile memory 610, e.g., read only memory (ROM), coupled with bus 604 for storing static information and instructions for processors 606A, 606B, and 606C. Also present in system 600 is a data storage unit 612 (e.g., a magnetic or optical disc and disc drive) coupled with bus 604 for storing information and instructions. System 600 also includes an alphanumeric input device 614 including alphanumeric and function keys coupled with bus 604 for communicating information and command selections to processor 606A or processors 606A, 606B, and 606C. System 600 also includes an cursor control device 616 coupled with bus 604 for communicating user input information and command selections to processor 606A or processors 606A, 6066, and 606C. In one embodiment, system 600 also includes a display device 618 coupled with bus 604 for displaying information.

Referring still to FIG. 6, display device 618 of FIG. 6 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 616 allows the computer user to dynamically signal the movement of a visible symbol (cursor) on a display screen of display device 618 and indicate user selections of selectable items displayed on display device 618. Many implementations of cursor control device 616 are known in the art including a trackball, mouse, touch pad, touch screen, joystick or special keys on alphanumeric input device 614 capable of signaling movement of a given direction or manner of displacement. Alternatively, it will be appreciated that a cursor can be directed and/or activated via input from alphanumeric input device 614 using special keys and key sequence commands. System 600 is also well suited to having a cursor directed by other means such as, for example, voice commands. In various embodiments, alphanumeric input device 614, cursor control device 616, and display device 618, or any combination thereof (e.g., user interface selection devices), may collectively operate to provide a UI 630 under the direction of a processor (e.g., processor 606A or processors 606A, 606B, and 606C). UI 630 allows user to interact with system 600 through application topology visualization representations presented on display device 618 by interacting with alphanumeric input device 614 and/or cursor control device 616.

System 600 also includes an I/O device 620 for coupling system 600 with external entities. For example, in one embodiment, I/O device 620 is a modem for enabling wired or wireless communications between system 600 and an external network such as, but not limited to, the Internet.

Referring still to FIG. 6, various other components are depicted for system 600. Specifically, when present, an operating system 622, applications 624, modules 626, and data 628 are shown as typically residing in one or some combination of computer usable volatile memory 608 (e.g., RAM), computer usable non-volatile memory 610 (e.g., ROM), and data storage unit 612. In some embodiments, all or portions of various embodiments described herein are stored, for example, as an application 624 and/or module 626 in memory locations in RAM 608, computer-readable storage media in data storage unit 612, peripheral computer-readable storage media 602, and/or other tangible computer-readable storage media.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible, regardless the degree of virtualization. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. An intent compiler stored on a memory, the intent compiler comprising:
a backend services layer, wherein the backend services layer comprises at least one service application programming interface (API) specification;
a service adapter layer, wherein the service adapter layer receives the at least one service API specification and automatically generates at least one service adapter based on the at least one service API specification, and wherein the service adapter layer further comprises:
an abstraction library to parse the at least one service API specification into an abstracted API specification document;
a language bindings generator to convert the abstracted API specification document into a model and operation in at least one programming language; and
a service adapter generator to use the model and operation in the at least one programming language from the language bindings generator to generate the at least one service adapter and at least one service adapter interface document; and
an application layer, wherein the application layer automatically generates an application from information contained in the at least one service adapter.

2. The intent compiler of claim 1, wherein the application is a cloud-based application.

3. The intent compiler of claim 1, wherein the application is a graphical user interface (GUI) application.

4. The intent compiler of claim 1, wherein the application is a command line interface (CLI) application.

5. The intent compiler of claim 1, further comprising:
a bifröst message bus to provide communications between the backend services layer, the service adapter layer, and the application layer.

6. The intent compiler of claim 5, wherein the bifröst message bus is the only form of communication between the backend services layer, the service adapter layer, and the application layer.

7. The intent compiler of claim 1, wherein the service adapter layer further comprises:
a specification generator to produce a service adapter specification document from the abstracted API specification document; and
an application generation orchestrator to coordinate an operation of each component of the intent compiler.

8. The intent compiler of claim 1, wherein the service adapter layer further comprises:
a semantic differ to highlight, at a semantic level, a difference between any two versions of an abstracted API specification document to identify changes to an API contract.

9. The intent compiler of claim 1, wherein the application layer further comprises:
a models and operations generator to use a service adapter interface document output by a service adapter generator, to instantiate runtime language bindings for models and operations in a multitude of programming languages, using a plugin strategy.

10. The intent compiler of claim 9, wherein the application layer further comprises:
a graphical user interface (GUI) application generator to use an application specification document and the models and operations generated by the models and operations generator to produces a GUI application.

11. The intent compiler of claim 9, wherein the application layer further comprises:
a command line interface (CLI) application generator to create a CLI application for each service adapter based on the operations and models generated by the models and operations generator.

12. A computer-implemented method for generating an application, the computer-implemented method comprising:
accessing a backend services layer comprising at least one service application programming interface (API) specification;
receiving, at a service adapter layer, the at least one service API specification, wherein the service adapter layer further comprises:
parsing the at least one service API specification into an abstracted API specification document;
converting the abstracted API specification document into a model and operation in at least one programming language; and
generating at least one service adapter and at least one service adapter interface document from the model and operation in the at least one programming language;
automatically generating, at the service adapter layer, at least one service adapter based on the at least one service API specification; and
using an application layer to automatically generate an application from information contained in the at least one service adapter.

13. The computer-implemented method of claim 12, further comprising:
utilizing a bifröst message bus to provide communications between the backend services layer, the service adapter layer, and the application layer.

14. The computer-implemented method of claim 12, wherein the service adapter layer further comprises:
producing a service adapter specification document from the abstracted API specification document.

15. The computer-implemented method of claim 12, wherein the service adapter layer further comprises:
determining, at a semantic level, a difference between any two versions of an abstracted API specification document to identify changes to an API contract.

16. The computer-implemented method of claim 12, wherein the application layer further comprises:

using a service adapter interface document to instantiate runtime language bindings for models and operations in a multitude of programming languages, using a plugin strategy.

17. The computer-implemented method of claim 16, wherein the application layer further comprises:
using an application specification document and the models and operations to generate a graphical user interface (GUI) application.

18. The computer-implemented method of claim 16, wherein the application layer further comprises:
creating a command line interface (CLI) application for each service adapter based on the models and operations.

* * * * *